United States Patent
Yoshikawa et al.

(10) Patent No.: US 7,836,476 B2
(45) Date of Patent: Nov. 16, 2010

(54) CONTENTS REPRODUCING METHOD AND DEVICE FOR REPRODUCING CONTENTS ON RECORDING MEDIUM

(75) Inventors: Kazushi Yoshikawa, Kanagawa (JP); Kazuyuki Marukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 2345 days.

(21) Appl. No.: 10/169,427

(22) PCT Filed: Oct. 30, 2001

(86) PCT No.: PCT/JP01/09525

§ 371 (c)(1),
(2), (4) Date: Jun. 26, 2002

(87) PCT Pub. No.: WO02/37844

PCT Pub. Date: May 10, 2002

(65) Prior Publication Data

US 2003/0048671 A1    Mar. 13, 2003

(30) Foreign Application Priority Data

Oct. 30, 2000    (JP) .............................. 2000-334940

(51) Int. Cl.
*H04N 7/173*    (2006.01)

(52) U.S. Cl. ...................... 725/105; 725/110; 725/115; 348/211.2; 348/211.11; 348/239

(58) Field of Classification Search ................ 725/110, 725/105; 386/125, 95, 107, 117; 348/211.1, 348/211.2, 211.11, 211.9, 239
See application file for complete search history.

(56) References Cited

U.S. PATENT DOCUMENTS

| | | | | |
|---|---|---|---|---|
| 5,408,610 A | * | 4/1995 | Arakawa | 709/245 |
| 6,014,170 A | * | 1/2000 | Pont et al. | 348/231.4 |
| 6,151,009 A | * | 11/2000 | Kanade et al. | 345/641 |
| 6,182,116 B1 | * | 1/2001 | Namma et al. | 709/204 |
| 6,944,621 B1 | * | 9/2005 | Collart | 707/102 |
| 7,209,942 B1 | * | 4/2007 | Hori et al. | 709/203 |
| 2002/0056136 A1 | * | 5/2002 | Wistendahl et al. | 725/135 |

FOREIGN PATENT DOCUMENTS

| | | |
|---|---|---|
| JP | 5 63704 | 3/1993 |
| JP | 11-27609 | 1/1999 |
| JP | 11-122566 | 4/1999 |
| JP | 11-161663 | 6/1999 |
| JP | 11-341440 | 12/1999 |
| JP | 2000-260117 | 9/2000 |
| JP | 2001-268421 | 9/2001 |

* cited by examiner

*Primary Examiner*—Hunter B. Lonsberry
*Assistant Examiner*—Sumaiya A Chowdhury
(74) *Attorney, Agent, or Firm*—Frommer Lawrence & Haug LLP; William S. Frommer; Thomas F. Presson

(57) ABSTRACT

A disc drive, camera and a server are in communication with one another via a communication network. The disc drive plays back a disc in order to reproduce a recorded picture, whereby the picture and a real-time world view supplied from the camera are combined based on an address table managed by the server to produce a synthetic picture data. For example, a recorded picture reproduced from the disc and real-time world view taken by the camera are combined to synthesize a picture. Thus, content recorded in a recording medium can be used to produce the synthetic picture data.

30 Claims, 45 Drawing Sheets

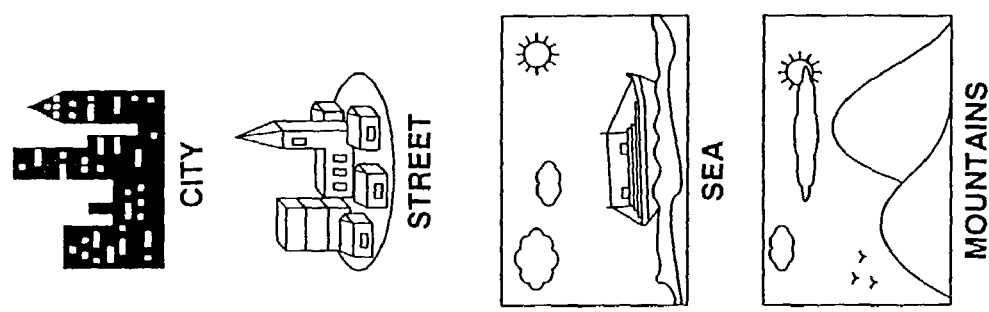
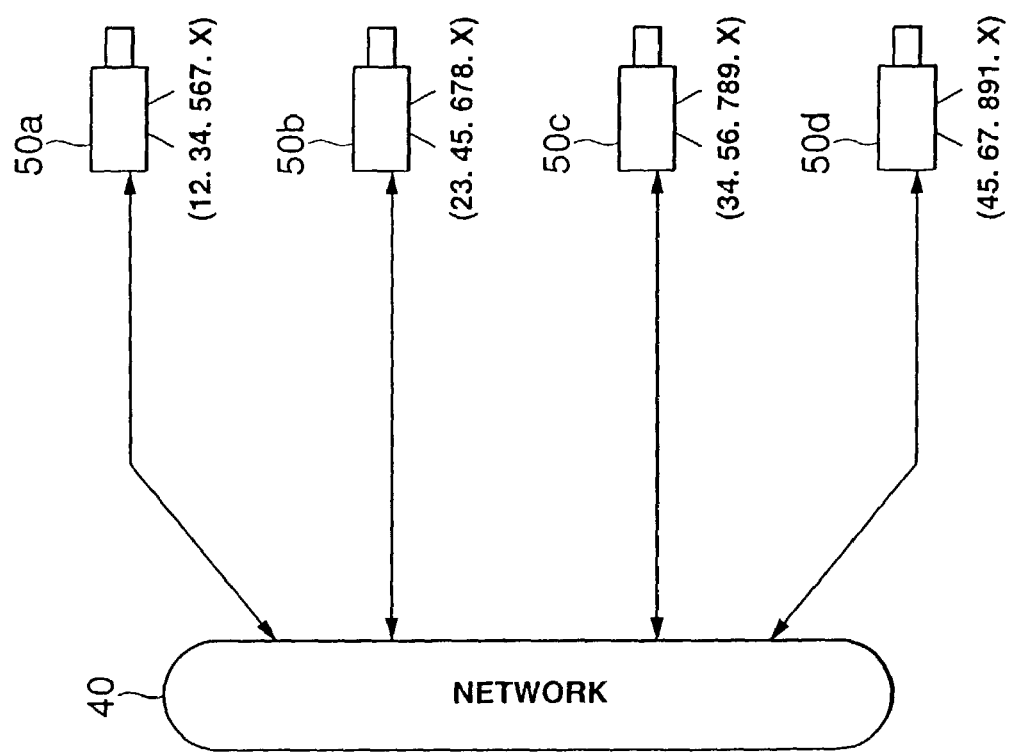
FIG.6

| | No. | Start | End |
|---|---|---|---|
| INDEX INFORMATION | #1 | 0:00 | 5:00 |
| | #2 | 5:01 | 12:30 |
| | #3 | 12:31 | |
| | ⋮ | ⋮ | ⋮ |

| CAPACITY INFORMATION |
|---|
| No.-OF-LAYERS INFORMATION |
| TRACK PATH DIRECTION |
| RECORDING START/ END POSITION INFORMATION |
| CAMERA INTERLOCK ID FLAG |
| SERVER ADDRESS |
| DISC ID |

FIG.8

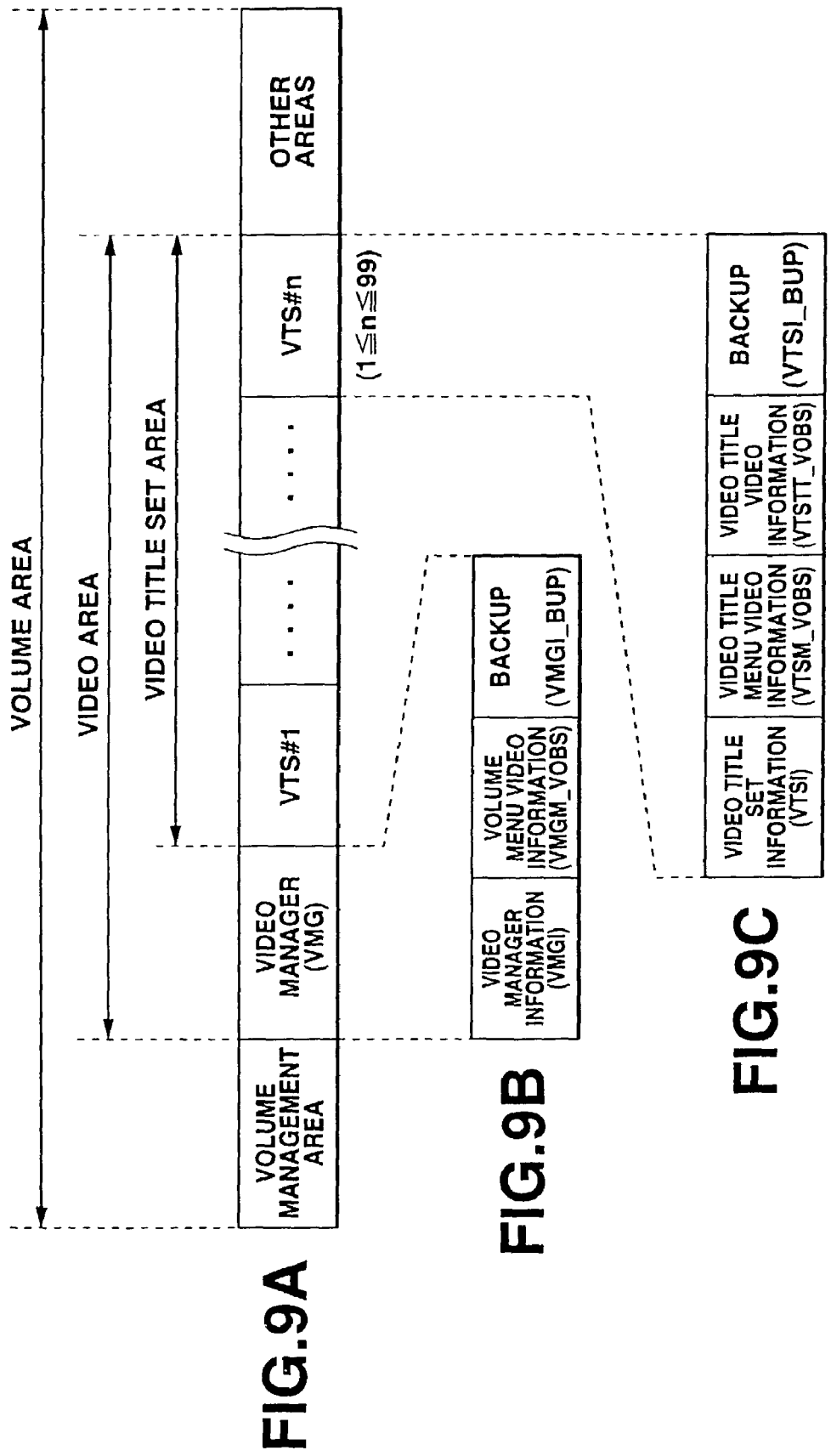

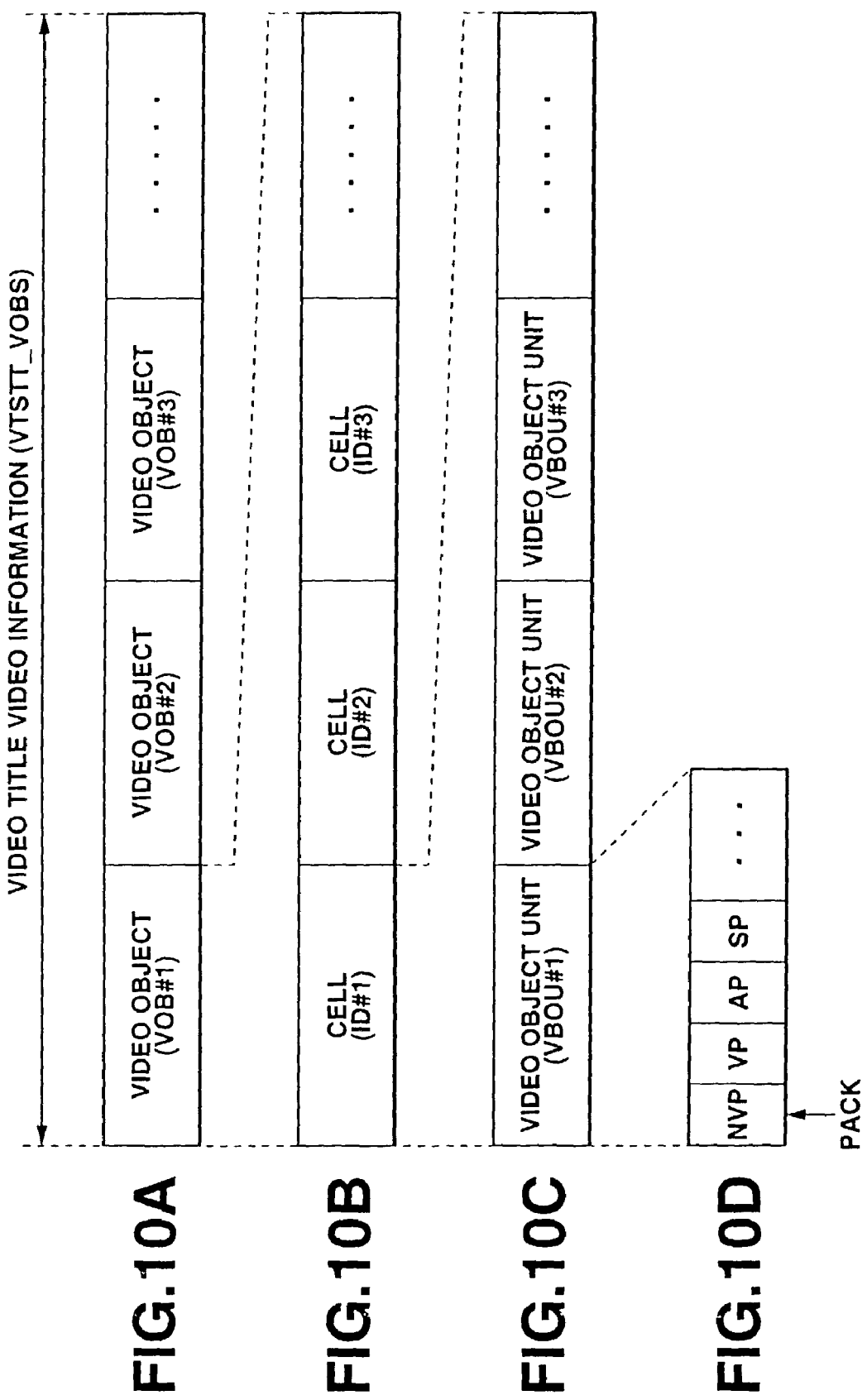

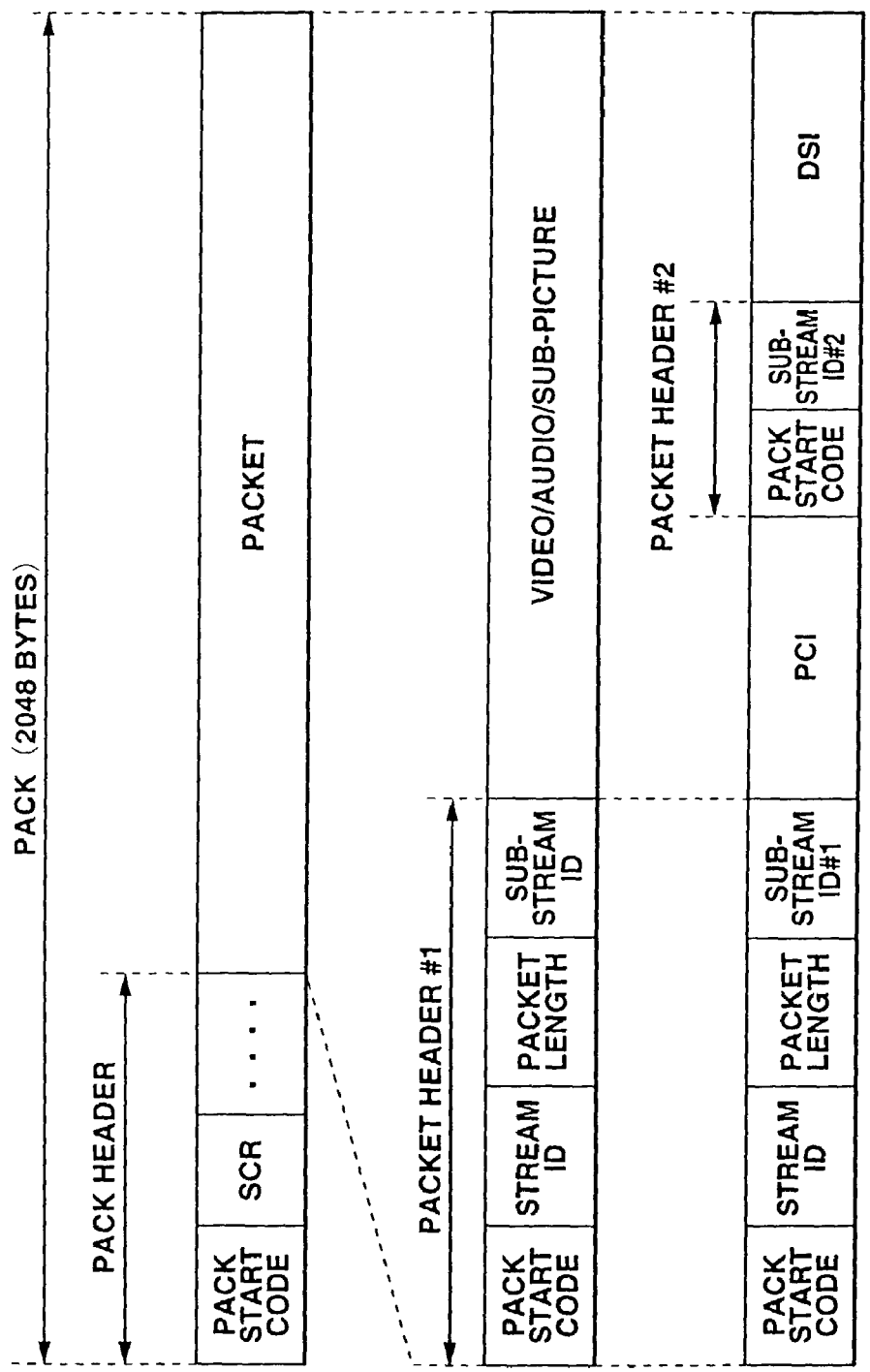

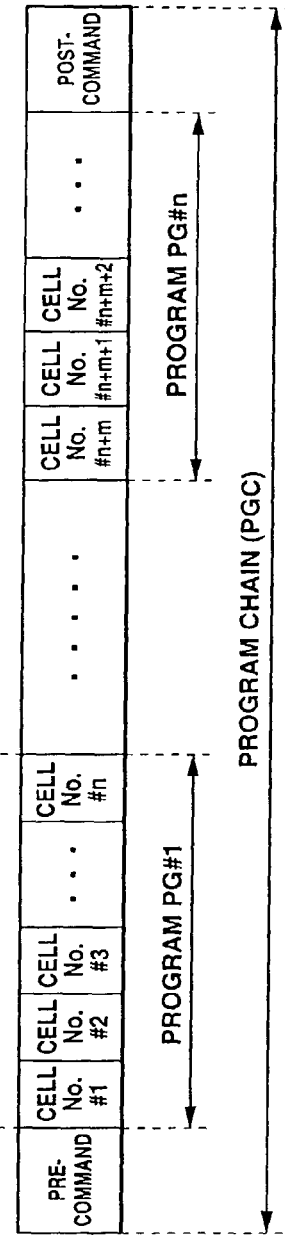

FIG.13A

REAL-TIME DATA: CELL ID #1 | CELL ID #2 | CELL ID #3 | CELL ID #4 | CELL ID #5 | CELL ID #6 | CELL ID #7 | CELL ID #8

FIG.13B

PROGRAM CHAIN#1: PRE-COMMAND | CELL No.#1 (CELL ID#1) | CELL No.#2 (CELL ID#2) | CELL No.#3 (CELL ID#3) | CELL No.#4 (CELL ID#4) | CELL No.#5 (CELL ID#5) | CELL No.#6 (CELL ID#6) | CELL No.#7 (CELL ID#7) | POST-COMMAND

PROGRAM CHAIN#2: PRE-COMMAND | CELL No.#1 (CELL ID#4) | CELL No.#2 (CELL ID#2) | CELL No.#3 (CELL ID#6) | CELL No.#4 (CELL ID#7) | CELL No.#5 (CELL ID#3) | CELL No.#6 (CELL ID#5) | CELL No.#7 (CELL ID#8) | POST-COMMAND

- PG#1: CELL No.#1 – CELL No.#2
- PG#2: CELL No.#3 – CELL No.#4
- PG#3: CELL No.#5 – CELL No.#7

FIG.13C

PROGRAM CHAIN#3: PRE-COMMAND | CELL No.#1 (CELL ID#7) | CELL No.#2 (CELL ID#3) | CELL No.#3 (CELL ID#4) | CELL No.#4 (CELL ID#2) | CELL No.#5 (CELL ID#5) | CELL No.#6 (CELL ID#8) | CELL No.#7 (CELL ID#6) | POST-COMMAND

- PG#1: CELL No.#1 – CELL No.#2
- PG#2: CELL No.#3 – CELL No.#4
- PG#3: CELL No.#5 – CELL No.#7

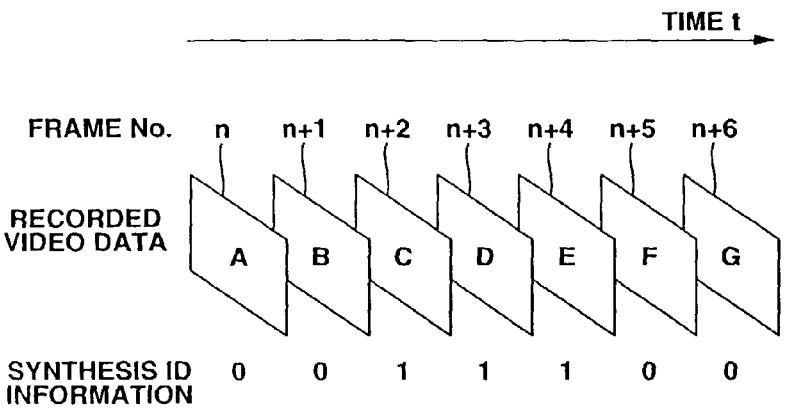
FIG.20A RECORDED VIDEO DATA
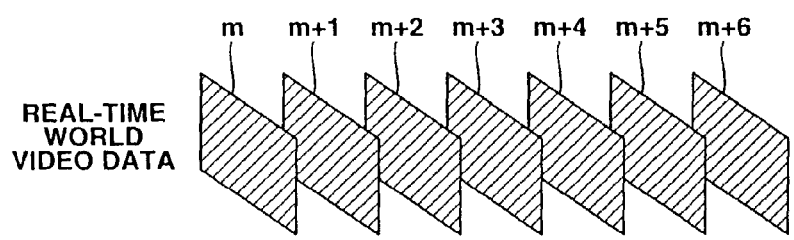
FIG.20B REAL-TIME WORLD VIDEO DATA
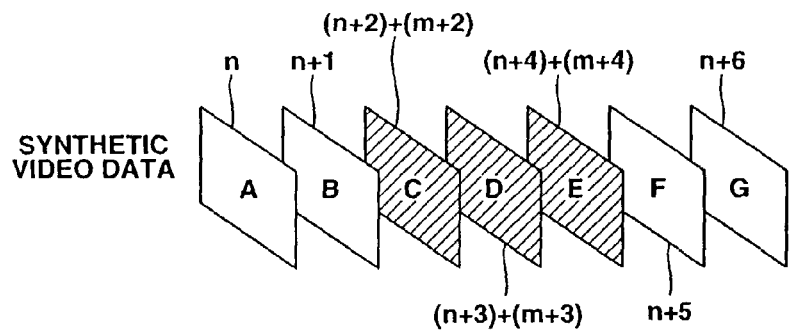
FIG.20C SYNTHETIC VIDEO DATA

FIG.21A RECORDED PICTURE
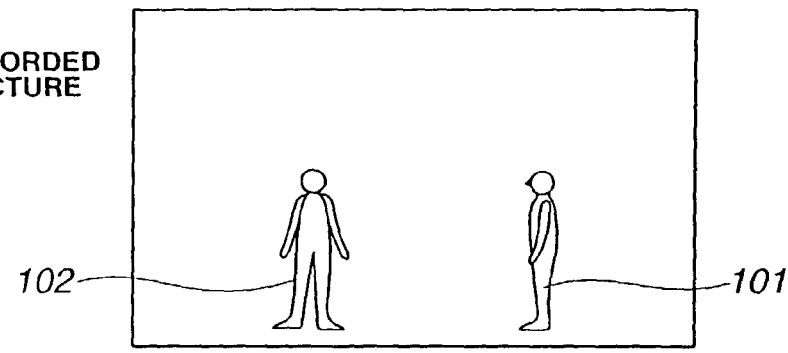
FIG.21B REAL-TIME WORLD VIEW
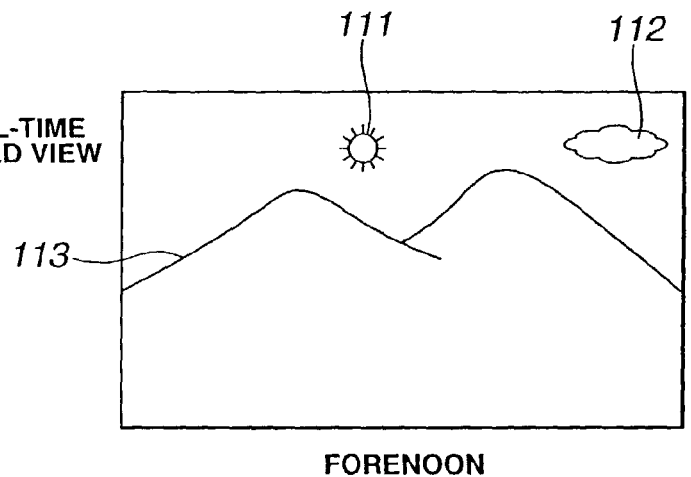
FORENOON
FIG.21C OUTPUT PICTURE
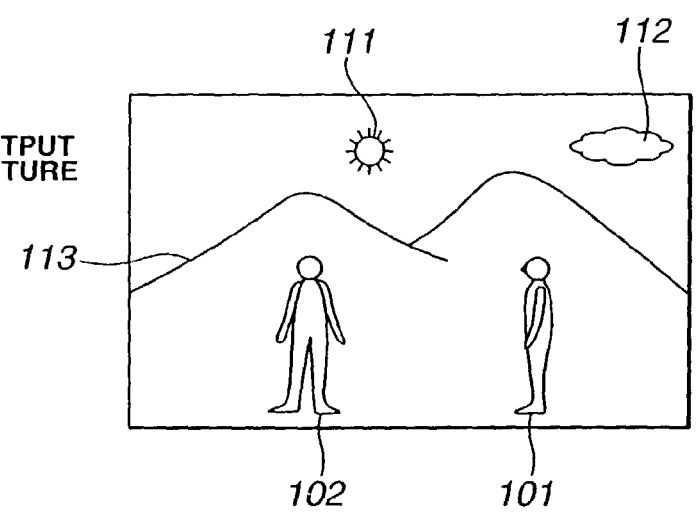

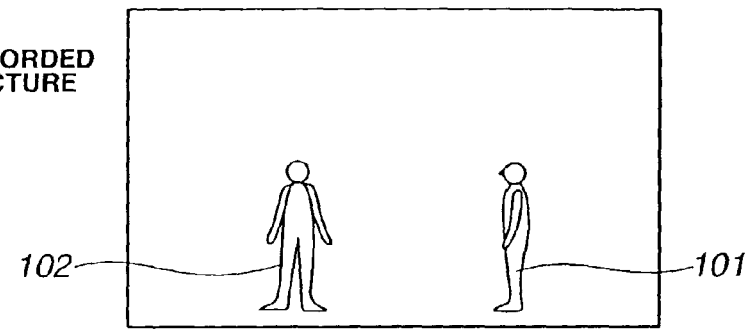
FIG.22A RECORDED PICTURE
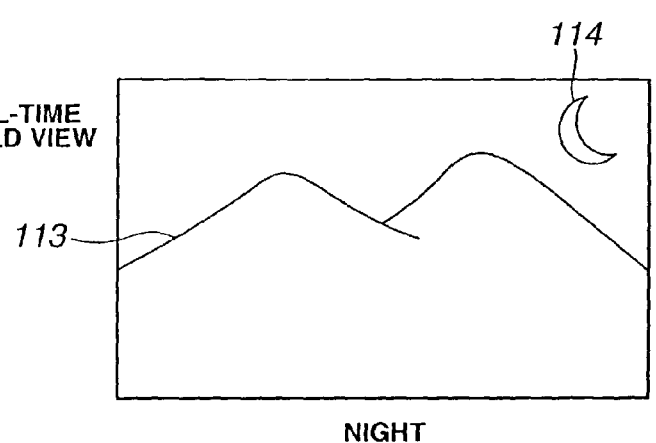
FIG.22B REAL-TIME WORLD VIEW
NIGHT
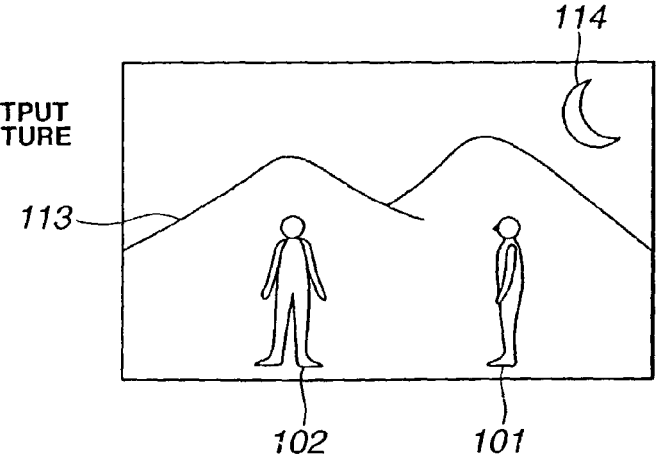
FIG.22C OUTPUT PICTURE

| INDEX INFORMATION | No. | Start | End | IMAGING CONTROL |
|---|---|---|---|---|
| | #1 | 0:00 | 5:00 | ZOOM-IN |
| | #2 | 5:01 | 12:30 | ZOOM-OUT |
| | #3 | 12:31 | 18:22 | TILT-UP |
| | ⋮ | ⋮ | ⋮ | ⋮ |
| CAPACITY INFORMATION ||||
| No.-OF-LAYERS INFORMATION ||||
| TRACK PATH DIRECTION ||||
| RECORDING START/END POSITION INFORMATION ||||
| CAMERA INTERLOCK ID FLAG ||||
| CAMERA ADDRESS ||||

FIG.31

| | No. | Start | End | KEYWORD |
|---|---|---|---|---|
| INDEX INFORMATION | #1 | 0:00 | 5:00 | SEA |
| | #2 | 5:01 | 12:30 | MOUNTAIN |
| | #3 | 12:31 | 18:22 | SEA |
| | ⋮ | ⋮ | ⋮ | ⋮ |

| CAPACITY INFORMATION |
|---|
| No.-OF-LAYERS INFORMATION |
| TRACK PATH DIRECTION |
| RECORDING START/END POSITION INFORMATION |
| CAMERA INTERLOCK ID FLAG |
| SERVER ADDRESS |

FIG.36

ADDRESS TABLE

| UNIT No. | CAMERA ADDRESS #1 | CAMERA ADDRESS #2 | CAMERA ADDRESS #3 | KEYWORD |
|---|---|---|---|---|
| 1 | 12.34.567.1 | 12.34.567.2 | 12.34.567.3 | SEA |
| 2 | 23.45.678.1 | 23.45.678.2 | 23.45.678.3 | CITY |
| 3 | 34.56.789.1 | 34.56.789.2 | 34.56.789.3 | MOUNTAIN |
| 4 | 45.67.891.1 | 45.67.891.2 | 45.67.891.3 | STREET |
| ... | ... | ... | ... | ... |

FIG.37

| INDEX INFORMATION | No. | Start | End | WEATHER INFORMATION |
|---|---|---|---|---|
| | #1 | 0:00 | 5:00 | FINE |
| | #2 | 5:01 | 12:30 | CLOUDY |
| | #3 | 12:31 | 18:22 | RAINY |
| | ⋮ | ⋮ | ⋮ | ⋮ |

| CAPACITY INFORMATION |
|---|
| No.-OF-LAYERS INFORMATION |
| TRACK PATH DIRECTION |
| RECORDING START/END POSITION INFORMATION |
| CAMERA INTERLOCK ID FLAG |
| SERVER ADDRESS |
| DISC ID |

FIG.42

CONTENTS REPRODUCING METHOD AND DEVICE FOR REPRODUCING CONTENTS ON RECORDING MEDIUM

TECHNICAL FIELD

The present invention generally relates to a content reproducing technology, and more particularly to a method of, and apparatuses for, reproducing a content recorded in a recording medium, content a recording medium, content server and a content reproducing system.

BACKGROUND ART

Recently, recording media having recorded therein contents such as movie, music, sports and the like have become widely prevalent. A consumer (will be referred to as "user" hereunder) buys such a recording medium having his or her favorite content recorded therein, and plays it in his player in the home or like to reproducing the content for viewing or listening. Also, by data communications via a communication network such as Internet, the user can instantly access various remote sites, home or abroad. Namely, while staying home for example, the user can get information in real time from such a remote site.

Thus the user can get a variety of information by playing back a recording medium or through data communications via the communication network. It is currently desired that a useful content should be produced based on information thus obtainable using such means.

DISCLOSURE OF THE INVENTION

To implement the above, the present invention has an object to permit to produce an output data based on a content such as video data, and video data, for example, having already been acquired by an information acquisition apparatus.

The above object can be attained by providing a recording medium having recorded therein a content, and link information according to which access is made to an information acquisition apparatus corresponding to the content.

Also, the above object can be attained by providing a recording medium having recorded therein a content, and output-processing identification information indicating that all or a part of data forming the content are output-processed along with data from a predetermined information acquisition apparatus.

Also, the above object can be attained by providing a recording medium having recorded therein a content, and operation control information under which operations of an information acquisition apparatus corresponding to the content are controlled.

Also, the above object can be attained by providing a recording medium having recorded therein a content, and retrieval information according to which access is made to an information acquisition apparatus corresponding to the content.

In the above recording media, the link information is intended for use to make data communications, via a communication network, with a server which manages address information of the information acquisition apparatus. Alternatively, the link information is used to make data communications with the information acquisition apparatus via a communication network. The content is composed of time-series data. In this case, the operation control information is recorded correspondingly to a segment defined by, dividing the content at each lapse of a time. The retrieval information is a keyword or weather information, corresponding to details of a content.

Also, the above object can be attained by providing a reproducing apparatus including a reproducing means for reproducing a content, a communication means for making data communications with an information acquisition apparatus capable of communications via a communication network, and a data output-processing means for producing third data based on the first data reproduced by the reproducing means and the second data supplied from the information acquisition apparatus, and outputting the third data. The data output-processing means combines together the first data and the second data to produce the third data. Also, the reproducing means reproduces a content recorded in a recording medium therein. Also, the reproducing means reproduces a content downloaded via the communication network.

In the above reproducing apparatus, the communication means is designed to make data communications with a data server capable of communications via the communication network while making data communications with the information acquisition apparatus based on an address table in which a content sent from the server and address information of the information acquisition apparatus are correlated with each other. Alternatively, the reproducing apparatus is provided with a reading means for reading, from a recording medium loaded therein, the address data in which the content and address information of the information acquisition apparatus are correlated with each other, and thus can make data communications with the information acquisition apparatus based on the address table read by the reading means from the recording medium. Alternatively, the communication means is designed to make data communications with the server capable of communications via the communication network while making also data communications with the information acquisition apparatus under the control of the data server.

In the above cases, there is provided a detecting means for detecting output-processing identification information included in a content or stored in the address table, and the data output-processing means produces third data based on first and second data according to the output-processing information detected by the detecting means. Also, there is provided a detecting means for detecting operation control information included in a content or address table, and the communication means can thus send the operation control information detected by the detecting means to the information acquisition apparatus. It is assumed that in case the content is a one composed of time-series data, the operation control information corresponds to a segment defined by dividing the content at each lapse of a time. Also, there is provided an operating means for entering address information intended for use to make data communications with the information acquisition apparatus.

When the data server retrieves the address table, the communication means sends retrieval information to the data server. The retrieval information is assumed to be ID information for a content, a keyword or weather information, corresponding to details of a content, or a current time.

Also the reproducing apparatus includes a storage means for storing the address table send from the data server when the server receives the address table. Alternatively, the reproducing apparatus includes a recording or writing means for recording, to a recording medium from which the reproducing means is going to reproduce a content, the address table sent from the server and in which a content and address information of the information acquisition apparatus are correlated with each other. In these cases, there are further provided a comparison means for making comparison between update information for the address table sent from the server and update information for the address table recorded in the storage means or in a recording medium, means for requesting the server for sending the address table, and an updating means for updating the address table recorded in the storage means or in a recording medium based on the address table sent from the server.

The reproducing means is designed to reproduce a content recorded in a recording medium loaded therein, and the communication means is to make data communications with the server when a recording medium is loaded in the reproducing means.

The communication means is designed to make data communications according to address information included in the address table before the reproducing means starts reproducing a content. Alternatively, the communication means is designed to make data communications according to address information whenever necessary depending upon a content being reproduced after the reproducing means starts reproducing the content.

Also, there are provided a time-keeping means for keeping the current time, and means for setting a pointer for the address table.

Also, the above object can be attained by providing a server including a communication means for making data communications with a reproducing apparatus capable of data communications via a communication network, a storage means having stored therein an address table in which a content reproducible by the reproducing apparatus and address information on an information acquisition apparatus capable of data communications with the reproducing apparatus via a network are correlated with each other, and a control means for retrieving the address table according to retrieval information sent from the reproducing apparatus and causing the communication means to send the retrieved address table to the reproducing apparatus. Alternatively, the above object can be attained by providing a server including, a communication means for making data communications with a reproducing apparatus capable of data communications via a communication network, a storage means having stored therein the address table in which a content reproducible by the reproducing means and address information on an information acquisition apparatus capable of data communications with the reproducing apparatus via a network are correlated with each other, and a control means for retrieving the address table according to retrieval information sent from the reproducing apparatus and controlling communications between the reproducing apparatus and information acquisition apparatus based on the retrieved address table.

In the servers constructed as above, the retrieval information is assumed to be ID information corresponding to a content, keyword or weather information, corresponding to details of a content. Also, in the address table, there are recorded operation control information under which operations of the information acquisition apparatus are controlled in correlation with address information. Also in the address table, there are recorded output-processing identification information intended for use to make output-processing of the first data reproduced by the reproducing apparatus in correlation with the address information and the second data outputted from the information acquisition apparatus.

Also, the above object can be attained by providing a reproducing method including steps of reproducing a content, making data communications with an information acquisition apparatus via a communication network, and producing the third data based on the first data reproduced in the reproducing step and the second data supplied from the information acquisition apparatus in the communication step, and outputting the third data. In the data output-processing step, the first data and the second data are combined together to produce the third data. Also, there is included a step of detecting output-processing identification information corresponding to a content, and in the data output-processing step, the third data is produced based on both the first data and the second data. Also, there is included a step of detecting operation control information corresponding to a content, and in the communicating step, the operation control information is sent to the information acquisition apparatus. It is assumed that in case the content is a one composed of time-series data, the operation control information corresponds to a segment defined by dividing the content at each lapse of a time. Also, there is included a step of entering address information intended for use to make data communications with the information acquisition apparatus. In the reproducing step, there is reproduced a content recorded in a loaded recording medium or a content downloaded via a communication network.

Also, in the communication step, data communications can be made with a server capable of communications via a communication network, and data communications are made with the information acquisition apparatus based on an address table sent from a server and in which a content and address information of the information acquisition apparatus are correlated with each other. Alternatively, there is included a step of reading, from the loaded recording medium, the address table in which a content and address information of the information acquisition apparatus are correlated with each other, and in the communication step, data communications are made with the information acquisition apparatus based on the address table read from the recording medium in the reading step. Alternatively, in the communication step, data communications can be made with the server via the communication network, and data communications are made with the information acquisition apparatus under the control of the server.

Also, the above object can be attained by providing a reproducing system in which data communications can be done between a reproducing apparatus and information acquisition apparatus, wherein the reproducing apparatus includes a reproducing means for reproducing a content, a communication means for making data communications with an information acquisition apparatus capable of communications via a communication network, and a data output-processing means for producing third data based on first data reproduced by the reproducing means and second data supplied from the information acquisition apparatus, and outputting the third data, and the information acquisition apparatus includes means for acquiring information, a communication means for making data communications with the reproducing apparatus via a communication network, and a control means for causing the communication means to send information acquired by the information acquisition means to the reproducing apparatus.

Also, the above object can be attained by providing a reproducing system in which data communications can be made among a reproducing apparatus, information acquisition apparatus and a server, wherein the reproducing apparatus includes, a reproducing means for reproducing a content, a communication means for making data communications with an information acquisition apparatus capable of communications via a communication network, and a data output-processing means for producing the third data based on the first data reproduced by the reproducing means and the second data supplied from the information acquisition apparatus, and outputting the third data; the information acquisition apparatus includes means for acquiring information, a communication means for making data communications with the reproducing apparatus via a communication network, and control means for causing the communication means to send information acquired by the information acquisition means to the reproducing apparatus; and the server includes a communication means for making data communications with a reproducing apparatus capable of data communications via a communication network, a storage means having stored therein the address table in which a content reproducible by the reproducing apparatus and address information on an information acquisition apparatus capable of data communications with the reproducing apparatus via a network are correlated with each other, and a control means for retrieving the address table according to retrieval information sent from the reproducing apparatus and causing the communication means to send the retrieved address table to the reproducing apparatus.

Also, the above object can be attained by providing a reproducing system in which data communications can be made among a reproducing apparatus, information acquisition apparatus and a server, wherein the reproducing apparatus includes a reproducing means for reproducing a content, a communication means for making data communications with an information acquisition apparatus capable of communications via a communication network, and a data output-processing means for producing third data based on first data reproduced by the reproducing means and second data supplied from the information acquisition apparatus, and outputting the third data; the information acquisition apparatus includes means for acquiring information, a communication means for making data communications with the reproducing apparatus via a communication network, and a control means for causing the communication means to send information acquired by the information acquisition means to the reproducing apparatus; and the server includes a communication means for making data communications with a reproducing apparatus capable of data communications via a communication network, a storage means having stored therein an address table in which a content reproducible by the reproducing means and address information on an information acquisition apparatus capable of data communications with the reproducing apparatus via a network are correlated with each other, and a control means for retrieving the address table according to retrieval information sent from the reproducing apparatus and controlling communications between the reproducing apparatus and information acquisition apparatus based on the retrieved address table.

According to the present invention, when reproducing a content recorded in a recording medium or a downloaded content, the reproduced data and data available from an information acquisition apparatus such as a camera can be used to produce and output an output data. For example, video data can be combined to produce a synthetic data. Thus, the present invention permits not only to reproduce a content data but to produce a variety of outputs based on data from the information acquisition apparatus.

Also, the above object can be attained by providing a signal which carries a content, and information including link information according to which a reproducing apparatus going to reproduce the content accesses an information acquisition apparatus corresponding to the content. Also, the above object can be attained by providing a signal which carries a content, and information including output-processing identification information indicating that all or a part of data forming the content are outputted from a reproducing apparatus along with data coming from a predetermined information acquisition apparatus. Also, the above object can be attained by providing a signal which carries a content, and information including operation control information under which a reproducing apparatus going to reproduce the content controls operations of an information acquisition apparatus corresponding to the content. Also, the above object can be attained by providing a signal which carries a content, and information including retrieval information according to which a reproducing apparatus going to reproduce the content accesses an information acquisition apparatus corresponding to the content.

BRIEF DESCRIPTION OF THE DRAWINGS

FIG. 6 explains examples of real-time world views taken by the cameras included in the address table in the embodiment of the present invention.

FIG. 8 explains a lead-in area of the disc in the embodiment of the present invention.

FIGS. 9A, 9B and 9C explain together a volume area of the disc in the embodiment of the present invention.

FIGS. 10A, 10B, 10C and 10D explain together a video title picture information configuration in the disc in the embodiment of the present invention.

FIGS. 11A, 11B and 11C explain together a pack configuration in the disc in the embodiment of the present invention.

FIGS. 12A, 12B and 12C explain together the relation between video object unit and cell in the disc in the embodiment of the present invention.

FIGS. 13A, 13B and 13C explain together the relation between real-time data and program chain in the disc in the embodiment of the present invention.

FIGS. 20A, 20B and 20C explain together how to combine video data in the disc drive in the embodiment of the present invention.

FIGS. 21A, 21B and 21C explain together examples of recorded picture, real-time world view and output picture in the embodiment of the present invention.

FIGS. 22A, 22B and 22C explain together examples of recorded picture, real-time world view and output picture in the embodiment of the present invention.

FIG. 31 explains imaging control information recorded in the lead-in area of the disc in the fourth embodiment of the present invention.

FIG. 36 explains the lead-in area of the disc in the seventh embodiment of the present invention.

FIG. 37 explains the address table used in the seventh embodiment of the present invention.

FIG. 42 explains the lead-in area of the disc in the ninth embodiment of the present invention.

BEST MODE FOR CARRYING OUT THE INVENTION

Figure 1:
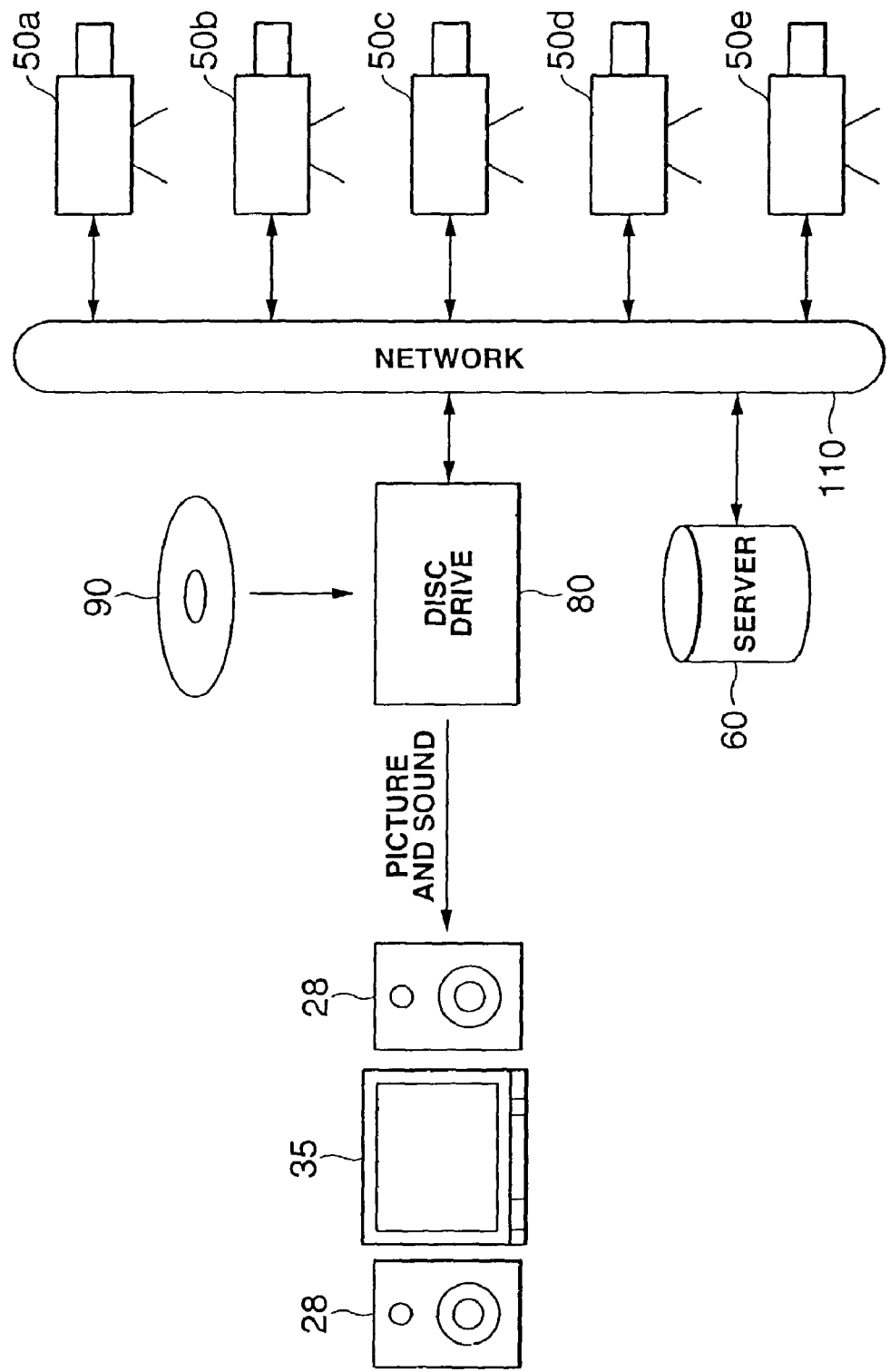
FIG. 1 is a block diagram of an embodiment of the reproducing system according to the present invention.

Embodiments of the present invention will be described in the following order:
A. First Embodiment
1. Reproducing system construction
2. Disc drive construction
3. Camera construction
4. Server and address table constructions
5. Disc format
6. Control at the time of content reproduction
7. Picture synthesis
B Second Embodiment
C. Third Embodiment
D. Fourth Embodiment
E. Fifth Embodiment
F. Sixth Embodiment
G. Seventh Embodiment
H. Eighth Embodiment
I. Ninth Embodiment
J. Tenth Embodiment
K. Applications Note that the construction and operations of the system and system components will be described in detail concerning the first embodiment and the second and subsequent embodiments will be described concerning only their differences from the first embodiment. The essentials of these embodiments and differences between them are as will be described below. The terms used in the description will be defined in the description of each embodiment.

First Embodiment

A server holds address tables. A disc drive sends a disc ID for a disc to be played to the server, and receives, from the server, an address table corresponding to the disc. The disc drive communicates with a camera based on the address table to receive a real-time world view. The disc drive combines the real-time world view with content data reproduced from the disc to produce a synthetic data.

Second Embodiment

The disc drive stores an address table received from the server in a flash memory, disc or the like, and uses the address data also in a subsequent disc reproducing. Also, the disc drive communicates with the server whenever necessary, and updates the address table stored in the flash memory, disc or the like.

Third Embodiment

A real-time world view during a time zone corresponding to details of a content to be reproduced by the disc drive.

Fourth Embodiment

Operations of the camera can be controlled according to a content to be reproduced.

Fifth Embodiment

An address table is stored into a disc. The disc drive communicates with the camera based on the address table read from the disc, is supplied with a real-time world view from the camera, combines the real-time world view with content data reproduced from the disc to produce a synthetic data.

Sixth Embodiment

The disc drive communicates with the camera based on a camera address entered or defined by the user, is supplied with a real-time world view from the camera, combines the real-time world view with content data reproduced from the disc to produce a synthetic data.

Seventh Embodiment

The server holds keyword-managed address tables. The disc drive sends a keyword to the server, and is supplied with an address table corresponding to the keyword. The disc drive communicates with the camera based on the address table, and is supplied with a real-time world view. It combines the real-time world view with content data reproduced from the disc to produce a synthetic data.

Eighth Embodiment

The server holds address tables. The disc drive sends a disc ID for a disc to be played to the server. The server retrieves an address table based on the disc ID or the like, and manages communications made between a camera in consideration and the disc drive. In this case, the address table itself is not transferred.

Ninth Embodiment

There can be provided a real-time world view of a region in weather corresponding to details of a content to be reproduced by the disc drive.

Tenth Embodiment

There is provided a reproducing apparatus which downloads and reproduces a content. A downloaded content is combined with a real-time world view to produce a synthetic data.

A. First Embodiment

1. Reproducing System Construction

Referring now to FIG. 1, there is schematically illustrated an embodiment of the reproducing system according to the present invention in the form of a block diagram. As shown, the recording medium in this embodiment is a disc 90 which is a DVD (digital versatile disc), and the reproducing apparatus is a disc drive 80. Note that the disc 90 and disc drive 80 are taken just as examples herein and the present invention is not limited to them. The disc 90 has recorded therein a content composed of time-series data (such as video/audio data like a movie or audio data like a piece or pieces of music) or a content such as still picture, game picture, map picture, text data or the like, for example. The disc drive 80 is able to play back the disc 90 loaded therein to reproduce such a content. Video signals and audio signals reproduced by the disc drive 80 are supplied to a television, for example, or more specifically, to a monitor 35 with a display and speakers 28 thereof, and outputted as reproduced picture and sound.

The disc drive 80 is also able to make data communications with cameras 50 (including cameras 50a, 50b, . . . ) via a communication network (will be referred to simply as "network" hereunder) 110, and combine a picture supplied from each of the cameras 50 with a content picture reproduced from the disc 90 to produce a synthetic picture. The network 110 may be a public telephone analog network, public telephone digital network such as ISDN (integrated services digital network) or a LAN (local area network), for example. Also, the transmission path of the network 110 may be a cable, radio wave, communications satellite or the like. Each of the cameras 50 is an information acquisition apparatus set in an arbitrary outdoor or indoor position, and thus the cameras 50 pick up various objects including, for example, natural views such as the mountain, valley, seashore, etc. and sites or spots appearing different every moment, such as the street, highway, store inside, showroom, etc. Also, the camera 50 is able to output pictures of such a view or scene by coding them by the data compression technique defined in MPEG or the like. A unique URL (uniform resource locator) is assigned to each of these cameras 50. Note that the camera 50 may be a one installed on board in a communications satellite or the like launched to orbit the Earth for the purpose of measuring topographic maps. A picture recorded in the disc 90 will be taken as first picture and referred to as "recorded picture (recorded video data)" hereunder, and a picture taken by the camera 50 will be taken as second picture and referred to as "real-time world view (real-time world video data)" hereunder. Also, a picture produced by combining first and second pictures will be taken as third picture and referred to as "output picture (output video data)" hereunder.

For combining a recorded picture and real-time world view to produce a synthetic picture, a recorded picture is reproduced in the disc drive 80, while an appropriate one of the cameras 50 is selected and a real-time world view is downloaded from the camera 50. In this case, the selected camera 50 is corresponding to a content recorded in the disc 90, for example. The correspondence or correlation between a camera to pick up such a real-time world view and a content is managed based on an address table recorded in a server 60 connected to the network 110. Namely, the disc 90 has recorded therein identification information (will be referred to as "disc ID" hereunder) according to which the disc itself or a content recorded in the disc is identified, and address information on the server 60, that is link information according to which communications are made between the disc drive 80 and camera 50. When the disc 90 is loaded in the disc drive 80 (or when a disc already loaded therein is detected with the power on), the disc drive 80 makes data communications with the server 60 according to the address information to send a disc ID to the server 60.

Correspondingly, the server 60 will send an address table corresponding to the disc ID to the disc drive 80. By making data communication with the server 60 in this way, the disc drive 80 can acquire, from the server 60, an address table corresponding to a content recorded in the disc 90. Note that to this end, the disc drive 80 may be adapted to receive, from the server 60, an address table which corresponds to one or plural specific contents to be reproduced, or to receive address tables corresponding to all contents, respectively, recorded in the disc 90.

Based on the address table sent from the server 60, the disc drive 80 makes data communications with the camera 50, combines a real-time world video data and recorded video to produce an output video data. Thus an output picture can be displayed on the monitor 35.

2. Disc Drive Construction

Figure 2:
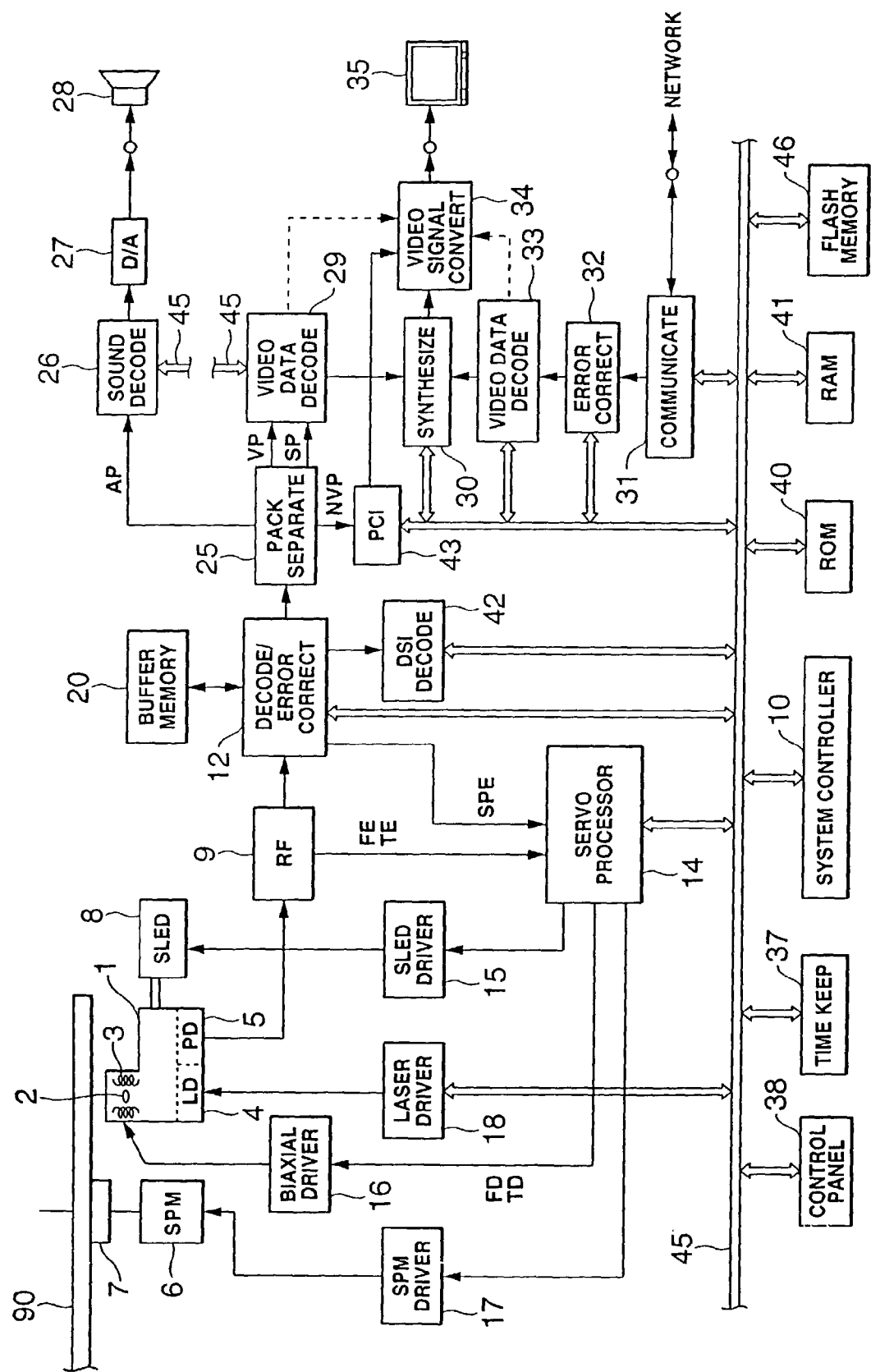
FIG. 2 is a block diagram of the disc drive in the embodiment of the present invention.

Referring now to FIG. 2, there is schematically illustrated an example construction of the disc drive 80 in the embodiment of the present invention in the form of a block diagram. Note that the disc drive 80 is able to play back an optical disc such as a DVD (digital versatile disc), CD (compact disc) or the like to reproduce data from the disc. However, the disc drive 80 will be described herein concerning a reproducing system supporting the format of a DVD-Video (digital versatile disc-Video). That is, the disc 90 has recorded therein a video data (main picture data), audio data, sub picture data and navigation data that is a control data, as a content, multiplexed in compliance with the MPEG (Moving Picture Experts Group)-2 standard, for example.

The disc 90 is placed on a tunable 7 which is rotated by a spindle motor 6 during reproducing operation. While the disc 90 is being thus rotated, pit data (phase-change pits, or organic dye change (reflectance change) pits or embossed pits) on the disc 90 are read by an optical pickup 1.

As shown in FIG. 2, the optical pickup 1 includes a laser diode 4 to emit a laser light, a photodetector 5 to detect a reflected light (return light) from a disc 90, an objective lens 2 to focus the laser light on the disc 90, and an optical system (not shown) to project the laser light onto the recording layer in the disc 90 through the objective lens 2 and guide the reflected light from the disc 90 to the photodetector 5.

The objective lens 2 is held by a biaxial mechanism 3 movably in the tracking and focusing directions. The entire optical pickup 1 is movable by a sled mechanism 8 radially of a disc. The laser diode 4 in the optical pickup 1 is driven with a drive signal (drive current) from a laser driver 18 to emit a laser light. Reflected light information from the disc 90 is detected by the photodetector 5, converted to an electrical signal of a magnitude corresponding to the detected amount of light, and supplied to an RF amplifier 9.

The RF amplifier 9 includes a current-voltage conversion circuit to convert output currents from plural photodetection elements of the photodetector 5 to voltages, matrix operation/amplification circuit which produces necessary signals by matrix operation and amplification, etc. The necessary signals include an RF signal which is a read signal, focus error signal FE and tracking error signal TE, used to make servo control, etc. From the RF amplifier 9, a read RF signal is supplied to a decoding/error-correction circuit 12, and the focus error signal FE and tracking error signal TE are supplied to a servo processor 14. The read RF signal from the RF amplifier 9 is binaries in the decoding/error-correction circuit 12, resulting in a so-called E.M. (eight fourteen modulation)+ signal, and decoding is made against the E.M.+modulation. Further, the decoded signal is subjected to CIR (cross interleaved Reed-Solomon Code) error correction to provide a reproduced data. In this way, the reproduced data subjected to decoding and error correction in the decoding/error-correction circuit 12 is provisionally stored (buffered) in a buffer 20 and then supplied to a pack separator 25. Also, the reproduced data is supplied to a DSI (data search information) decoder 42 in which DSI packets forming together a navigation pack are extracted and supplied to a system controller 10.

The servo processor 14 produces various servo drive signals for the focusing, tracking, sledding and spindle drives from the focus error signal FE and tracking error signal TE from the RF amplifier 9, and spindle error signal SPE etc. from the decoding/error-correction circuit 12. These drive signals are used to make servo operations. That is, the servo processor 14 produces a focus drive signal FD and tracking drive signal TD from the focus error signal FE and tracking error signal TE, respectively, and supplies them to a biaxial driver 16. The biaxial driver 16 will drive a focus coil and tracking coil in the biaxial mechanism 3 in the optical pickup 1. Thus, the optical pickup 1, RF amplifier 9, servo processor 14, biaxial driver 16 and biaxial mechanism 3 form together each of a tracking servo loop and focus servo loop.

Also, the servo processor 14 operates in response to a track jump command from the system controller 10 to open the tracking servo loop, and provides a jump drive signal to the biaxial driver 16, thereby causing the optical pickup 1 to jump across a track or tracks.

Further, the servo processor 14 produces a spindle drive signal based on the spindle error signal SPE and supplies it to the spindle motor driver 17. The spindle motor driver 17 applies a three-phase drive signal for example to the spindle motor 6 correspondingly to the spindle drive signal, thereby causing the spindle motor 6 to make a C.V. or CAN rotation. Also, the servo processor 14 produces a spindle drive signal based on a spindle kick/brake control signal from the system controller 10 to cause the spindle motor driver 17 to start, stop, accelerate and decelerate the spindle motor 6.

Also, the servo processor 14 produces a sled drive signal based on a sled error signal as a lowpass component of the tracking error signal TE for example and under the access operation control of the system controller 10. The sled driver 15 drives the sled mechanism 8 according to the sled drive signal. The sled mechanism 8 includes a main shaft supporting the optical pickup 1, sled motor, transmission gear, etc. (not shown). As the sled driver 15 drives the sled motor according to the sled drive signal, the optical pickup 1 is caused to sled.

Various operations of the above reproducing system and servo systems are controlled by the system controller 10 constructed of microcomputers. The system controller 10 controls each of the components of the disc drive 80 via a control bus 45 for example. For example, to reproduce a content from the disc 90 loaded in the disc drive 80, the system controller 10 controls an operation of seeking a designated address. More particularly, the system controller 10 issues a command to the servo processor 14 to have the optical pickup 1 access an address designated with the seek command, and controls the necessary circuits to make decoding/error-correction of data read from the disc 90, and demodulation of video and audio signals. Also, the system controller 10 provides various kinds of display control based on control data read from the disc 90. Further, in this embodiment, the system controller 10 is designed to control data communications with the camera 50 and server 60, and combination of recorded video data and real-time world video data for producing a synthetic data.

The system controller 10 is provided with a ROM (read-only memory) 40 and RAM (random-access memory) 41. The ROM 40 has stored therein programs to be executed by the system controller 10 as well as information required for the system controller 10 to control various operations, for example. The RAM 41 is designed to store address tables supplied from the server 60, for example.

The reproduced data provided from the decoding/error-correction circuit 12 is a data row in which there are multiplexed a video pack VP composed of compressed video data of a main picture, audio pack AP composed of compressed audio data, sub picture pack SP composed of sub picture data as a sub picture corresponding to the main picture, and a navigation pack NVP composed of navigation data as control data. The pack separator 25 separates the packs in a reproduced data supplied from the decoding/error-correction circuit 12 based on identifiers added to the packs, respectively. The audio pack AP separated in the pack separator 25 is supplied to an audio data decoder 26. The audio data decoder 26 decodes the audio pack AP as necessary to produce audio data. The audio data output from the audio data decoder 26 is converted to analog audio signals in a D/A converter 27, and supplied to a speaker 28 provided as an external device. Note that in case the audio data has been compressed by the Dolby digital system (™) or under the MPEG (Moving Picture Experts Group)—Audio standard for example, it is decoded by the audio data decoder 26 but audio data recorded by the linear PCM (pulse code modulation) technique for example and not compressed is supplied, without being decoded, to a D/A converter 27.

The video pack VP and sub picture pack SP, separated in the pack separator 25, are supplied to a video data decoder 29 which will decode the video pack VP to produce a main picture data while decoding the sub picture pack SP to produce a sub picture data. The video data decoder 29 is provided with a frame buffer memory capable of storing frame units for the purpose of decoding. Also, the video data decoder 29 is designed to extract synthesis type information added in units of frame to the main picture data for example. Based on the synthesis type information, it is determined whether recorded video data and real-time world video data should be combined for production of a synthetic video data. Picture data, main and sub, produced in the video data decoder 29 are supplied to a synthesizer 30. The navigation pack NVP separated in the pack separator 25 is supplied to a PCI (picture control information) packet decoder 43 which will extract, from the navigation pack NVP, a PCI packet forming together with the DSI packet the navigation pack NVP. The PCI packet decoded in the PCI packet decoder 43 is supplied as display control information to the system controller 10 and video data decoder 29.

As shown, the disc drive 80 includes a communication unit 31 as an interface to provide a network connection with the network 110 shown in FIG. 1. It is designed to make data communications with the camera 50 and server 60 shown in FIG. 1 via the network 110. Also, there is provided an error-correction circuit 32 designed to make error-correction of various data (real-time world video data and address table) supplied via the communication unit 31. The disc drive 80 includes a video data decoder 33 which decodes video data supplied from the communication unit 31 via the error-correction circuit 32 to produce video data. The video data decoder 33 receives real-time world video data compressed according to the video compression standard such as MPEG-2 or MPEG-1 for example from the cameras 50. Therefore, the video data decoder 33 is designed to decode video data correspondingly to a data compression standard under which the received video data has been compressed. The video data decoder 33 supplied the synthesizer 30 with video data produced by the decoding. The synthesizer 30 combines recorded video data supplied from the video data decoder 29 and real-time world video data supplied from the video data decoder 33 to produce synthetic video data. The synthesizer 30 includes a buffer memory to hold video data to be combined for synthesis. Note that the synthesis operations of the synthesizer 30 will be described in detail later.

The synthetic video data from the synthesizer 30 is supplied as a video data output to a video signal converter 34. The video signal converter 34 converts the received video data to an NTSC (National Television System Committee) or PAL (phase alteration by line) signal. It should be noted that to output only an picture reproduced from the disc 90, the recorded video data supplied from the video data decoder 29 should be supplied to the video signal converter 34, not via the synthesizer 30 as indicated with a dashed line in FIG. 2. Thereby, a content such as a movie recorded in the disc 90 can be reproduced normally.

The disc drive 80 further includes a time keeper 37 which keeps the current time in a region where the disc drive 80 is in use, for example. The disc drive 80 is provided with a control panel 38 as well. The control panel 38 is used as a user's interface to The system, and includes controls operated by the user when causing the reproducing system to start and stop reproduction of a content, for example. A control command entered by the user operating a corresponding control is supplied from the control panel to the system controller 10 which will control a corresponding controlled object according to the control command supplied from the control panel 38. The disc drive 80 includes also a flash memory 46 to store information which should not be lost even when the power is turned off. Such information includes, for example, various settings and factors required for the system controller 10 to make control operations. Also, the flash memory is usable to store address tables, which will be described in detail later concerning each of the embodiments.

As above, the disc drive 80 in this embodiment combines a recorded picture reproduced from the disc 90 and a real-time world view taken by the camera 50 to produce a synthetic picture, and outputs the synthetic picture as output video data to the monitor 35 or the like.

Note that the disc drive 80 having been described with reference to the block diagram in FIG. 2 is constructed to decode a compressed video data and then produce a synthetic picture but it may be designed to decode video data having been synthesized while being coded by coding each object with the object coding technique adopted in MPEG-4 for example. Also, video data reproduced from the disc 90 and video data supplied from the camera 50 are handled herein as compressed video data but they may be ones not coded by compression in some cases.

3. Camera Construction

Figure 3:
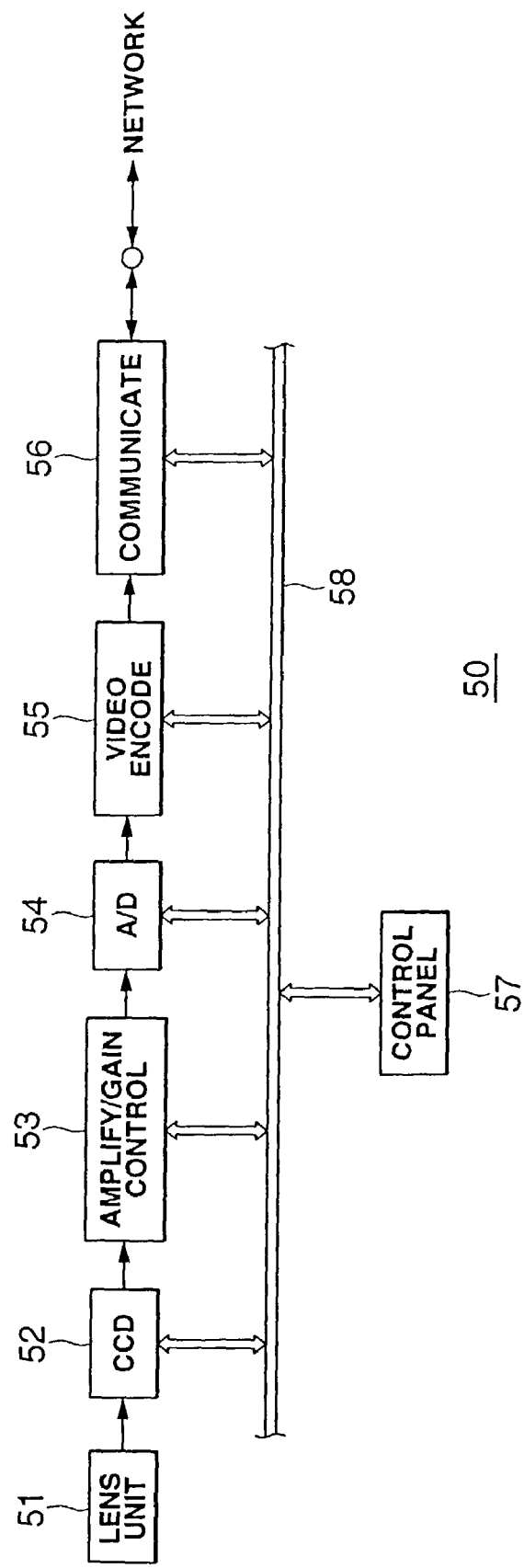
FIG. 3 is a block diagram of the camera in the embodiment of the present invention.

Referring now to FIG. 3, there is schematically illustrated an example construction of the camera 50 in the embodiment of the present invention in the form of a block diagram. As shown, the camera 50 includes a lens unit 51 to pick up the previously mentioned view or scene as an object picture (real-time world view). Rays of light defining an picture, passing through the lens unit 51, are incident upon a CCD (charge-coupled device) 52 which is a light-electric converting element. The CCD 52 is provided for each of three primary colors including R, G and B for example. Pixels corresponding to such colors are disposed regularly on the plane of the CCD substrate, upon which the picture-forming rays of light passing through the lens unit 51 are incident, to define a two-dimensional imaging area.

Since an electric signal corresponding to a charge read from the CCD 52, that is, to a charge developed by the rays of light from the object, is very weak, it is supplied to a amplifier/gain controller 53 where it will be amplified. Then, the amplified signal is sampled and held, then controlled in gain, and supplied as an output to an A/D converter 54. The A/D converter 54 converts the input analog signal to a digital data, and supplies the digital data to a video encoder 55 in which it is coded. The coding technique used herein is the compression technique defined in MPEG-2 or the like for example. The camera 50 includes also a communication unit 56 as an interface to make data communications with the disc drive 80 via the network 110 shown in FIG. 1. The communication unit 56 receives access request information from the disc drive 80, and sends real-time world video data coded by the video encoder 55.

As shown, the camera 50 includes also a controller 57 is constructed from a microcomputer for example. The controller 57 controls the entire camera via a control bus 58. For example, it controls the timing for synchronism among acquisition of picture-defining rays of light in the CCD 52, AID conversion in the A/D converter 54 and data coding in the video encoder 55, for example. Also, when reception of access request information to the camera 50 has been detected, the controller 57 controls the communication unit 56 to send a video data coded by the video encoder 55. Further, the controller 57 controls the lens drive system in the lens unit 51 to make focusing and iris control.

4. Server and Address Table Constructions

Figure 4:
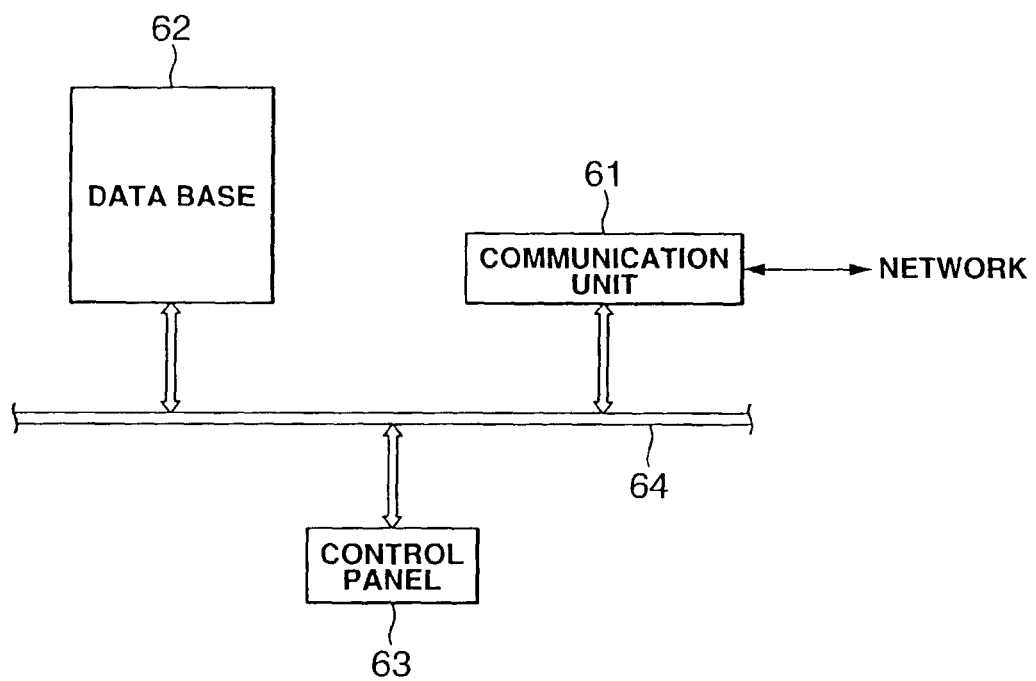
FIG. 4 is a block diagram of the server in the embodiment of the present invention.

Referring now to FIG. 4, there is schematically illustrated an example construction of the server 60 in the embodiment of the present invention in the form of a block diagram. As shown, the server 60 includes a communication unit 61 which makes data communications with the disc drive 80 via the network 110, a data base 62 having recorded therein address tables correlated with various disc ids for example, and a controller 63 which controls communications with the network 110 via a control bus 64 and manages the data base 62. For example, when the server 60 has received a sending request and disc ID from the disc drive 80, the controller 63 provides a control to retrieve an address table corresponding to the disc ID from the data base 62 and send the address table to the disc drive 80. Thus, the communication unit 61 sends the address table to the disc drive 80 having sent the sending request to the server 60.

Figure 5:
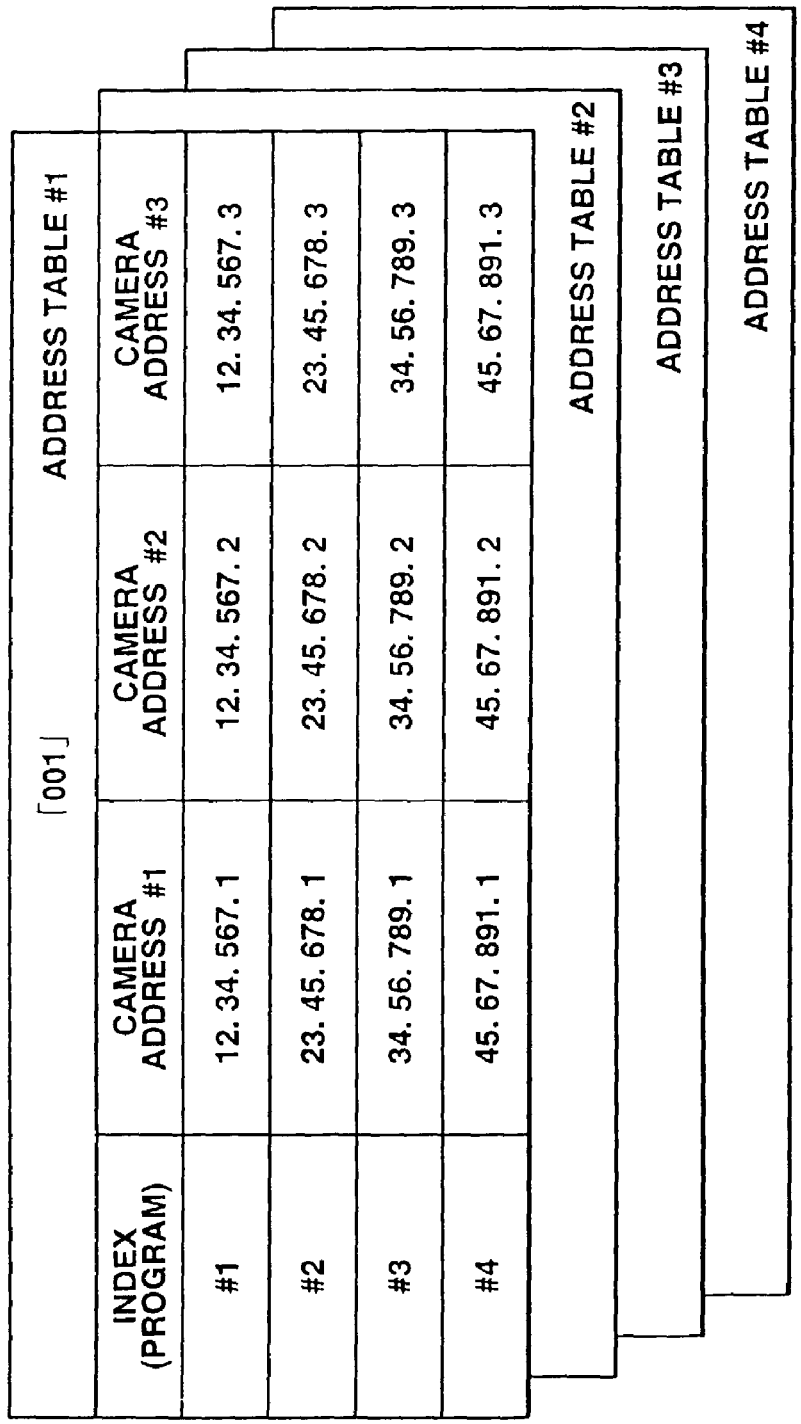
FIG. 5 explains an address table managed by the server in the embodiment of the present invention.

FIG. 5 is an explanatory illustration of an example construction of the address tables managed by the server 60 in the embodiment of the present invention. As above, the data base 62 has recorded therein address tables correlated with disc IDS for example. FIG. 5 illustrates, as a typical example, an address table #1 corresponding to a disc ID [001]. As shown, each of the address tables #1, #2, . . . has stored therein index information corresponding to one content or one of segments defined by dividing one content at each lapse of a time for example (will be referred to as "program", "chapter", "scene" or the like in this embodiment), and address information on a camera 50 corresponding to the index information. In the address table #1, address information on the camera 50 on the network 110 is correlated with index information corresponding to a content or a program, chapter, scene or the like in the content as shown in FIG. 5. This address table is a piece of information preset (or set at a time later than the preparation of a content) correspondingly to the details of a content to be recorded to the disc 90 for example in the course of the content preparation.

As shown, in the address table #1, three pieces of camera address information (#1, #2 and #3) correspond to pieces of index information #1, #2, #3 and #4, respectively. It is assumed herein against any situation in which the cameras 50 cannot make data communications with the disc drive 80 (for example, a trouble such as a system busy or fault) that the camera address information pieces correspond to three cameras 50 taking the same real-time world view. That is to say, in case the index information #1 is designed for reproduction of a content at the disc drive 80 for example, it suffices that the disc drive 80 can communicate with any one of the three cameras 50. It should be noted that three cameras 50 are not always disposed for picking up the same real-time world view. Therefore, camera address information will be prepared correspondingly to cameras 50 in use.

By preparing the above address table #1 to correlate index information and camera address information with each other, any of camera addresses "12.34.567.1", "12.34.567.2" and "12.34.567.3" will correspond to details of a content to be recorded to the disc 90, corresponding to the index information #1, and any of camera addresses "34.56.789.1", "34.56.789.2" and "34.56.789.3" will correspond to details of the content, corresponding to the index information #3. After an address table is sent to the disc drive 80 for reproduction of a content, a pointer for the address table will be set in the disc drive 80 as will be described in detail later, thereby selecting any camera address.

When the index information #1 is designated, the disc drive 80 will make, according to the camera address "12.34.567.x", data communications with the camera 50a picking up the view of a city as shown in FIG. 6. Similarly, when the index information #2 is designated, the disc drive 80 will make, according to the camera address "23.45.678.x", data communications with the camera 50b picking up the view of a street. Also, when the index information #3 is designated, the disc drive 80 will make, according to the camera address "34.56.789.x", data communications with the camera 50c picking up the view of the sea. Further, when the index information #4 is designated, the disc drive 80 will make, according to the camera address "45.67.891.x", data communications with the camera 50d picking up the view of mountains. That is, based on the address table shown in FIG. 5, the disc drive 80 will be supplied with real-time world views in the order of city, street, sea and mountains to reproduce a content.

Also, the data base 62 has recorded therein address tables #2, #3, #4, . . . in addition to the address table #1 as shown in FIG. 5, and an address table is selected to a disc ID sent from the disc drive 80.

As above, the server 60 intensively manages address tables corresponding to various discs 90 available in the market. Thus, the address tables managed in the server 60 can be reflected on the discs 90 via the network.

5. Disc Format

Figure 7:
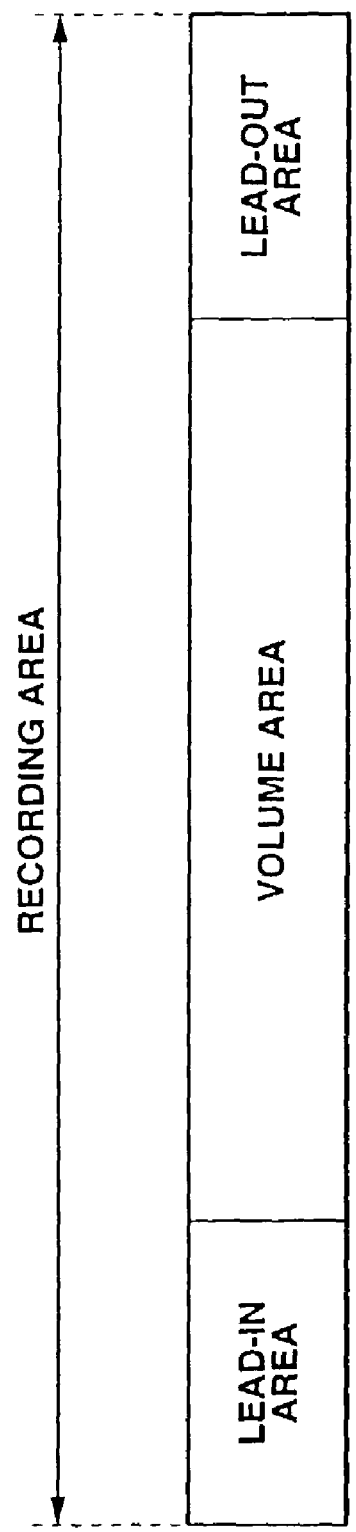
FIG. 7 explains a recording area formed in the disc in the embodiment of the present invention.

Referring now to FIG. 7, there is schematically illustrated a recording area formed in the disc 90 in the embodiment of the present invention. In the recording area of the disc 90, there are formed a lead-in area, volume area and a lead-output area.

As shown in FIG. 8 for example, in the lead-in area, there is recorded a variety of information (including TOC (table of contents) etc.) to be supplied to the disc drive at the start of playing back the disc 90. The information includes index information composed of start and end times as segmental information (program, chapter or scene) of a content recorded in the disc, and information on the capacity of the disc 90, information on the number of recording layers (1 layer or 2 layers) of the disc 90, track path direction information (parallel or opposite), recording start/end position information in the volume area indicated with a sector number for example, disc ID for identification of the disc, etc. Further in this embodiment, the information includes camera interlock identification information indicating whether a content recorded in the disc 90 is interlocked with a real-time world view supplied from the camera 50, server address information on the server 60 in which an address table corresponding to the disc 90 is recorded, etc.

The volume area is composed of a volume management area, video area and other areas as necessary, as will be described below with reference to FIG. 9. The lead-out area is intended to inform the disc drive 80 of the end of content reproduction.

FIG. 9 explains each of areas formed in the volume area of the disc 90 in the embodiment of the present invention. As shown in FIG. 9A, the volume area is composed of a volume management area in which management information for the entire volume area is recorded, a content such as a movie for example, and a video area in which a variety of control information corresponding to the content area is recorded.

The volume management area has stated therein management information based on the universal disc format (UDF), enabling a computer to access a content recorded in the video area. The video area is composed of a video manager (VMG), and one or more video title sets (VTS).

As shown in FIG. 9B, the video manager (VMG) is composed of vide manager information (VMGI), video object set for VMG menu (VMGM_VOBS), and backup-use video manager information (VMGI_BUP). The video manager information is control information for use to display a volume menu in which there is indicated information on the contents of one or more video title sets VTS #1, VTS #2, VTS #3, . . . . The video object set for VMG menu (VMG M_VOBS) includes a video object set (VBOS) for use to display the volume menu. It should be noted that the video object set is an information unit consisting of a video object unit (VOBU)

formed by reproduced data (video and audio) whose duration is about 0.5 to 1.0 sec. The video object unit (VOBU) will be described in detail later. Next to the video object set for VMG menu (VMGM_VOBS), there is recorded by the backup-use video manager information (VMGI_BUP) of which the contents are the same as those of the aforementioned video manager information.

The smallest unit of the video title set shown in FIG. 9A corresponds to a content in consideration, for example, one movie. Therefore, in case only a single movie is recorded as a content in the disc 90, at least one video title set will be recorded in the VTS area. Also, the VTS area can record a total of 99 video title sets. It should be noted that also in this embodiment, a program, chapter, scene or the like is used as a unitary segment of the video title set.

FIG. 9C shows the contents of each video title set. Video title set information (VTSI) is control information for the video title set (VTS). In the video title set, video title set for the VTS menu (VTSM_VOBS) is composed of a video object set for display of a title menu formed to display the contents of the video title set. Video title set for title in a VTS (VTSTT_VOBS) is composed of a video object set for use to reproduce the video title set. In the video title set, the VTSTT_VOBS is followed by a backup-use video title set information (VTSI-BUP) having the same contents as those in the above video title set information (VTSI).

FIG. 10 explains the configuration of the video title picture information in the disc 90 in the embodiment of the present invention. As shown in FIG. 10A, the VTSTT-VOBS is composed of one or more video objects (VOB #1 to #n). Further, on video object is composed of more than one cell as shown in FIG. 10B. These cells are units of reproduction to which unique identification information (ID #1, #2, #3, . . . ) are added, respectively, as real-time data. As shown in FIG. 10C, each cell includes two or more video objects units (VOBU). That is, the video object unit is managed in cells. Further, as shown in FIG. 10D, the video object unit is composed of four types of packs including a navigation pack NVP, video pack VP, audio pack AP and a sub-picture pack SP. Each cell has a navigation pack NVP placed a the top thereof, and includes an integral number of groups of pictures (GOP) each including a video pack VP, audio pack AP and a sub-picture pack SP in this order.

The navigation pack NVP is composed of presentation control information (PCI) for controlling reproduction of video and audio data in the video object unit, and data search information (DSI) for use to search data. The video pack VP is a main picture data, for example, packed video data compressed by the data compression technique defined in MPEG or the like for example. The sub-picture pack SP is auxiliary information to the main picture data as the video pack VP. Namely, it is a packed video data which adds a caption etc. for example to the main picture. The audio pack AP is a packed audio data.

FIG. 11 explains the pack configuration. As shown, one pack is composed of a pack header and packet. It is a data unit defined as one logical block in the disc 90, and has a data length of 2048 bytes. The pack header has stated therein a pack start code, system clock reference (SCR), etc. The pack start code indicates the start of a pack. The system clock reference is synchronous with a reproduced data, and indicates a time taken for data reproduction by the entire disc drive 80.

FIG. 11B shows the configuration of a packet in the video pack VP, sub-picture pack SP and audio pack AP. The packet header is composed of a packet start code indicative of the start of a packet, stream ID indicating the type of data to be recorded to a packet, packet length and sub-stream ID. Therefore, the stream ID has recorded therein identification information indicating which the data recorded in the packet is, video, sub-picture or audio. Also, stuffing bytes (dummy data) are inserted in the video pack VP for example whenever necessary. Stuffing byte length information is recorded in the packet header in this case.

Also, the navigation pack NVP has PCI and DSI recorded in divisions, respectively, of one packet therein as shown in FIG. 11C. That is, in case the stream ID includes identification information indicating a navigation pack NV, packet headers #1 and #2 are formed in the packet. In this case, the sub-stream ID #1 has recorded therein identification information indicating that a packet #1 has PCI recorded therein, and also the sub-stream ID #2 has recorded therein identification information indicating that the sub-stream ID #2 has DSI recorded therein.

FIG. 12 explains the relation between video object unit and cell in the disc 90 in the embodiment of the present invention. As previously mentioned, the video object units VOBU #1, VOBU #2, . . . shown in FIGS. 12A and 12B are managed per cell. As shown in FIG. 12C, more than one cell are managed as programs PG #1, . . . , PG #n. Further, a succession of such programs PG can be managed as a program chain PGC. In a movie for example, the program PG is one of parts of a content, defined by dividing the content along the story of the movie. It is also called a "chapter". In this embodiment, it is also called a "scene". Further, the program chain PGC includes, in addition to the programs PG, a pre-command which is to be executed before the first cell is reproduced, and a post-command which is to be executed after the last cell is reproduced.

In the program chain PGC, an order of reproduction of the cells forming the program PG is designated. To manage the order of cell reproduction, each of the cells is numbered separately from identification information unique to the cell (dell ID). That is, in the program PG #1 for example, the cells forming this program are numbered #1 to #n as shown in FIG. 12C, and they will be reproduced in that order.

Management information about the program chain, such as record position information on the video object units managed in the program chain, is managed according to the video title set information shown in FIG. 9C. Therefore, in case the disc drive 80 reproduces a video title set, it will arrange the cells as managed in the program chain with reference to the video title set information.

FIG. 13 explains the relation between real-time data and the cells included in the program chain. FIG. 13A shows a sequence of cells as real-time data (ID #1, ID #2, ID #3, . . . ). For example, in case a content recorded to the disc 90 is one movie and one video title set is managed in one program chain PGC #1, the cells will be reproduced in their order of recording in the disc 90, namely, in the same sequence as the cell IDS, as shown in FIG. 13B. Therefore, in the sequence of reproduction, the cell ID agrees with the cell number. In case a plurality of contents different in story from each other are recorded in one video title set, the programs PG are managed in different program chains PGC #2 and PGC #3, respectively, as shown in FIG. 13C. In this case, each of the program chains PGC #2 and PGC #3 has arranged in their order of reproduction therein the cells which are to be reproduced correspondingly to the programs PG. For example, in the program chain PGC #2 for example, the cell IDS are arranged in the order of "#4", "#2", "#6", "#7", "#3", "#5" and "#8", and in the program chain PGC #3, the cells IDS are arranged in the order of "#7", "#3", "#4", "#2", "#5", "#8" and "#6".

Figure 14:
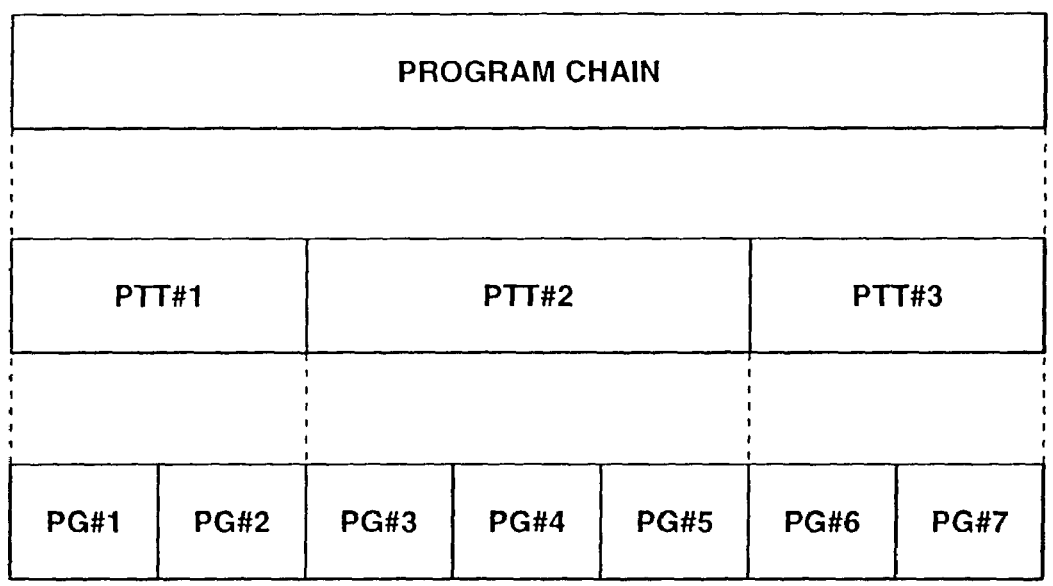
FIG. 14 explains the part of titles in the disc according to the present invention.

Further, as shown in FIG. 14, the programs including in the program chain PGC can be managed in units of part of title (PTT). In this case, a PTT number is added to each program, and with an operation by the user, access (for reproduction or program location) is made to an program according to the PTT number.

As above, the programs chain and cells can be managed to freely set a time-segmented configuration of the video title set and order of segment reproduction. Thus, a parental level and angle of reproduced picture can be selected per program and per cell. Also, in case the content is a movie, a process of its story can be selected.

6. Control at Time of Content Reproduction

Figure 15:
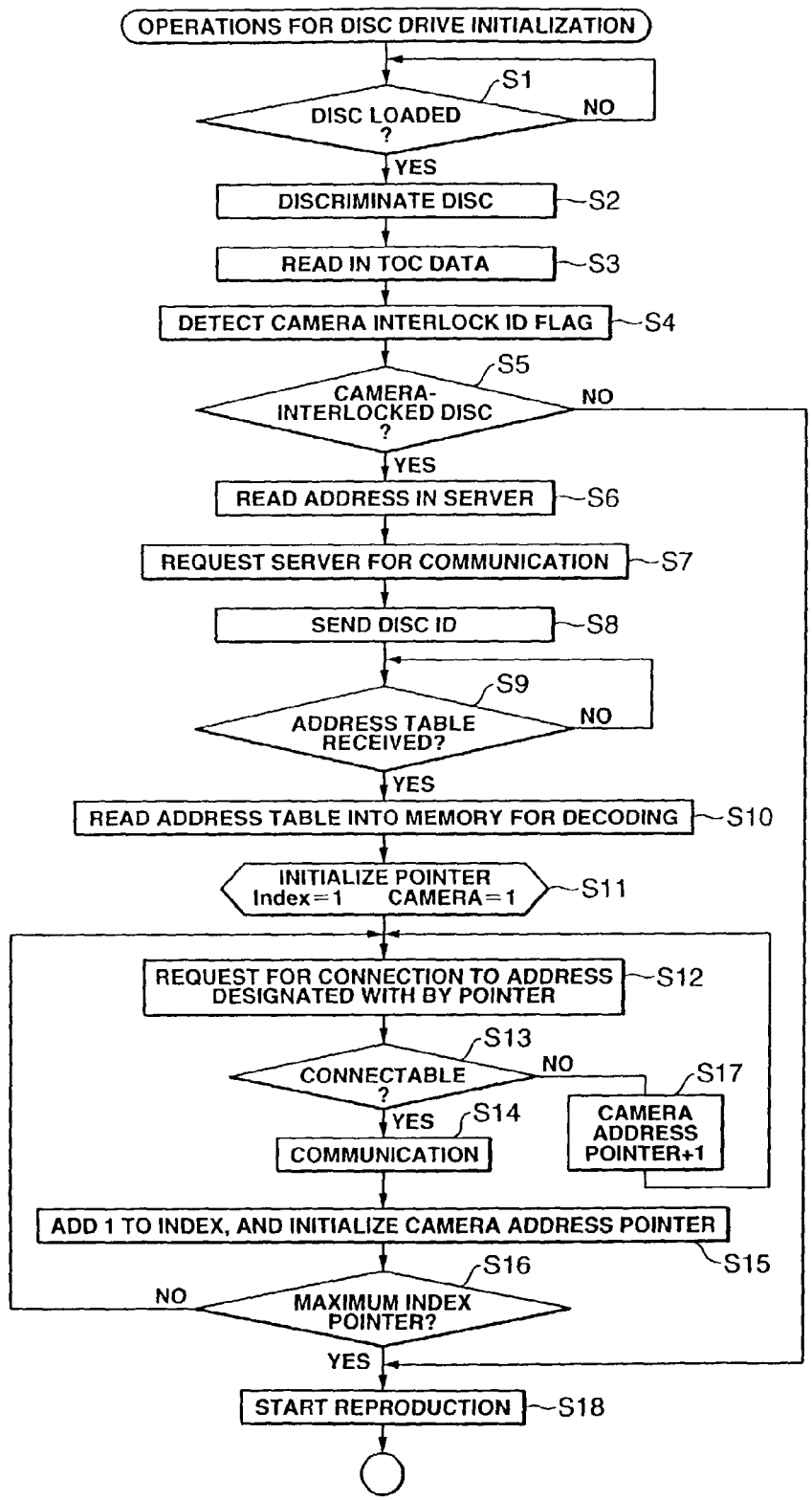
FIG. 15 shows a flow of operations made in first embodiment of the disc drive in the embodiment of the present invention.

Referring now to FIG. 15, there will be described an example of the procedure including disc discrimination and address table acquisition as initial operations to be made with the disc 90 loaded in the disc drive 80, subsequent operations done by the system controller 10 for connecting to the cameras, etc.

First, the system controller 10 judges, in step S1, whether the disc 90 is loaded or whether the disc 90 is already loaded when the power is turned on). Then in step S2, the system controller 10 discriminates the type of the loaded disc 90 (DVD, CD, CD-ROM or the like). In the initial operation after the disc loading, TOC (table of contents) is read for example. In this case, the spindle, focus and tracking servos are put into action for setting them so that data can be read. That is, each of the servos is set based on the servo characteristic of each type of disc. Therefore, when the servos are set, it becomes possible to discriminate the type of a loaded disc based on the servo characteristic of the disc.

Next to the disc discrimination in step S2, the system controller 10 reads TOC in step S3, and detects a camera interlock identification flag in step S4. Then, the system controller 10 goes to step S5 where it will judge based on the detected camera interlock identification flag whether the disc 90 is a one interlocked with the camera. When the result of judgment is that the disc 90 is such a disc, the system controller 10 goes to step S6 where it will detect address information, recorded in TOC, about the server 60, and then goes to step S7 where it will cause the communication unit 31 to make a request for connection to the server 60 to start data communications with the server 60. It should be noted that in case the disc 90 is not a one interlocked with the camera, no communications with the server 60 and camera 50 will be made but the disc drive 80 will independently reproduce data from the disc 90 in steps S5 to S18.

After having started the data communications with the server 60, the system controller 10 goes to step S8 where it will first send disc ID to the server 60. Then it goes to step S9 where it will judge whether an address table has been received from the server 60 in response to the send disc ID. That is, the system controller 10 will wait for arrival of an address table. When the result of judgment is that an address table has been received, the system controller 10 goes to step S10 where it will store it into the RAM 41 and decode it. It should be noted that when the address table has been received, the system controller 10 will terminate the data communications with the server 60 but it will continuously make data communications with the server 60 in some cases.

Figure 16:
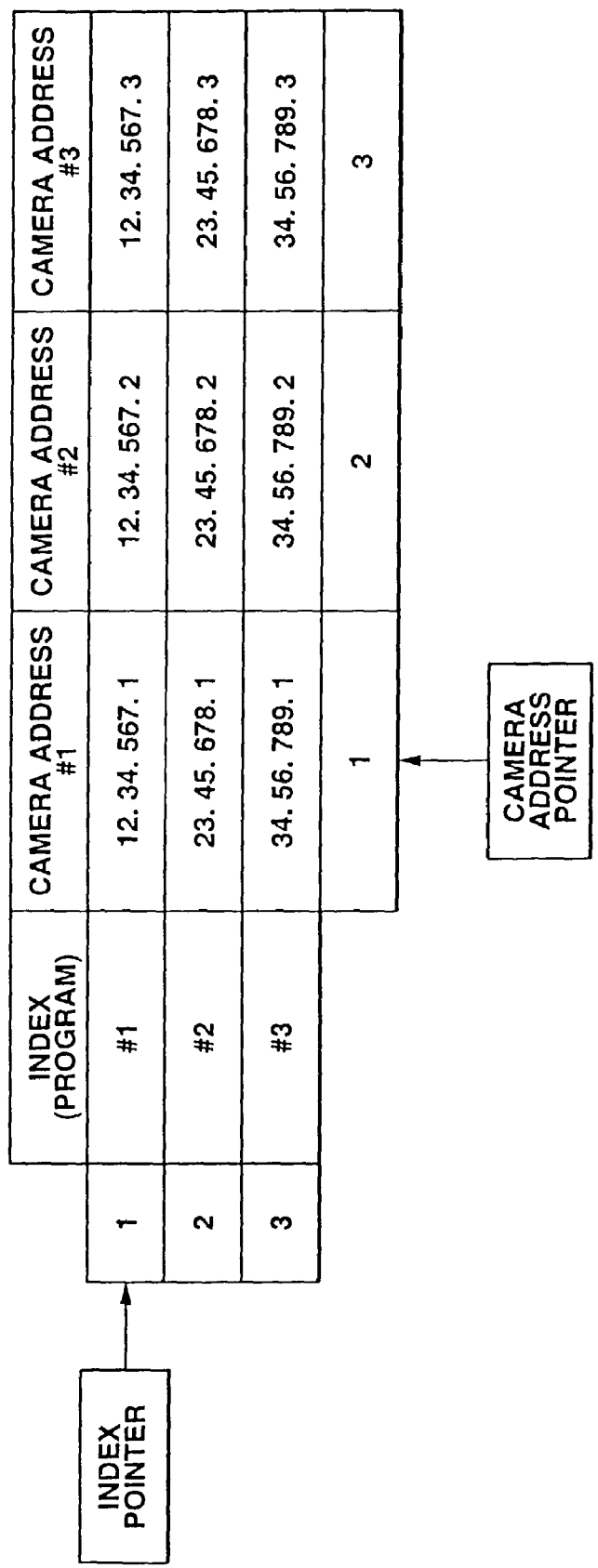
FIG. 16 explains the pointers corresponding to the address table in the embodiment of the present invention.

Next in step S11, the pointers for the address table (index pointer and camera address pointer) is initialized in the RAM 41. For example, the pointers are set to have initial values of "1" and "1", respectively, as shown in FIG. 16 for example. In this case, the camera address is set to "12.34.567.1". After completing this pointer initialization, the system controller 10 goes to step S12 where it will cause the communication unit 31 to make a request for connection to a camera whose address is designated with the camera address pointer. Then, it goes to step S13 where it will judge, based on a response from the camera with which the request has been made for connection, whether the connection to the camera, or data communication with the camera, is currently possible.

When the result of judgment is that communication with the camera to which it is connected is possible, the system controller 10 goes to step S14 where it will start data communications with the camera. Also, when the result of judgment is that no communication with the camera to which the request has been made for connection in step S12 is possible, the system controller 10 goes to step S17 where it will increment the camera address pointer, and returns to step S12 where it will make a request for connection to a camera whose address is designated with the updated camera address pointer. That is, the system controller 10 selects a next camera picking up the same view and makes a request for connection to the camera. When the result of judgment is that communications with the camera are possible, the system controller 10 goes to step S14 where it will start data communications with the camera.

Next, the system controller 10 goes to step S115 where it will increment the index pointer while initializing the address pointer. Then it goes to step S16 where it will judge whether the incremented index pointer is the largest value in the address table. When the result of judgment is that it is not the largest one, the system controller 10 returns to step S12 where it will make a request for connection to a camera whose address is designated with the pointer having been updated in step S15. That is, a camera corresponding to a next index (scene or the like) is selected by incrementing the index pointer. Also in this case, when the result of judgment is that no communications with the camera to which the system controller 10 has been connected in step S12, the system controller 10 goes to step S17 where it will increment the address pointer, and returns to step S12 where it will make a request for connection to a camera whose address is designated with the updated pointer. A next camera picking up the same view for example is selected in this way.

As above, the system controller 10 makes a request for connection to a camera whose address is shown in the address table. When it has been judged in step S16 is that the index pointer has the largest value, namely, that a request for connection to a camera has been made as to all indexes, the system controller 10 goes to step S18 where a content will be reproduced.

Note that the connection to all cameras for data communications, made before shifting to the content reproduction, has been described in the above with reference to the flow chart in FIG. 15. It should be noted however that the connection to the cameras may be done by discriminating a scene (program or chapter) whenever necessary after starting the content reproduction and making a request for connection to a camera picking up the scene, for example.

Figure 17:
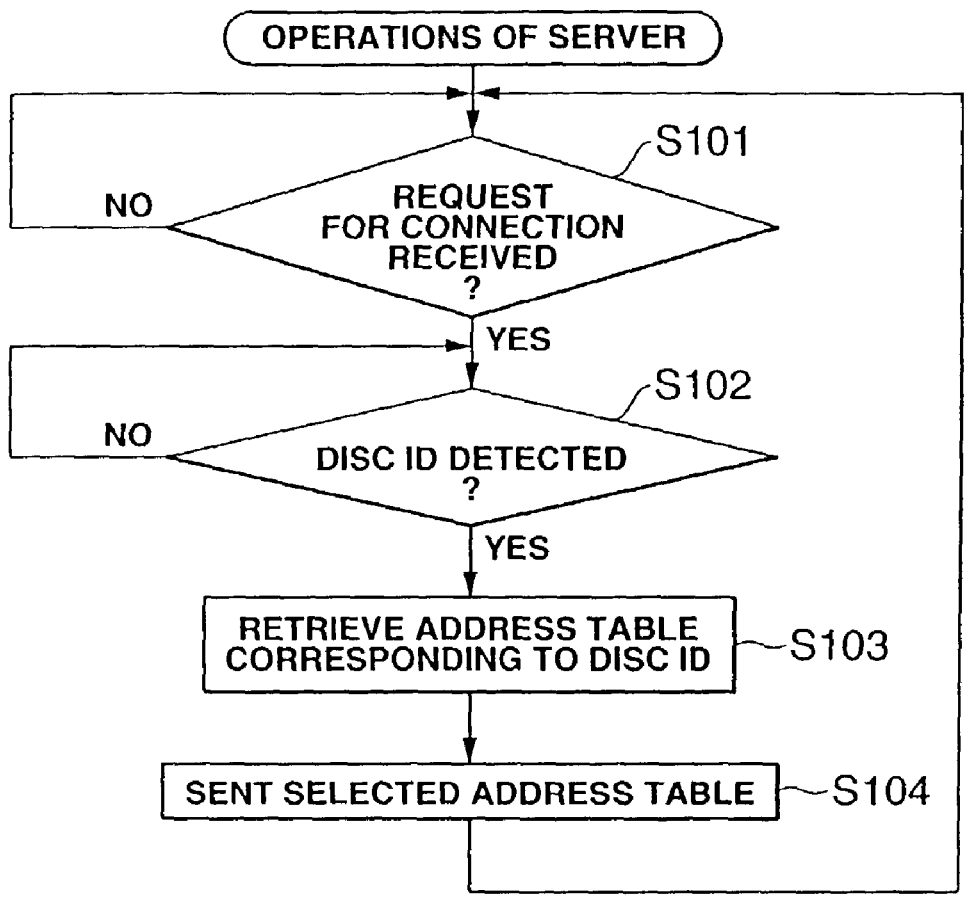
FIG. 17 shows a flow of operations made in the server in first embodiment of the present invention.

FIG. 17 is a flow chart explaining an example of the procedure including operations made by the controller 63 in the server 60 when the disc drive 80 operates as in steps S7 and S8 shown in FIG. 15. In step S101, the server 60 waits for a result of judging whether it has been requested for connection from the disc drive 80 via the network 110 while the server 60 is in operation. When the result of judgment is that the connection request has arrived at the server 60, the controller 63 goes to step S102 where it will cause the server 60 to start data communications with the disc drive 80 having sent the connection request and judges whether the server 70 has received a disc ID sent from the disc drive 80. When the result of judgement is that the server 60 has received the disc ID, the controller 63 goes to step S103 where it will retrieve an address table corresponding to the detected disc ID from the data base 62. Further, the controller 63 goes to step S104 where it will control the communication unit 61 to send the selected address table towards the disc drive 80 from which it has received the connection request. This is a response to the disc drive 80 which has made the connection request to the server 60. After sending the address table, the controller 63 terminates the communication with the disc drive 80 having made the connection request to the server 60. Thus, the disc drive 80 will be able to acquire the address table through the operations in steps S9 and S10 in FIG. 15.

Figure 18:
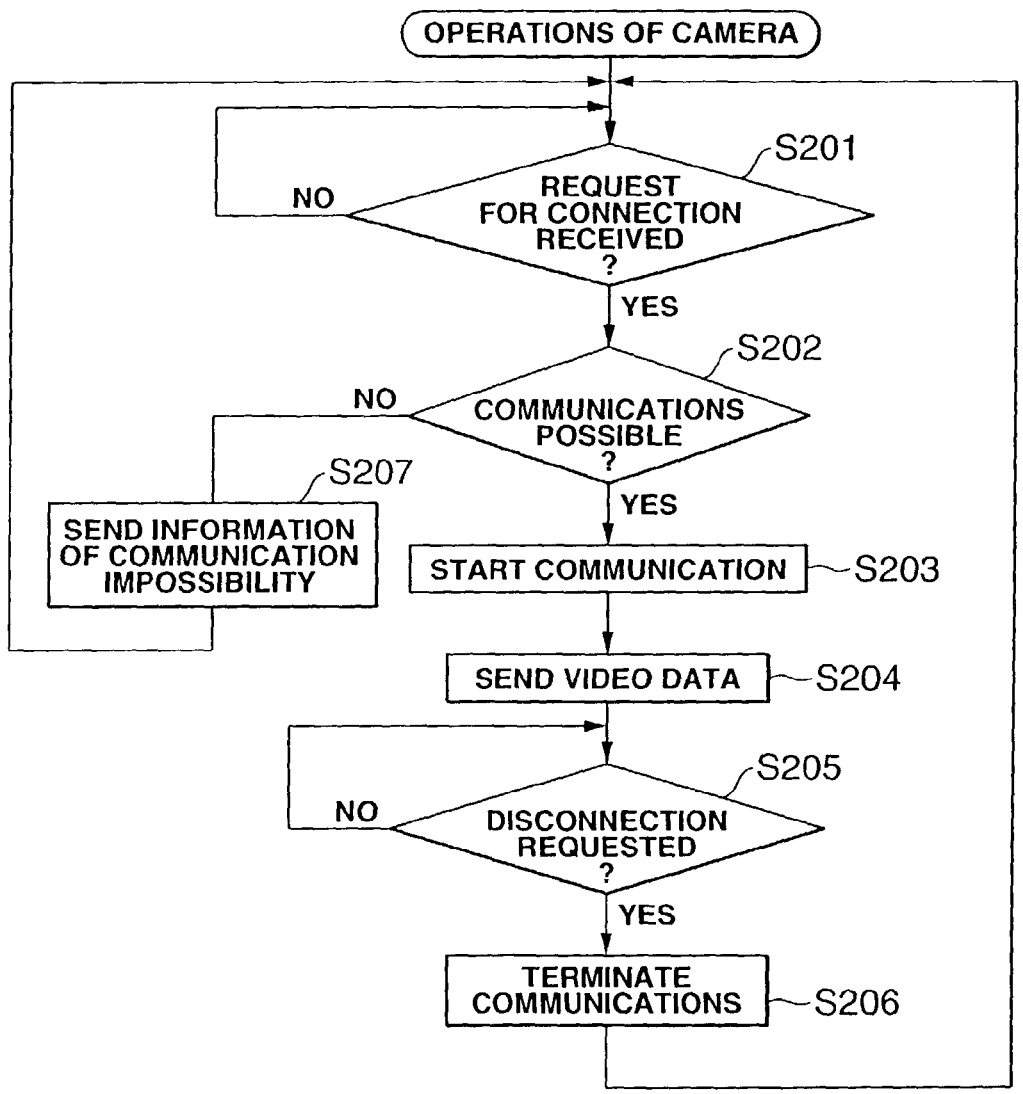
FIG. 18 shows a flow of operations made in the camera in the first embodiment of the present invention.

FIG. 18 shows a flow chart explaining an example of the procedure including operations made by the controller 57 in the camera 50 when the disc drive 80 operates as in step S12 shown in FIG. 15. Like the aforementioned server 60, the camera 50 waits, in step S201, for a results of judging whether it has been requested for connection from the disc drive 80 via the network 110 while the camera 50 is in operation. When the result of judgment is that the connection request has arrived at the camera 50 being on standby, the controller 57 goes to step S202 where it will judge whether the camera 50 is currently contestable, that is, whether it can communicate with the disc drive 80. It should be noted that the connection request is a one having been made in step S12 shown in FIG. 15. When the result of judgment is that the communication is possible, the controller 57 goes to step S203 where it will cause the camera 50 to start data communications with the disc drive 80 from which it has received the connection request, and then goes to step S204 where it will send real-time world video data to the disc drive 80. After the camera 50 starts sending the real-time world video data, the controller 57 goes to step S205 where it will judge whether a request for disconnection from the disc drive 80 has been detected. When the result of judgment is that the disconnection request has been detected, the controller 57 goes to step S206 where it will terminate the data communication with the disc drive 80, and waits for a connection request sent from the disc drive 80. The disconnection request will be sent from the disc drive 80 when the reproduction of a content recorded in the disc 90 is complete in the disc drive 80 or when the reproduction of a content is stopped by the user.

When it has been judged in step S202 that no connection is possible in response to the connection request from the disc drive 80, the controller 57 goes to step S207 where it will send communication impossibility information to the disc drive 80. No connection to the camera is possible when it is busy, namely, when it is communicating with any other disc drive 80, or when the camera is faulty, for example.

7. Picture Synthesis

Figure 19:
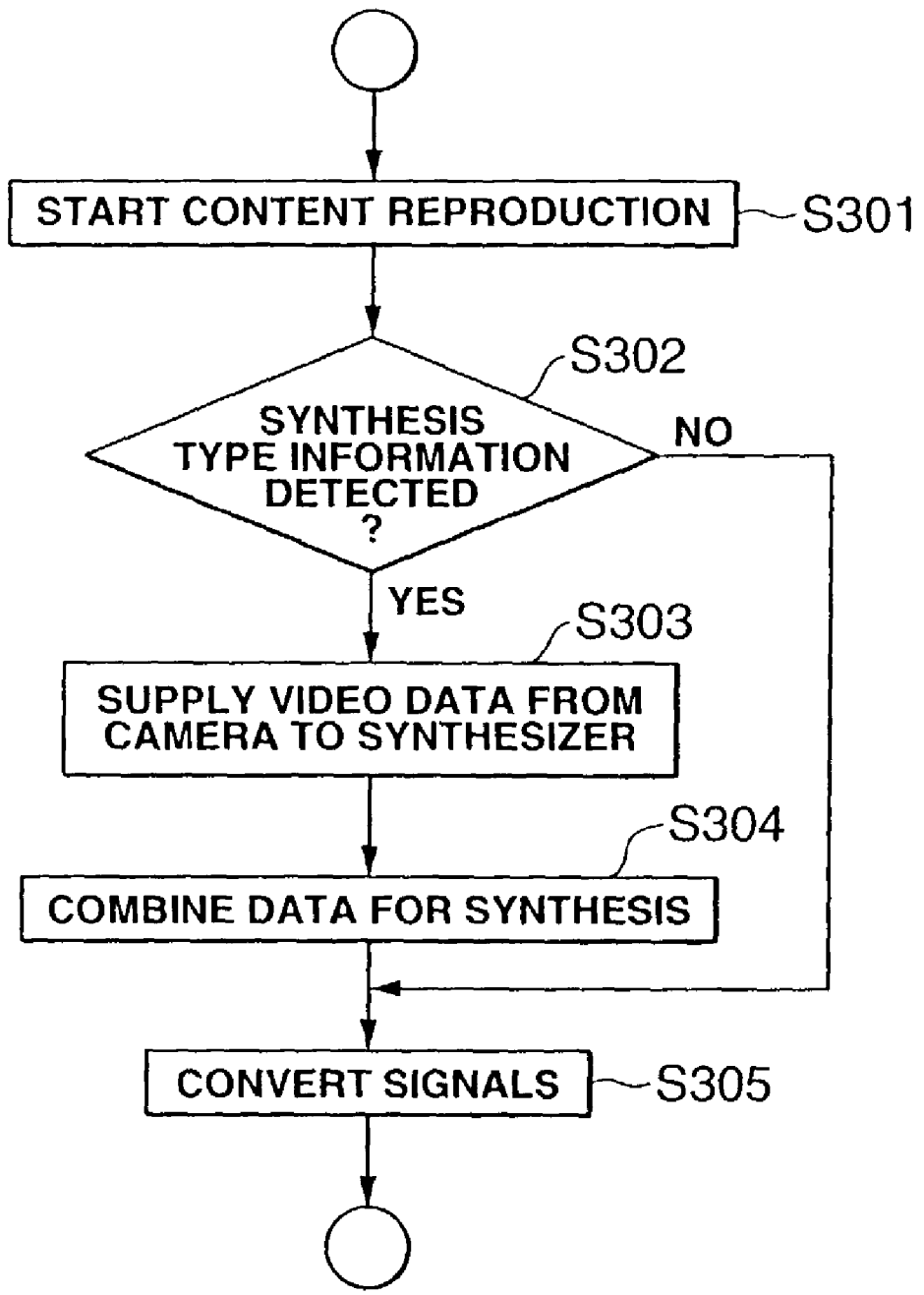
FIG. 19 shows a flow of operations made in reproducing a content in the disc drive in the first embodiment of the present invention.

FIG. 19 is a flow chart explaining an example of the procedure including operations made by the system controller 10 for synthesis of data during content reproduction in the disc drive 80 after the initialization shown in FIG. 15. After a content reproduction is started in step S301, the system controller 10 goes to step S302 where it will judge whether synthesis type information indicating whether there has been detected a recorded video data and real-time world video data are to be combined for synthesis. The synthesis type information is a one extracted in frames for example in the video data decoder 29 as having previously been described. When the result of judgment is that the synthesis type information has been detected, the system controller 10 goes to step S303 where it will supply the synthesizer 30 with for example one frame of real-time world video data decoded by the video data decoder 33, and further goes to step S304 where it will cause the synthesizer 30 to combine the recorded video data and real-time world video data. It should be noted that the synthesizing operations will be described in detail later. In step S305, the output video data produced by the synthesis in step S304 is converted by the video signal converter 34 to TV signals. Also, when it is judged in step S302 that no synthesis type information has been detected, the system controller 10 causes the synthesizer 30 to output only the recorded video data which will be converted by the video signal converter 34 to TV signals. Therefore, a content reproduced from the disc 90 will be outputted as it is.

FIGS. 20A, 20B and 20C diagrammatically illustrate frames and synthesis type information corresponding to the frames and explain together the data combination effected by the synthesizer 30 in step S304 in FIG. 19. As shown, frames are arranged correspondingly to the elapse of time t. Frames corresponding to synthesis type information "1" as shown in FIG. 20A are to be combined for synthesis. As shown in FIG. 20A, when frames of recorded video data read from the disc 90 and decoded by the video data decoder 29 are n, n+1, n+2, n+3, n+4, n+5, n+6, ..., respectively, synthesis type information corresponding to the frames n+2, n+3 and n+4 are "1". Therefore, these three frames are to be combined for synthesis, while other frames corresponding to the synthesis type information "0" are not to be combined for synthesis. As shown in FIG. 20B, when real-time world video data decoded by the video data decoder 33 are m, m+1, m+2, m+3, m+4, m+5 and m+6, respectively, there will be combined, for synthesis, frames m+2, m+3 and m+4 corresponding to the times at which the frames n+2, n+3 and n+4 shown in FIG. 20A are read in. Therefore, the synthesizer 30 will provide the frames n, n+1, (n+2)+(m+2), (n+3)+(m+3), (n+4)+(m+4), n+5 and n+6 as shown in FIG. 20C as output video data.

FIGS. 21A, 21B and 21C, and FIGS. 22A, 22B and 22C diagrammatically illustrate examples of recorded picture, real-time world view and output picture (synthetic picture). It should be noted that in the following description, the "character" is a moving part of a picture such as a person or car and "background" is a part of the picture, shown behind the character. The recorded picture shown in FIG. 21A includes characters 101 and 102 related to the contents of a scene, as images read as details of a content from the disc 90. The real-time world view shown in FIG. 21B is a view of mountains in the forenoon, including the sun 111, cloud 112 and mountains for example. Combination of these pictures will produce a synthetic output picture as shown in FIG. 21C, including the characters 101 and 102 with the view of the mountains in the forenoon (sun 111, cloud 112 and mountains 113) in the background. By combining a recorded picture as shown in FIG. 22A with a real-time world view being a view of mountains in the midnight for example as shown in FIG. 22B, there is produced a synthetic output picture as shown in FIG. 22C, including the characters 101 and 102 with the view of mountains in the midnight (mountains 113 and moon 114) in the background. Therefore, the same content can be combined with each of real-time world views supplied from the same camera 50 in the time zones to produce a synthetic picture with each of the different views in the background as shown in FIGS. 21C and 22C. Also, the same content can be combined with a real-time world view supplied from another camera 50 to produce a synthetic picture with another view in the background, which is not illustrated.

For producing a synthetic picture from a recorded picture and real-time world view as having been described with reference to FIG. 20, frames of the recorded picture and real-time world view may be combined simply or using key signals such as chroma-key signals. In the latter case, a view should be prepared in a blue screen as a recorded picture in advance for synthesis, and combined with a real-time world view. Also, in case a recorded picture is a normal picture, parts thereof corresponding to characters should be clipped and the clipped parts be combined with a real-time world view. In this case, successive frames of the recorded picture are compared with each other, and a part varying little should be used as a background while a part showing a large movement be combined with a real-time world view. For such a synthesis, the synthesis type information shown in FIG. 20 is extended as follows:

"0" No synthesis
"1" Simple synthesis
"2" Synthesis using the chroma key signals
"3" Synthesis using the clipping and a recorded picture and real-time world information should be combined for synthesis according to the synthesis type information.

An example of the combination of a recorded picture and a real-time world view taken by one camera 50 for synthesis has been described above with reference to FIG. 20. However, the recorded picture may be combined with real-time world views taken by a plurality of cameras 50. For this purpose, the synthesizer 30 is provided with a frame memory for the recorded picture and frame memories for the plurality of real-time world views, and thus each of frame data can selectively be read at a time corresponding to the recorded image as shown in FIG. 20 to produce an output video data. Also, in this case, an output video data can be produced by alternating the frame data of the recorded picture and those of the real-time world view with each other in a data stream.

Since a content reproduced from the disc 90 and a real-time world view taken by the camera 50 are combined to produce a synthetic output picture as above, the background of the content can be formed from the real-time world view. Therefore, a real-time world view will provide the same content which will appear different each time it is viewed. Also, since a real-time world view from the camera 50 is taken for combination with a content recorded in the disc 90, no other background picture is required so that it is possible to efficiently utilize the limited storage capacity of the disc 90.

B. Second Embodiment

In the first embodiment having been described in the foregoing with reference to the flow chart in FIG. 15, each time the disc 90 is loaded, the disc drive 80 accesses the server 60 and downloads an address table. By storing an address table once received from the server 60, it is unnecessary to download the address table so many times, namely, each time the disc 90 is loaded.

That is, the disc drive 80 has the RAM 41 or flash memory 46 in which address tables downloaded from the server 60 may be stored in correlation with disc IDS. For reproducing a content from the same disc at a next time, access may be made to the camera based on the address table stored in the RAM 41 or the like. It should be noted that for holding an address table for a relatively long time at the disc drive 80, the address table should preferably be stored in a nonvolatile memory such as the flash memory 46, not in the RAM 41 or written to the disc 90.

Figure 23:
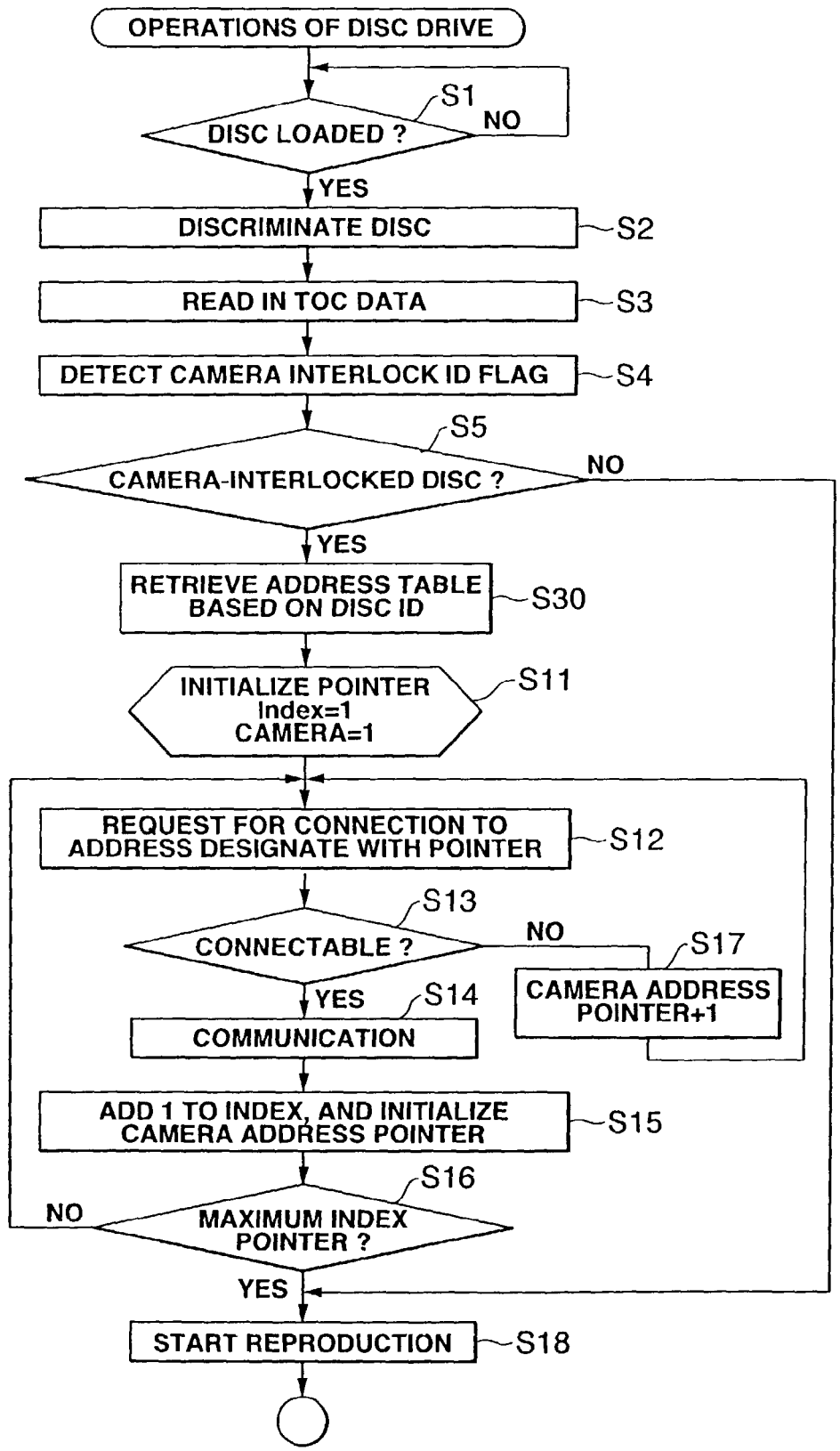
FIG. 23 shows a flow of operations made in the disc drive in second embodiment of the present invention.

The operations for the above will be described below with reference to the flow chart shown in FIG. 23. In FIG. 23, steps indicated with the same references as in FIG. 15 are the same as those in FIG. 15 and so will not be described any longer here. As shown in FIG. 23, when the disc 90 loaded in step S5 is judged to be a camera-interlocked one, the system controller 10 goes to step S30 where it will retrieve an address table corresponding to a disc ID read from TOC in the disc 90. That is, the disc drive 80 has a memory area, or the flash memory 46, for storage of address tables, and address tables having once been downloaded from the server 60 are stored in correlation with disc IDS. In step S30, such a disc ID is used to retrieve a one corresponding to a currently loaded disc from address tables stored in the flash memory 46.

In case there is available an address table having been downloaded from the server 60 and stored and which corresponds to the disc 90 (disc ID) currently loaded, the operations in step S11 and subsequent steps should be effected as in FIG. 15 based on the retrieved address table.

Note that no address table corresponding to the loaded disc 90 can be extracted with the retrieval in step S30 in some cases, for example, when the disc 90 is initially loaded in the disc drive 80. In case no address table can be retrieved with the retrieval in step S30, which is not shown in FIG. 23, an address table will be downloaded from the server 60 as in the first embodiment. Namely, the system controller 10 will go to step S6 and subsequent steps in FIG. 15.

As above, an address table downloaded from the server 60 is stored into the disc drive 80. However, the address table recorded in the server 60 will be updated as necessary. In this case, the address table stored in the disc drive 80 has to updated correspondingly. To this end, when the disc 90 is loaded in the disc drive 80, the address table should be updated correspondingly to the address table update in the server 60. For updating an address table, the disc ID, camera address and date-of-update information in the address table are managed in correlation with each other in both the disc drive 80 and server 60.

Figure 24:
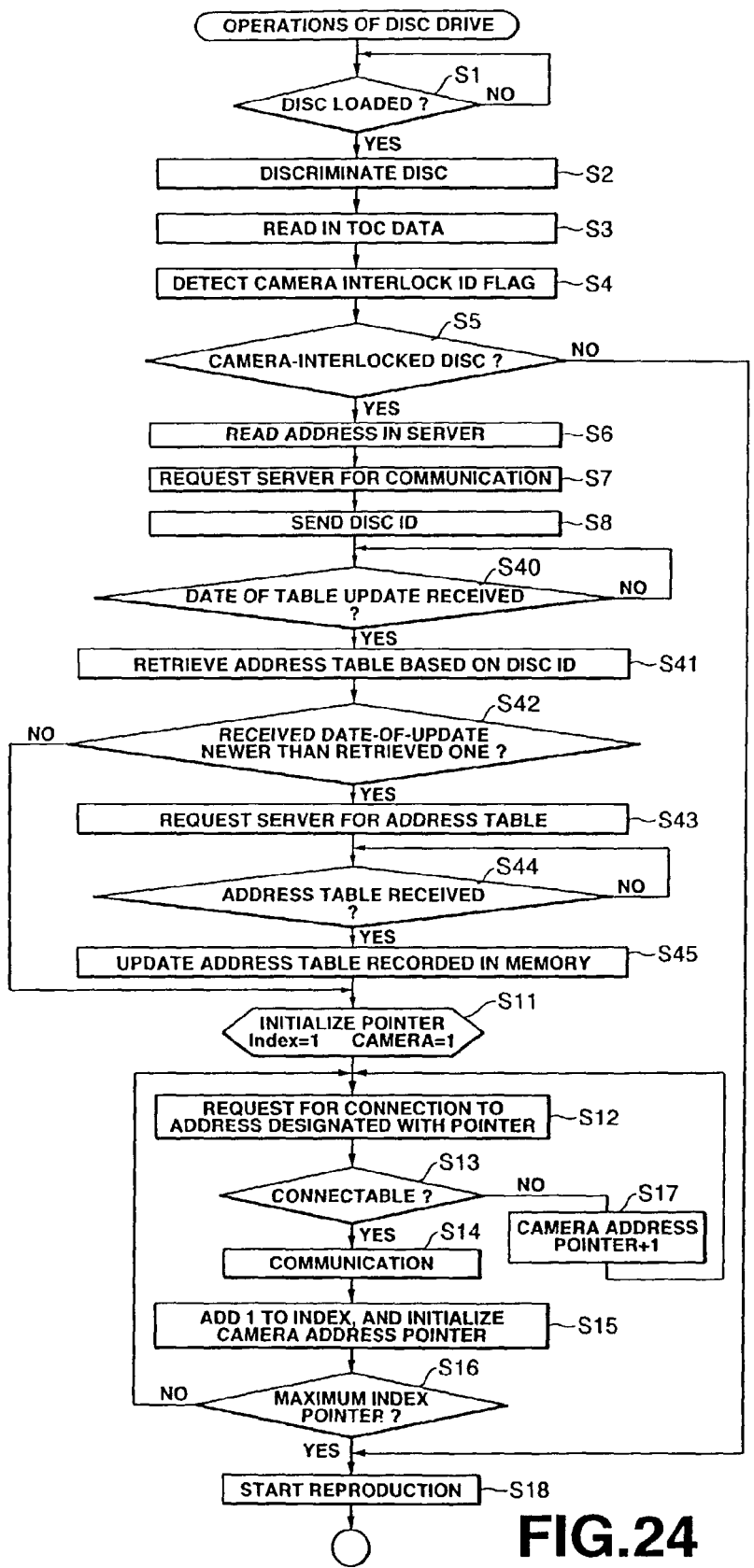
FIG. 24 shows a flow of operations made in updating the address table in the disc drive in the second embodiment of the present invention the present invention.

FIG. 24 shows a flow chart explaining an example of the procedure including operations made by the system controller 10 for updating an address table in the disc drive 80. The updating procedure explained with reference to the flow chart in FIG. 24 is a one executed when the disc 90 is loaded in the disc drive 80. In FIG. 24, the same operation steps as in FIG. 15 are indicated with the same references as in FIG. 15.

After the data communication with the server 60 is started and a disc ID is sent by the operations in steps S1 to S8, the system controller 10 judges in step S40 whether date-of-update information on an address table has bee received from the server 60 in response to the sent disc ID. When the result of judgment is that the date-of-update information has been received, the system controller 10 goes to step S41 where it will retrieve an address table corresponding to the disc ID from the flash memory 46 or the like in the disc drive 80. Thus, the date-of-update information on the address table recorded in the flash memory 46 or the like is detected.

Further, in step S42, the system controller 10 compares the received date-of-update information and retrieved date-of-update information with each other. When the result of judgment is that the received date-of-update information is a newer one, the system controller 10 goes to step S43 where it will request the server 60 to send an address table. In step S44, the system controller 10 judges whether an address table has been received from the server 60 in response to the sending request. When the result of judgment is that the address table has been received, the system controller 10 goes to step S45 where it will update the address table recorded in the flash memory 46 or the like with the received address table. In step S11, the system controller 10 initializes the pointer for the thus updated address table, and goes to steps S12, S13, S14, S15, S16 and S17 for the procedure for connection to the camera. When it is judged in step S42 that the received dateof-update information is not any newer one, the system controller 10 goes to step S11 where it will initialize the pointer for the address table retrieved from the flash memory 46 or the like in step S41, and the goes to a procedure for connection to the camera.

By updating the address table in a part of the initializing procedure made when the disc is loaded for example, the connection to the camera can be done based on a camera address shown in the latest address table.

Updating of the address table has been described above as a part of the initialization made when the disc 90 is loaded, for example, with reference to FIG. 24. However, the system may be adapted such that in an environment in which communication is always possible between the disc drive 80 and server 60, the address table can be updated at any time. In this case, comparison in date-of-update information is made as to all address tables recorded in the flash memory 46 or the like to always keep latest address tables in the flash memory 46 or the like. Thus, when the operations shown in the flow chart in FIG. 23 are made, the disc drive 80 can be connected to a camera based on a latest address table.

Figure 25:
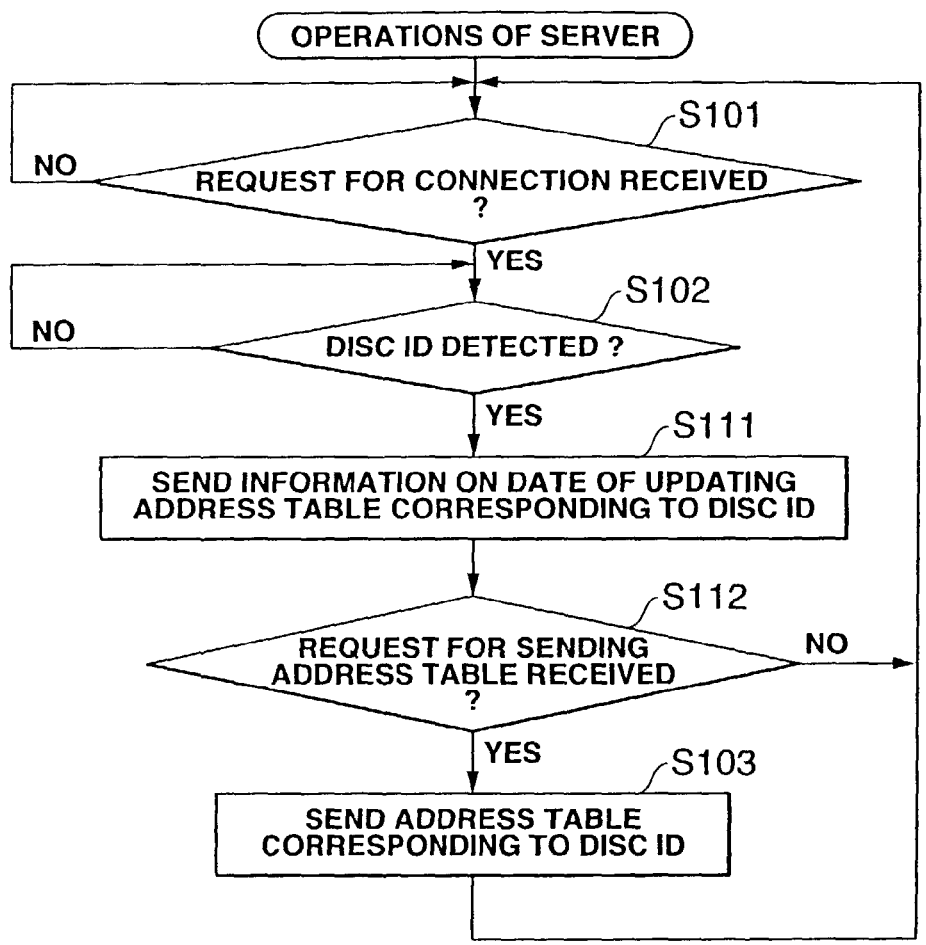
FIG. 25 shows a flow of operations made in the server in the second embodiment of the present invention when the disc drive updates the address table.

FIG. 25 shows a flow chart explaining an example of the procedure including operations made by the controller 63 in the server 60 when the disc drive 80 can update an address table as having been described above with reference to FIG. 24. It should be noted that in FIG. 25, the same operation steps as in FIG. 17 are indicated with the same references as in FIG. 17. As shown, the controller 63 judges, in step S101, whether the server 60 has received a connection request from the disc drive 80. When the result of judgment is that the server 60 has received the connection request, the controller 63 goes to step S102 where it will judge whether the server 60 has detected a disc ID sent from the disc drive 80. When the result of judgment is that the server 60 has detected the disc ID, the controller 63 sends, in step S111, date-of-update information on an address table corresponding to the disc ID to the disc drive 80. Thus, the disc drive 80 will operate as in step S42 in FIG. 24. In step S112, the controller 63 judges based on the received date-of-update information whether the server 60 has received a request for address table updating. When the result of judgment is that the server 60 has received the address table update request, the controller 63 goes to step S103 where it will send an address table corresponding to the disc ID detected in step S102.

As above, the server 60 can send a latest address table to the disc drive 80. Therefore, with the address table updated in the server 60, a latest address table is available to the disc drive 80 that can make data communications with the server 60 via the network 110.

C. Third Embodiment

According to the third embodiment of the present invention, a real-time world view is acquired in a time zone corresponding to details of a content which is reproduced by the disc drive 80.

In case a view in the forenoon is considered to be suitable as a real-time world view corresponding to a content, a view in the forenoon should desirably be synthesized irrespectively of any time zone of the day (forenoon, afternoon and midnight) in which a content is reproduced. To this end, the address table should be configured to select a destination camera correspondingly to a time zone in which a content is reproduced, for example, taking a time difference in consideration.

Figure 26:
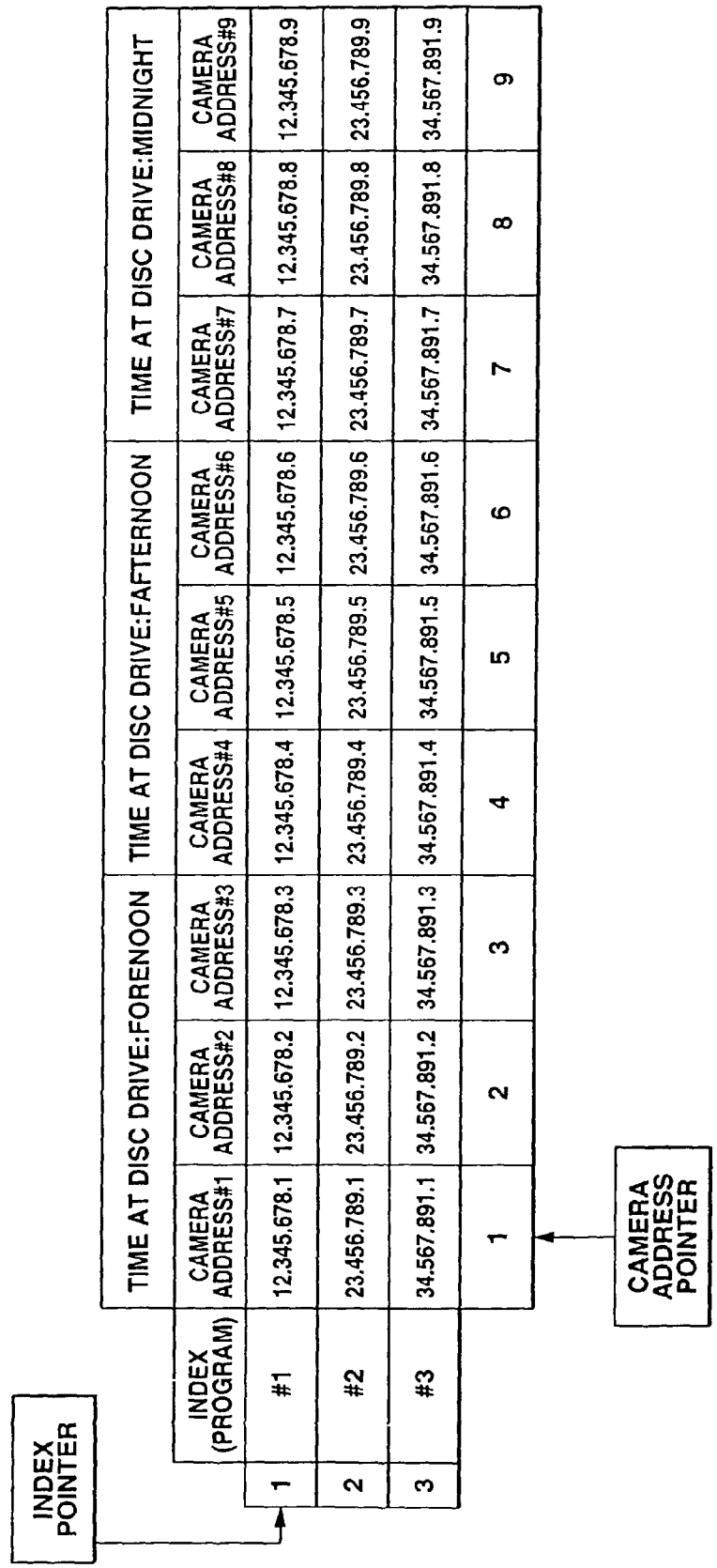
FIG. 26 explains an address table used in third embodiment of the present invention.

FIG. 26 shows an example of the address table listing camera addresses corresponding to time zones in which a content is reproduced. Based on this address table for example, a real-time world view is acquired as a forenoon view corresponding to details of a content reproduced by the disc drive 80 irrespectively of any time zone in which the content is reproduced. In the address table in FIG. 26, a camera address is listed for each of time zones such as "forenoon", "afternoon" and "midnight" in which a content is reproduced by the disc drive 80. It should be noted that three camera addresses are listed for one time zone of content reproduction because the same view can be shot by at least three cameras 50 against any fault as having previously been described with reference to FIG. 5.

The camera addresses #1, #2 and #3 are those accessed when a content is reproduced by the disc drive 80 in the forenoon. That is, each of these addresses is that of the camera 50 installed in a location where it is the forenoon while it is also the forenoon where the disc drive 80 is. In other words, the cameras 50 at these addresses are located with little difference in time from the disc drive 80 reproducing a content. From any of the cameras at these addresses, a view in the forenoon is to be acquired when the disc drive 80 reproduces a content in the forenoon. Also, the camera addresses #4, #5 and #6 are those accessed when a content is reproduced by the disc drive 80 in the afternoon. That is, each of these addresses is that of the camera 50 installed in a region or country where it is the forenoon while it is the afternoon where the disc drive 80 is. From any of the cameras 50 at these addresses, a view in the forenoon is to be acquired when the disc drive 80 reproduces a content in the afternoon. Further, the camera addresses #7, #8 and #9 are those accessed when a content is reproduced by the disc drive 80 in the midnight. That is, each of these addresses is that of the camera 50 installed in a region or country where it is the forenoon while it is the midnight where the disc drive 80 is. Form any of the cameras at these addresses, a view in the forenoon is to be acquired when the disc drive 80 reproduces a content in the midnight.

For downloading such an address table to the disc drive 80 and connecting the latter to a camera, a camera address pointer should be set based on the current time kept by the time keeper 37 for example. Therefore, the camera address pointer is set as shown in the flow chart in FIG. 27. As in the flow chart shown in FIG. 15, operations in steps S1 to S10 are effected after the disc is loaded in the disc drive 90. In this example, in step S10, the system controller 10 reads an address table as in FIG. 26 into the memory, then goes to step S701 where it will judge in which time zone the current time kept by the time keeper 37 is, the forenoon, afternoon or midnight. When the result of judgment is that the current time is in the time zone of the forenoon, the system controller 10 goes to step S702 where it will initialize the pointers by setting the index pointer to "1", camera address pointer to "1" and the maximum value of camera address pointer to "3". Alternatively, when the result of judgment in step S701 is that the current time is in the time of zone of the afternoon, the system controller 10 goes step S703 where it will set the index pointer to "1", camera address pointer to "4" and the maximum value of camera address pointer to "6". Otherwise, when the result of judgment in step S701 is that the current time is in the time zone of the midnight, the system controller 10 goes to step S704 where it will set the index pointer to "1", camera address pointer to "7", and the maximum value of camera address pointer to "9". After each of these steps S702, S703 and S704, the system controller goes to step S12.

Thus, for example, a real-time world view can be obtained as an afternoon view corresponding to a content independently of any time zone of content reproduction, that is, of a time zone during which the content is to be reproduced at the disc drive 80. More particularly, in steps S12 to S16, the following operations will be done. When the current time (time zone of content reproduction) at the disc drive 80 is included in the forenoon, the camera address pointer is any of "1" to "3" and so a real-time world view in the forenoon is provided. When the current time (time zone of content reproduction) at the disc drive 80 is in the afternoon, the camera address pointer is any of "4" to "6" and thus a real-time world view in the forenoon is provided. Further, when the current time (time zone of content reproduction) at the disc drive 80 is in the midnight, the camera address pointer is any of "7" to "9" and so a real-time world view in the forenoon is provided. It should be noted that the above example is of course applied to a case where the details of a content itself need a real-time world view in the forenoon for combination therewith. When the content itself has been prepared with consideration to a real-time world view in the midnight for combination therewith, the aforementioned address table is a one having been prepared to provide an address of the camera 50 which provides the real-time world view in the midnight irrespectively of any current time (time zone of content reproduction) at the disc drive 80.

Figure 27:
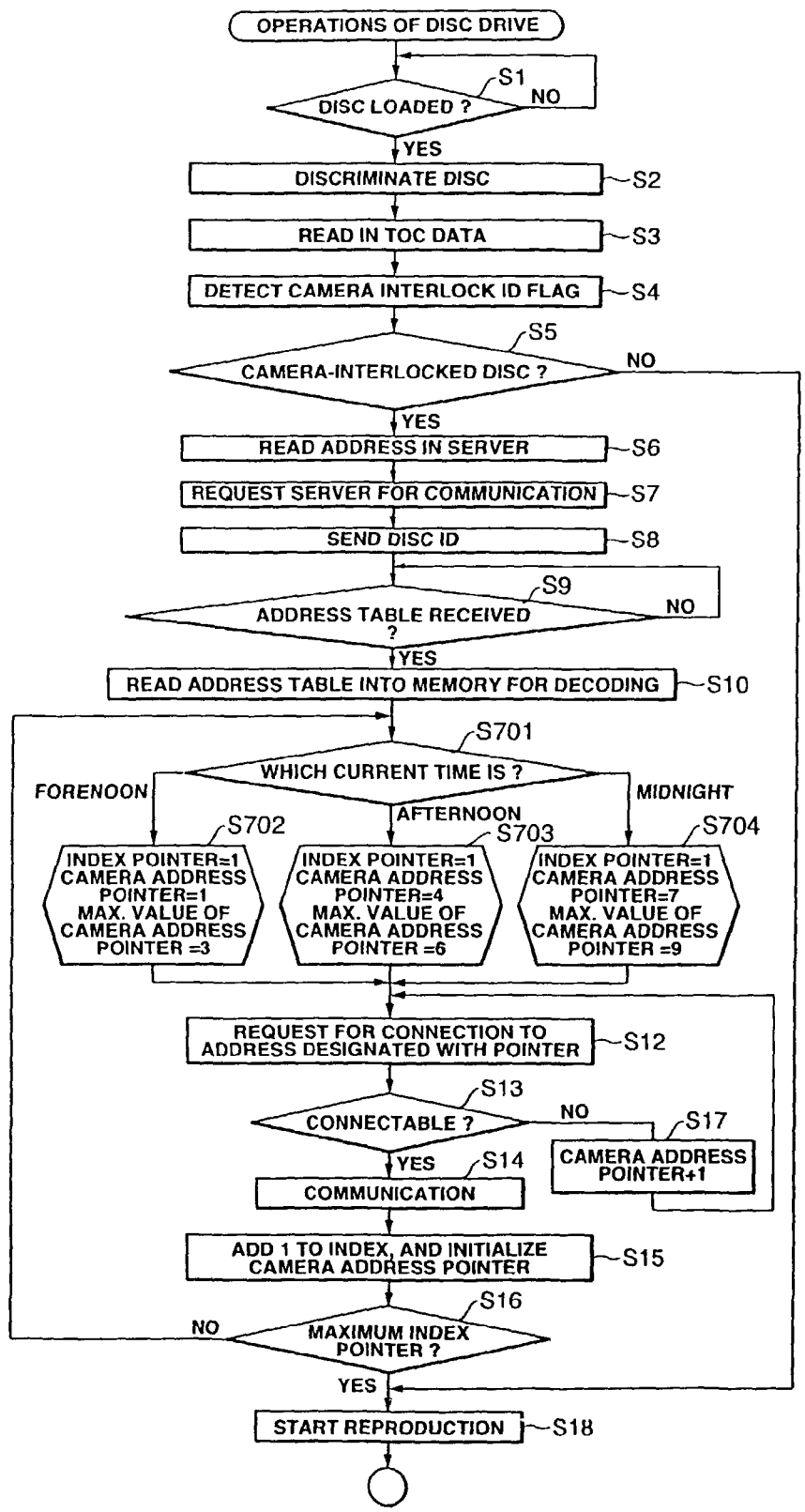
FIG. 27 shows a flow of operations made in the disc drive in the third embodiment of the present invention.

In the foregoing, the management of camera addresses corresponding to the time zones of reproduction at the disc drive, forenoon, afternoon and midnight, with the same address table has been described as an example with reference to FIGS. 26 and 27. In this case, address tables corresponding to the time zones such as forenoon, afternoon and midnight for example are prepared and stored individually in the server 60. When the disc drive 80 sends a request for connection, disc ID and information on the current time kept by the time keeper 37 to the server 60. The server 60 selects an address table according to the received disc ID and current-time information and sends it to the disc drive 80, and thus the disc drive 80 can acquire an address table corresponding to the current time (time zone of content reproduction). However, if the server 60 knows the location of the disc drive 80 (country/region) and can discriminate the current time at the disc drive 80 taking a time difference in consideration, the disc drive 80 has not to send the current-time information to the server 60.

Note that the address table may be prepared to have any other configuration. In the aforementioned example, the address table is configured so that a real-time world view in a time zone corresponding to the details of a content can be acquired. Namely, when for example a view in the forenoon is suitable for the details of a content, the address table allows the disc drive 80 to always acquire a real-time world view in the forenoon irrespectively of the time zone in which the content is reproduced. On the contrary, the address table may be configured so that a real-time world view at a time (time zone of content reproduction) at the disc drive 80 or in a user-defined time zone is available to the disc drive 80. Namely, in the address table shown in FIG. 26, there can be set different camera address pointers correspondingly to the time zones: forenoon, afternoon and midnight, in which the disc drive 80 reproduces a content, respectively. An address table may be configured which has set therein a camera address for each of the time zones: forenoon, afternoon and midnight at sites where the cameras 50 are installed, respectively. Thus, the disc drive 80 can acquire, from any of the cameras 50, a view at a time corresponding to the current time at the disc drive 80, a view in a time zone always different from the current time or a view in a user-defined time zone, as a real-time world view. However, it is should be noted that when an address table is configured for each of the time zones: forenoon, afternoon and midnight as a time at the sites where the cameras are installed, respectively, the address table should always be updated as the time elapses.

Further, for acquisition of a real-time world view in a time zone corresponding to details of a content as in the aforementioned example in a wide region where the content is distributed to the disc drive 80 from a location to another with a time difference between the locations (where the disc drive 80 is installed or commercially available), there should be prepared an address table corresponding to the location where the disc drive 80 is installed. Alternatively, it is necessary to prepare an address table which is based on a local time where the camera 50 is installed and record information indicative of a time zone of a picture required for a content to the disc 90 correspondingly to the content. Thus, the camera 50 picking up a view required for the content in a time zone can be selected for establishing the communications with the camera 50.

Also a regional code may be used. In this case, the disc drive 80 and disc 90 have set therein a regional code for each region in which they are used. The regional code is set to limit the reproducing of the disc 80 for example and when bot the regional codes for the disc drive 80 and disc 90 coincide with each other, reproducing of the disc 90 is allowed. Using this regional code, it is also possible to specify a region in which the disc 90 is being played back for selection of an camera address from which a suitable picture will come to the disc drive 80. In this case, the address table may be configured so that the divisions of the day, forenoon, afternoon and midnight, shown in FIG. 26 correspond to those in a region for which the regional code is set. That is, by setting a camera address pointer based on a regional code when downloading an address table to the disc drive 80 based on a disc ID, a different camera address for each region can be selected for the same scene. Also, even in case a scene having the same contents is reproduced, each of real-time world views different from one region to another (views in the regions, for example) can be combined with the scene and thus it is possible to enjoy a view of each region. It should be noted that for specifying a smaller area of a region defined with the aforementioned regional code, there may be set as subordinate information included in a regional code information with which the smaller area can be specified.

D. Fourth Embodiment

The fourth embodiment is designed such that the operations of the camera can be controlled according to a content to be reproduced. For the disc drive 80 to receive a real-time world view taken by the camera 50, a real-time world view can be picked up correspondingly to a content by controlling the camera 50 by zooming or the like and a pan head on which the camera 50 is installed.

Figure 28:
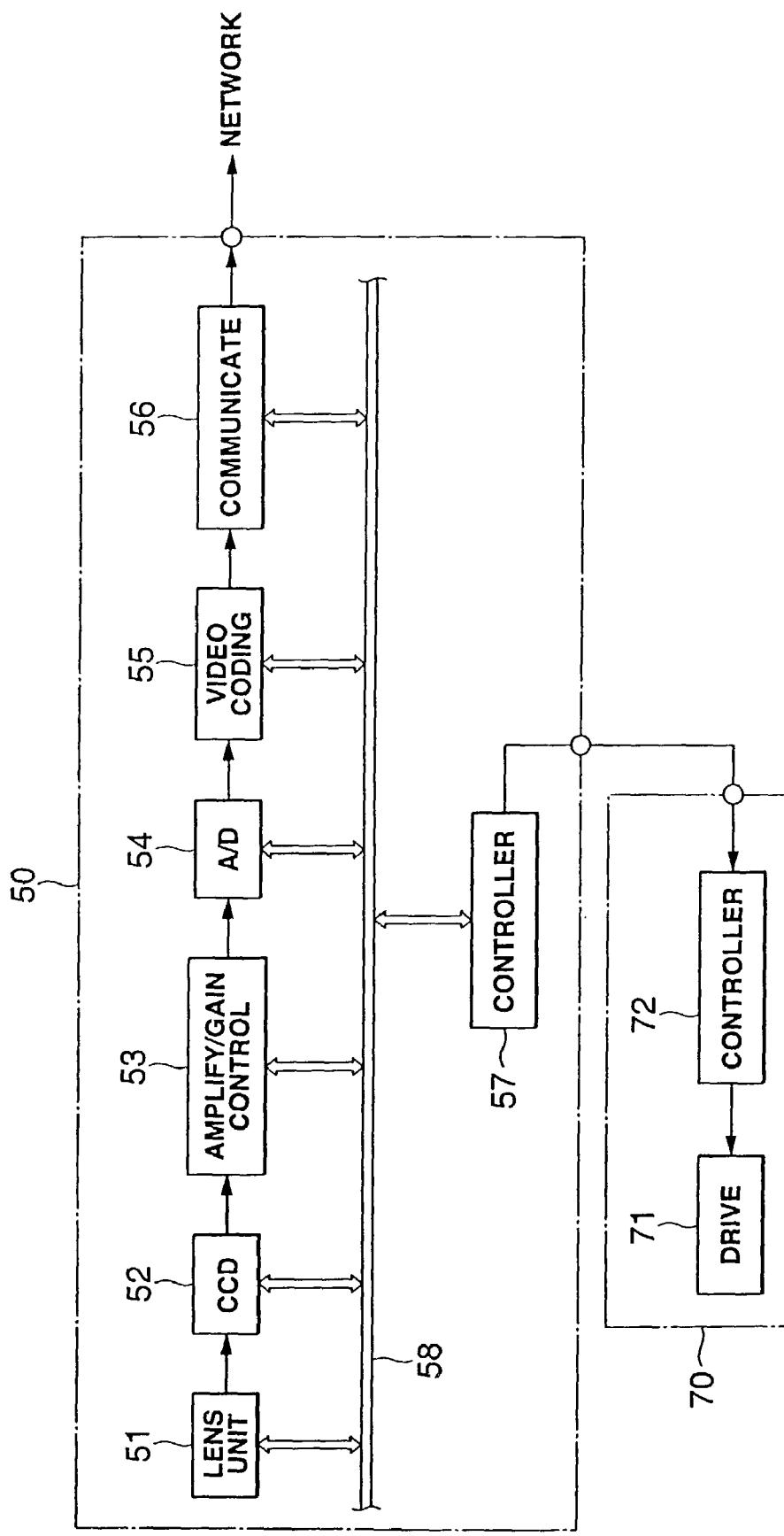
FIG. 28 is a block diagram of the camera and pan head in a fourth embodiment of the present invention.

The combination of the camera 50 and pan head is shown in the form of a block diagram in FIG. 28. As shown in FIG. 28, the camera 50 is constructed nearly similarly to that shown in FIG. 3 and installed on a pan head 70. In this embodiment, the controller 57 is designed to make video signal processing having been described with reference to FIG. 3, controls the driving of the lens unit 51, for example, zooming, according to imaging control information (lens system control information and pan head control information) received by the communication unit 56 from the disc drive 80 for example, and control the movements, such as panning, tilting and the like, of the pan head 70.

A content recorded in the disc 90 includes imaging control information. Similarly to the synthesis identification information having been described with reference to FIG. 20, the imaging control information is superposed on a recorded video signal in units of a frame for example, and extracted in the video data decoder 29 in the disc drive 80. The thus extracted imaging control information (lens system control information and pan head control information) is sent to the camera via the communication unit 31. Under the lens system control information as the imaging control information, the controller 57 in the camera 50 can control the lens unit 51 to drive the lens for zooming for example. Also, the controller 57 can supply the pan head 70 with pan bead control information as to angling of the camera 50, supplied from the communication unit 56.

The camera 50 is installed on the pan head 70. As shown, the pan head 70 incorporates a drive 71 to change of the viewing angle of the camera 50 and a controller 72 to control the driving operation of the drive 71. Under the imaging control information supplied from the controller 57 in the camera 50, the controller 72 controls the driving operation of the drive 71 in the pan head 70. In this way, the camera 50 can be changed in viewing angle, namely, it can be directed upward, downward, rightward and leftward (that is, panned and tilted). It should be noted that by controlling the communication unit 31 to send the lens system control information and pan head control information, separately, from the disc drive 80, the pan head control information can be sent directly to the pan head 70.

Figure 29:
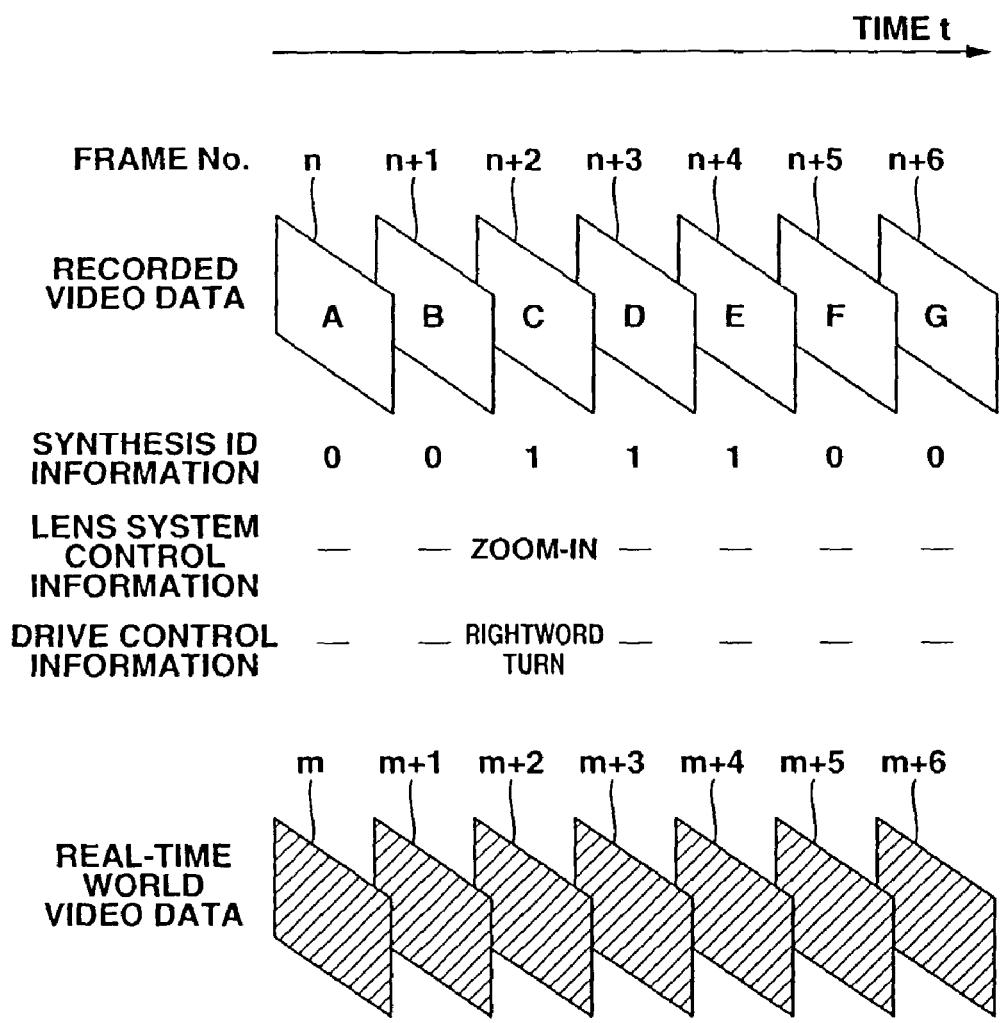
FIG. 29 explains drive control information superposed on each frame of recorded video data in the fourth embodiment of the present invention.

FIG. 29 is a schematic drawing explaining the imaging control information superposed on each frame of recorded video data supplied from the video data decoder 29 to the synthesizer 30. In the example shown in FIG. 29, zooming command information as lens system control information and rightward-turn command information as pan head control information are superposed along with synthesis identification information on a frame n+2 for example. Therefore, the frame n+2 is decoded in the video data decoder 29, the zooming command information and rightward-turn command information are extracted and sent from the communication unit 31. So, the camera 50 is driven for zooming and the pan head 70 is controlled to drive the camera 50 for turning the view angle of the camera 50 to the right. Thus, the real-time world view to be supplied to the disc drive 80 will be a larger one than a picture normally taken with the camera 50 not driven for zooming and cover a view to the right side of the normally taken picture. That is, by setting the imaging control information correspondingly to a content, it is possible to specialize the real-time world view taken by the same camera 50 only for the content in consideration.

Figure 30:
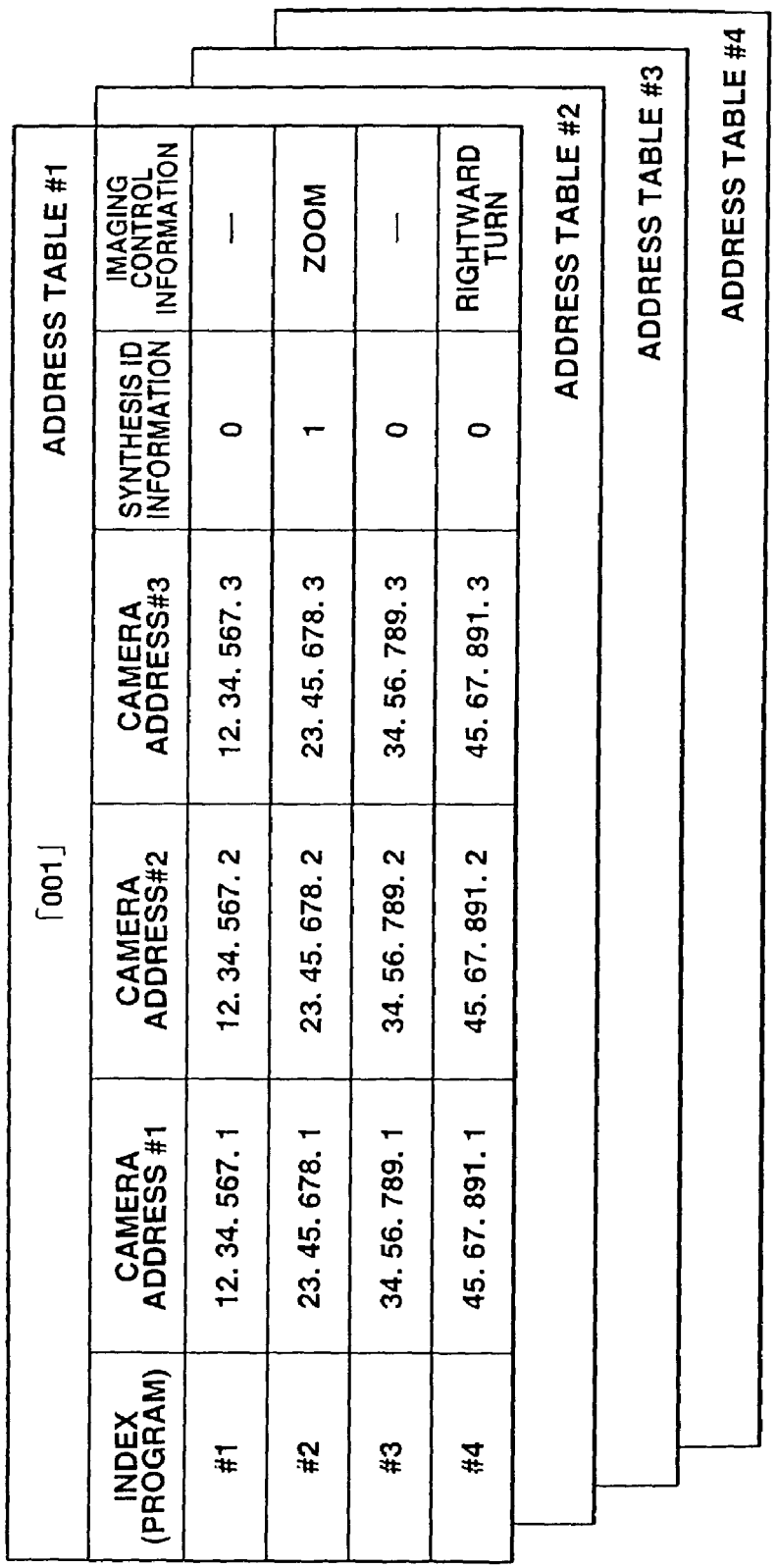
FIG. 30 explains a correlation between synthesis type information and camera address information in the fourth embodiment of the present invention.

Note that synthesis identification information may be managed in the address table. In this case, synthesis identification information should be recorded correspondingly to camera address information as shown in FIG. 30. Thus, the disc drive 80 can select a synthesis technique for each scene, for example, corresponding to index information. Also in this case, lens system control information and pan head control information should be recorded correspondingly to camera address information. When reproducing a content in the disc drive 80, zooming control and angle control can be done for each scene to reproduced in the disc drive 80 by sending lens system control information and pan head control information corresponding to the scene to the camera 50.

Also, camera address and imaging control information may be managed in the lead-in area of the disc 90. Thus, the camera address and imaging control information can be made to correspond to each content recorded in the disc 90 and a camera can be selected for the content. Further, when reproducing a content, a real-time world view varying depending upon imaging control information can be acquired from the same camera by making imaging control information correspond to a segment.

FIG. 31 explains an example of management of camera address and imaging control information in the lead-in area of the disc 90. In the index information, there are recorded imaging control information corresponding to a segment along with start time and end time as segmental information (program, chapter or scene). By recording a camera address corresponding to a content as link information, it is possible to inform the disc drive 80 of a camera with which the disc drive 90 is to make data communications. Therefore, when the disc 90 having a lead-in area formed thereon as shown in FIG. 31 is loaded in the disc drive 80, the latter will start data communications with the camera 50 based on the camera address to reproduce the content. Then, the disc drive 80 sends, to the camera 50, imaging control information corresponding to each scene, such as "zoom-in" when a scene being reproduced is a scene #1 for example, "zoom-out" for a scene #2 and "tilt-up" for a scene #3. Namely, as the time elapses with the reproduction of a content, the disc drive 80 can sequentially send imaging control information corresponding to a content to the camera 50.

Figure 32:
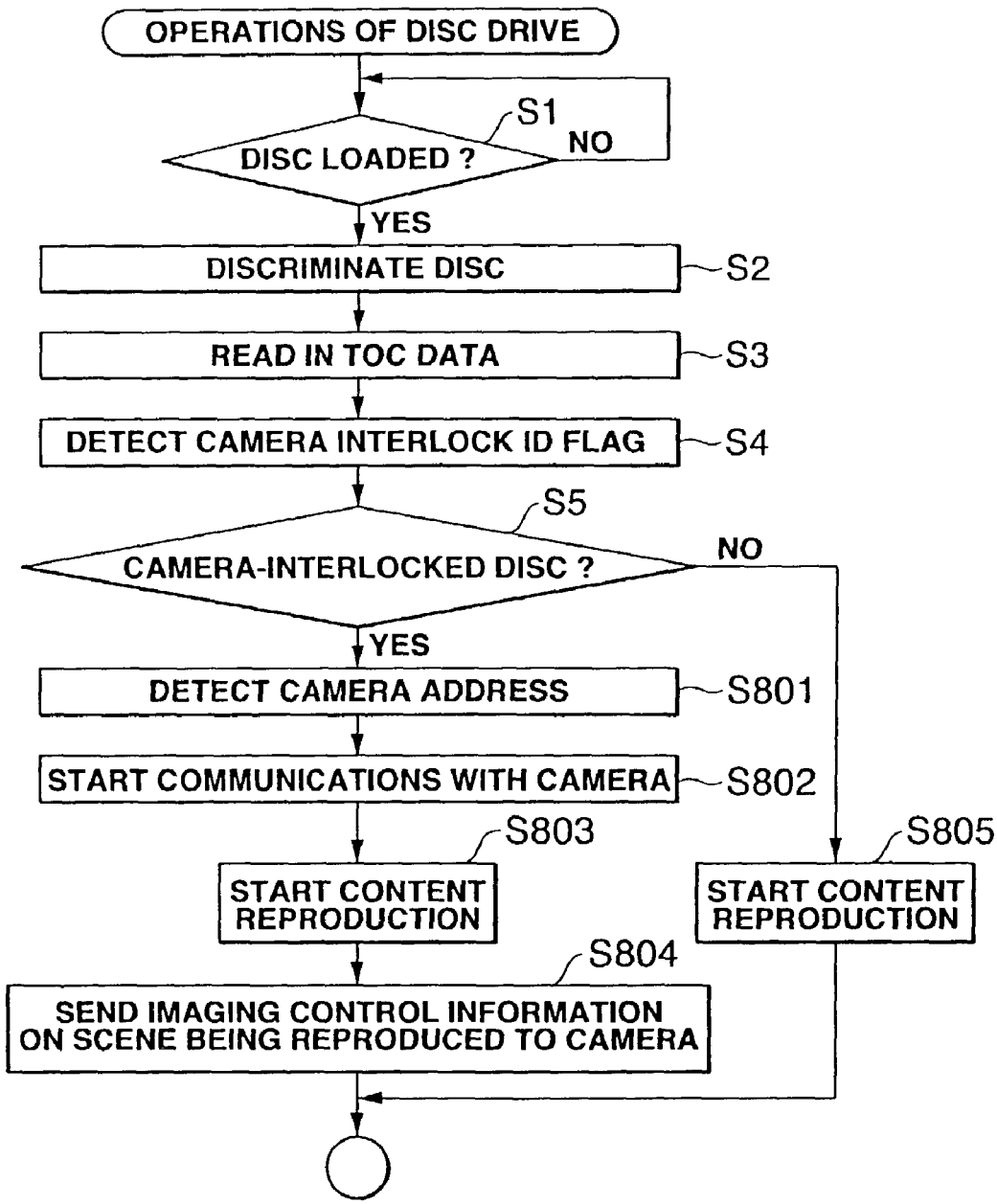
FIG. 32 shows a flow of operations made in the disc drive in the fourth embodiment of the present invention.

FIG. 32 shows a flow of operations made by the system controller 10 in the disc drive 80 having loaded therein the disc 90 having the lead-in area formed thereon as shown in FIG. 31. In FIG. 32, steps taking the same numbers as in the flow chart shown in FIG. 15 are the same steps as in the flow chart in FIG. 15. That is, when it is judged in step S1 that the disc 90 has been loaded in the disc drive 80, the system controller 10 goes to step S2 where it will discriminate the disc, to step S3 where it will read in TOC data, and then to step S4 where it will detect a camera interlock ID flag. When the system controller 10 judges in step S5 that the loaded disc 90 is a camera-interlocked one, it goes to step S801 where it will detect a camera address from the lead-in area of the disc 90. Then in step S802, the system controller 10 starts data communications with the camera 50 based on the camera address. Thus, the disc drive 80 is supplied with real-time world video data from the camera 50. Further in step S803, the system controller 100 starts reproducing a content, and sends, in step S804, imaging control information corresponding to the content being reproduced to the camera 50. It should be noted that when the loaded disc 90 is judged in step S5 not to be any camera-interlocked one, the system controller 10 goes to step S805 where it will simply reproduce the content for example.

With the above operations, the system controller 10 allows the disc drive 80 to make data communications with the camera 50 corresponding to a content recorded in the disc 90 loaded in the disc drive 80 and acquire a real-time world view. Then, the imaging control information controls the camera 50 to make various imaging operations in order to acquire a different real-time world view for each scene for example. This will be described below with reference to FIG. 6. For using a picture of a city as a background for a content, the address of the camera 50a is recorded in the lead-in area shown in FIG. 31. By recording imaging control information as necessary, it is possible to zoom in, or change the angle of view of, the city image as the real-time world view for each scene. That is, while the disc drive 80 is reproducing a content, it will be able to acquire a different picture for each scene for example from the same camera 50a. It should be noted that for recording two or more contents in a single disc 90, the disc drive 90 may be set to make data communications with a different camera 50 for each of the contents, respectively. In this case, a camera address corresponding to each content should be recorded in the lead-in area for example.

E. Fifth Embodiment

The fifth embodiment is intended to store an address table in a disc. In the aforementioned embodiments, an address table as information for linkage with the camera 50 is managed in the server 60 and downloaded to the disc drive 80 whenever necessary. In this embodiment, however, an address table is managed in the disc 90. That is, the disc 90 has a content and an address table corresponding to the content recorded therein in advance. The disc drive 80 communicates with the camera 50 based on the address table read from the disc 90, receives a real-time world view, combines it with content data read from the disc 90, and outputs the thus synthesized image. In this case, the system can be designed to make the server 60 unnecessary for any operation based on the address table. However, the server 60 is still necessary for data update which will be described in detail later.

Figure 33:
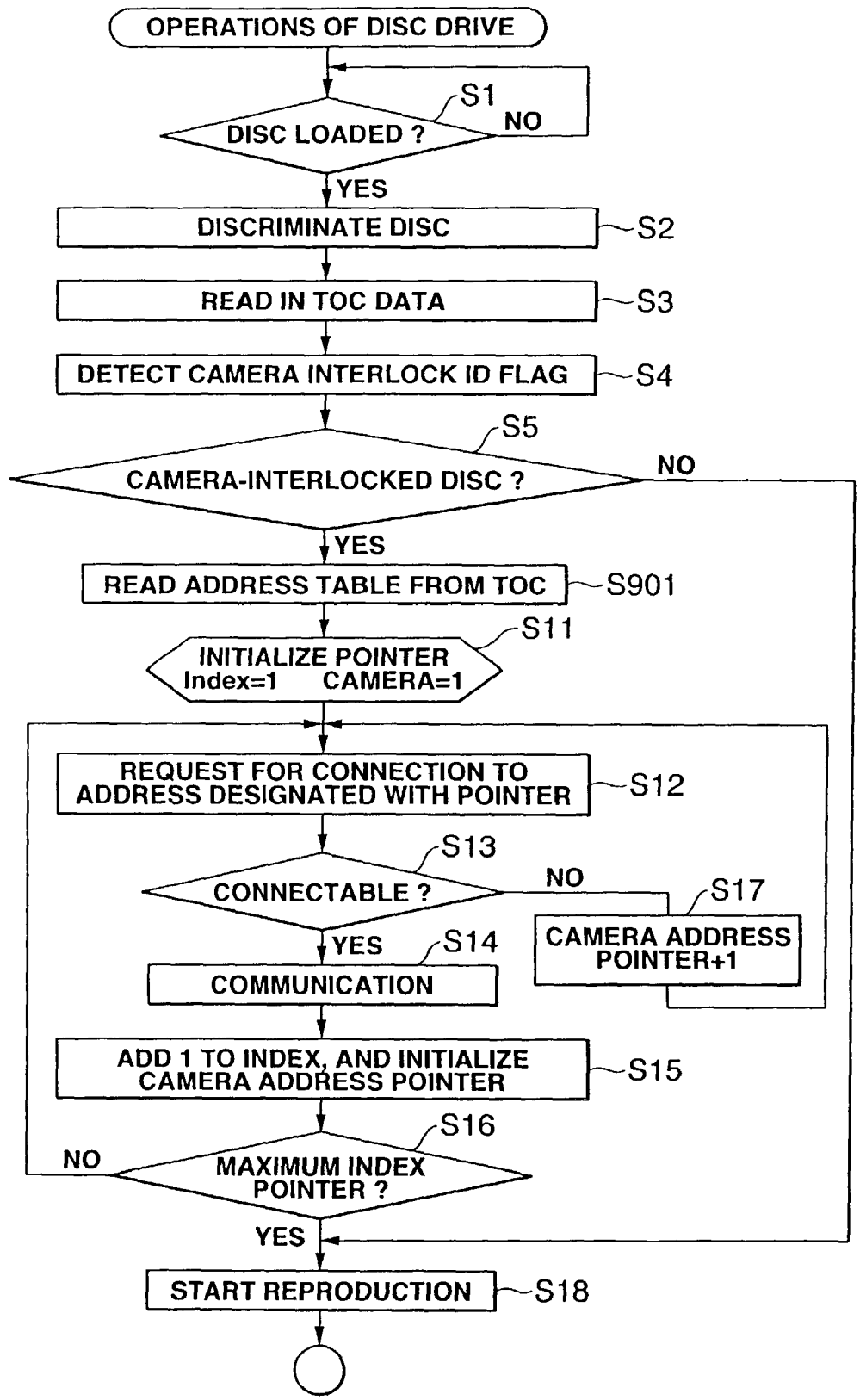
FIG. 33 shows a flow of operations made in the disc drive in a fifth embodiment of the present invention.

In this embodiment, an address table shown in FIG. 5 or 30 is recorded in TOC or the like in the lead-in area for example in the disc 90. For shifting to the reproduction of a content after loading the disc 90 in the disc drive, 80, the latter should read the address table from TOC for communication with an appropriate camera. This procedure is given as the flow chart shown in FIG. 33 for example. As will be seen, the flow chart in FIG. 33 is different from that in FIG. 15 in that step S901 is substituted for steps S6 to S10 in FIG. 15. That is to say, when the system controller 10 judges in step S5 that the loaded disc 90 is a camera-interlocked one, it goes to step S901 where it will read in an address table recorded in the disc 90. In step S11, the system controller 10 initializes the index pointer and camera address pointer. The subsequent steps are similar to those indicated with the same references in FIG. 15.

By recording an address table in the disc 90 as above, the system controller 10 has not to make operations for the communication with the server 60 as having been described with reference to FIG. 15 (steps S6 to S10). Thus, the disc drive 80 can operate with a less load applied thereto and rapidly shift to the operations for communication with the camera.

An address table can be recorded in another place on the disc 90. As an optical disc, a so-called partial ROM disc is known in which the storage area formed therein is divided into a read-only area (ROM area) and a rewritable area (RAM area). Such a partial ROM disc is used to record a content which needs not to be rewritten, for example, to the ROM area, and an address table to the RAM area. Thus, the disc drive 80 can make data communications with a camera without having to effect any communications with the server 60, as having been described with reference to the flow chart in FIG. 31.

Also, an address table recorded in the RAM area of the disc 90 can be updated. In this case, the table address is recorded along with date-of-update information to the RAM area. The date-of-update information recorded in the RAM area of the disc 90 is compared with that recorded in the server 60, as having previously been described with reference to the flow chart shown in FIG. 24, and when the result of comparison shows that the date of update information in the server 60 is newer, an address table is downloaded from the server 60 to the disc drive 80 to update the address table recorded in the RAM area of the disc 90. With these operations for updating, it is possible to record a latest address table in the disc 90. Thus, the disc 90 can show a latest address table to the disc drive 80 in which it is loaded.

Incidentally, when data is recorded as an address table to the disc 90 in the disc drive 80 shown in FIG. 2, first the received address table is subjected to error correction in the error-correction circuit 32, and then it is encoded according to a format of data recording to the disc 90 to produce write data (write pulse). The write data is supplied to the laser driver 18 which is thus controlled to output a laser power whose level is for data recording. A laser light thus produced is projected through the objective lens 2 to the recording layer of the disc 90, thereby permitting to record the address table to the disc 90.

F. Sixth Embodiment

The sixth embodiment of the present invention is such that the disc drive communicates with a camera whose address has been entered or defined by the user, is supplied with a real-time world view from the camera, combines the picture with content data reproduced from the disc, and outputs the thus synthesized data. In the aforementioned embodiments of the present invention, there are managed addresses of cameras to which the disc drive is connected based on an address table. With this sixth embodiment, however, the user can freely select a real-time world view by operating the control panel 38 provided at the disc drive 80. This embodiment may be designed to perform without any server 60. Also, the embodiment may be adapted to use no address table or use an address table in parallel with the user's operation.

The system may be adapted to enter a camera address by the user operating the control panel 38 or the like to enter a value as a camera address or to produce a video signal for displaying a menu guide for selection of a real-time world view and supply it to the monitor. By making it possible for the user to select a real-time world view, the user arrange a content for his or her enjoyment. Namely, the user can enjoy a real-time world view taken by the camera at each time as a background of the content. Also, the system may be adapted such that in case the user can select a real-time world view, the history of real-time world view selections can be managed and a camera address having been selected most frequently can be preferentially selected for the disc drive to communicate with the camera at that address. Information on the history of real-time world view selections may be recorded to the flash memory 46 of the disc drive 80 or to the disc 90 in correlation with for example disc ID. Thus, a real-time world view the user prefers and having been selected most frequently can automatically be selected based on the information on the history of real-time world view selections.

G. Seventh Embodiment

The aforementioned first to third embodiments of the present invention basically concern the access to the camera 50 based on an address table corresponding to a disc ID. That is, an address table is prepared for each disc 90. According to this seventh embodiment, the server 60 has a keyword-managed address table and the disc 90 has recorded therein a keyword corresponding to a content also recorded therein. The disc drive 80 is designed so that when it plays back the disc 90, it will send a keyword corresponding to a content to be reproduced to the server 60 and receive an address table corresponding to the keyword from the server 60. Then the disc drive 80 communicates with a camera 50 based on the address table and is supplied with a real-time world view from the camera 50. The disc drive 80 combines the real-time world view with the content read from the disc 90 to output a synthetic video data. That is, according to the seventh embodiment, a keyword is used instead of a disc ID to identify an address table.

FIG. 36 shows index information about a content (e.g., an index of a content or a segmental scene of the content) and a keyword recorded in correlation with reach other in the lead-in area of the disc 90. The index information includes start time and end time as segmental information (program, chapter or scene) and information such as "sea", "mountain" or the like as a keyword corresponding to each segment. It should be noted that the capacity information, number-of-layers information, track-path direction, recording start/end position information, camera interlock identification flag and server address are similar to those in the first embodiment having previously been described with reference to FIG. 8.

On the other hand, the data base 62 of the server 60 has stored therein an address table as shown in FIG. 37. The address table has stored therein camera addresses correspondingly to the keywords "sea", "city", "mountain", "street", etc. Correspondingly to a unit No. 1 included in the address table for example, camera addresses #1, #2 and #3 are stored correspondingly to the keyword "sea". That is, the camera addresses #1, #2 and #3 are for cameras 50 installed at the coasts or the like to pick up views of the sea. It should be noted that the plurality of camera addresses such as #1, #2 and #3 is intended to be a solution to the busy-state or fault as having previously been described.

Figure 34:
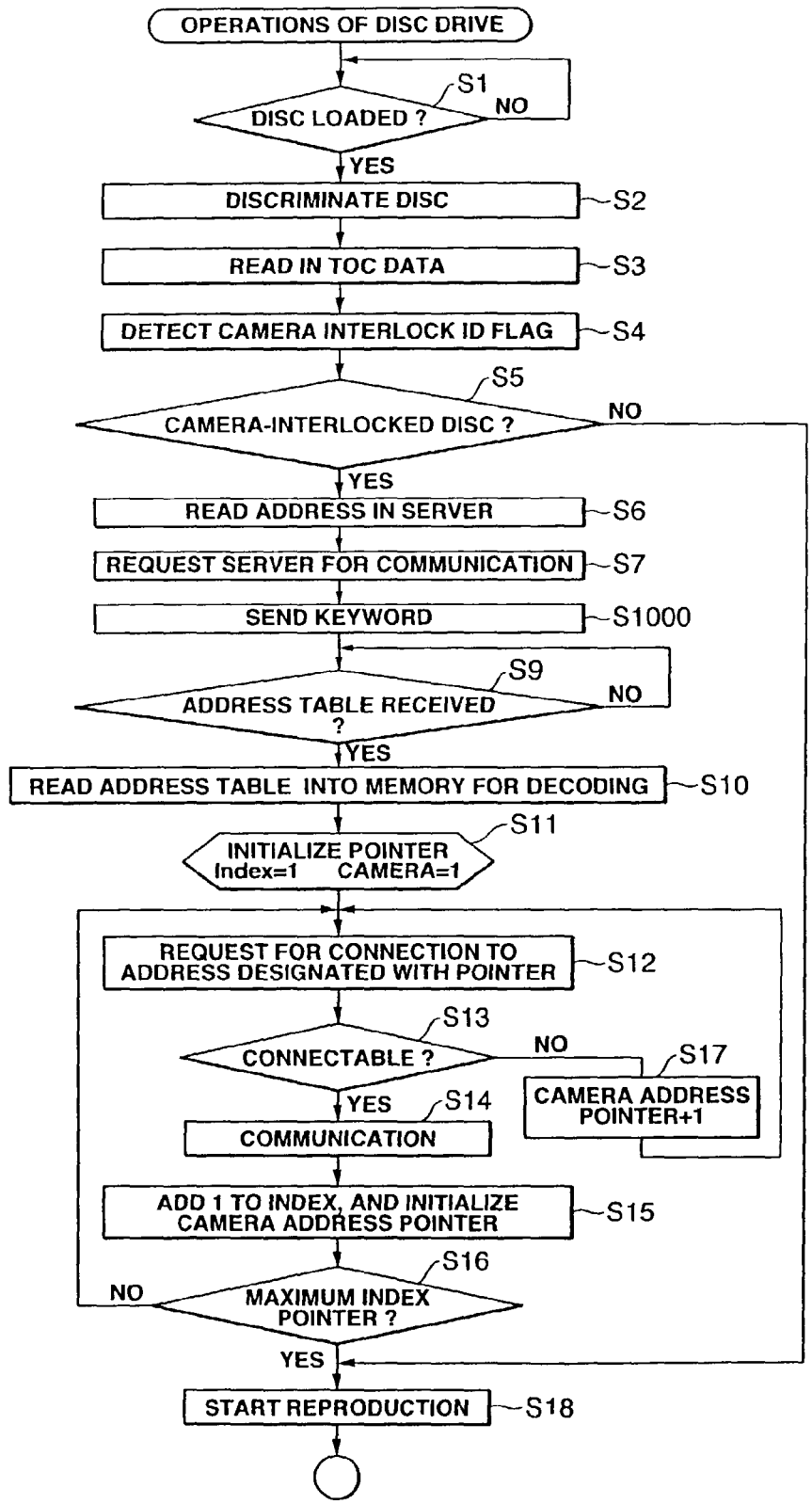
FIG. 34 shows a flow of operations made in the disc drive in a seventh embodiment of the present invention.

In this case, the disc drive 80 will operate as in the flow chart shown in FIG. 34. It should be noted that the flow chart in FIG. 34 is generally the same as that in FIG. 15 and the same steps as in FIG. 15 are indicated with the same references (steps S1 to S7 and S9 to S18). That is, the flow chart in FIG. 34 is different from that in FIG. 15 in that step S1000 is substituted for step S8 in FIG. 15. After requesting the sever 60 for communications, the disc drive 80 goes to step S1000 where it will send a keyword recorded in the disc 90 as shown in FIG. 36. After an address table is received, there will be effected the same operations as in steps S10 to S18 in FIG. 15.

Figure 35:
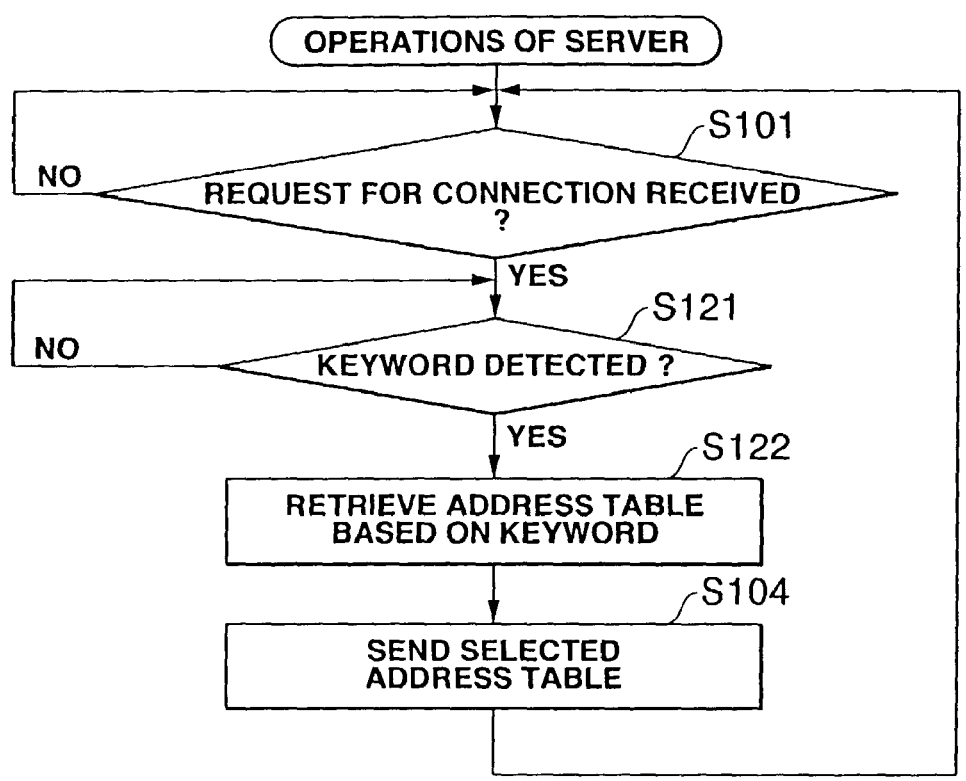
FIG. 35 shows a flow of operations made in the server in the seventh embodiment of the present invention when the disc drive sends a keyword.

On the other hand, the controller 63 of the server 60 will operate as in the flow chart shown in FIG. 35. In step S101, the server 60 stands by and its controller 63 judges whether the server 60 has received a connection request sent from the disc drive 80 via the network 110. When the server 60 stands by and its controller 63 judges that the server 60 has received the connection request from the disc drive 80, it goes to step S121 where it will cause the server 60 to start data communications with the disc drive 80 having sent the connection request and judge whether the server 60 has received a keyword sent from the disc drive 80. When the controller 63 judges in step S121 that the server 60 has detected the keyword, it goes to step S122 where it will retrieve an address table corresponding to the detected keyword from the data base 62. That is, the controller 63 retrieves an address table unit with which the keyword agrees as shown in FIG. 37.

After retrieval of the address table unit in step S122, the controller 63 goes to step S104 where it will control the communication unit 61 to send the selected address table unit towards the disc drive 80 having sent the connection request. This will be a response to the disc drive 80 from which the server 60 has received the connection request. After the address table is sent, the controller 63 causes the server 60 to terminate the communication with the disc drive 80 from which the server 60 has received the connection request. Thus, the disc drive 80 can acquire an address table as a single or a plurality of address table units corresponding to a keyword.

Therefore, the disc drive 80 can make data communications with an appropriate camera 50 according to contents (keyword) of a scene or the like to be reproduced from the disc 90, and receive a real-time world view from the camera 50. With these operations, the disc drive 80 can combine a background picture designated with the keyword and suitable for the contents of the scene with a recorded picture to output a synthetic image.

Note that in the above example, the key is prerecorded in the disc 90 but it may be information rewritable or not rewritable in the disc 90. In case the keyword is rewritable information, the user can acquire a desired background picture by rewriting the keyword to a desired one. Also, there may be prepared only a recording area (or management structure) for a keyword in the disc 90 so that the user can freely set the keyword. Further, a keyword may be recorded not in the disc 90 but in the RAM 41 or flash memory 46. At this time, a keyword may be stored correspondingly to a disc ID or the user may set the keyword irrespectively of a content in the disc 90.

H. Eighth Embodiment

In the aforementioned first, second, third, fifth and seventh embodiments, the disc drive 80 acquires an address table in any form to communicate with the camera 50. According to the eighth embodiment, however, the disc drive 80 does not directly handle any address table but the server 60 manages the communications, based on an address table, between the disc drive 80 and camera 50.

That is, an address table is stored in the data base 62 in the server 60. The disc drive 80 sends a disc ID for the disc 90 to be played back to the server 60. The server 60 retrieves an address table based on the disc ID, and manages the communications between an appropriate camera 50 and disc drive 80. Namely, the address table itself is supplied to the disc drive 80.

Figure 38:
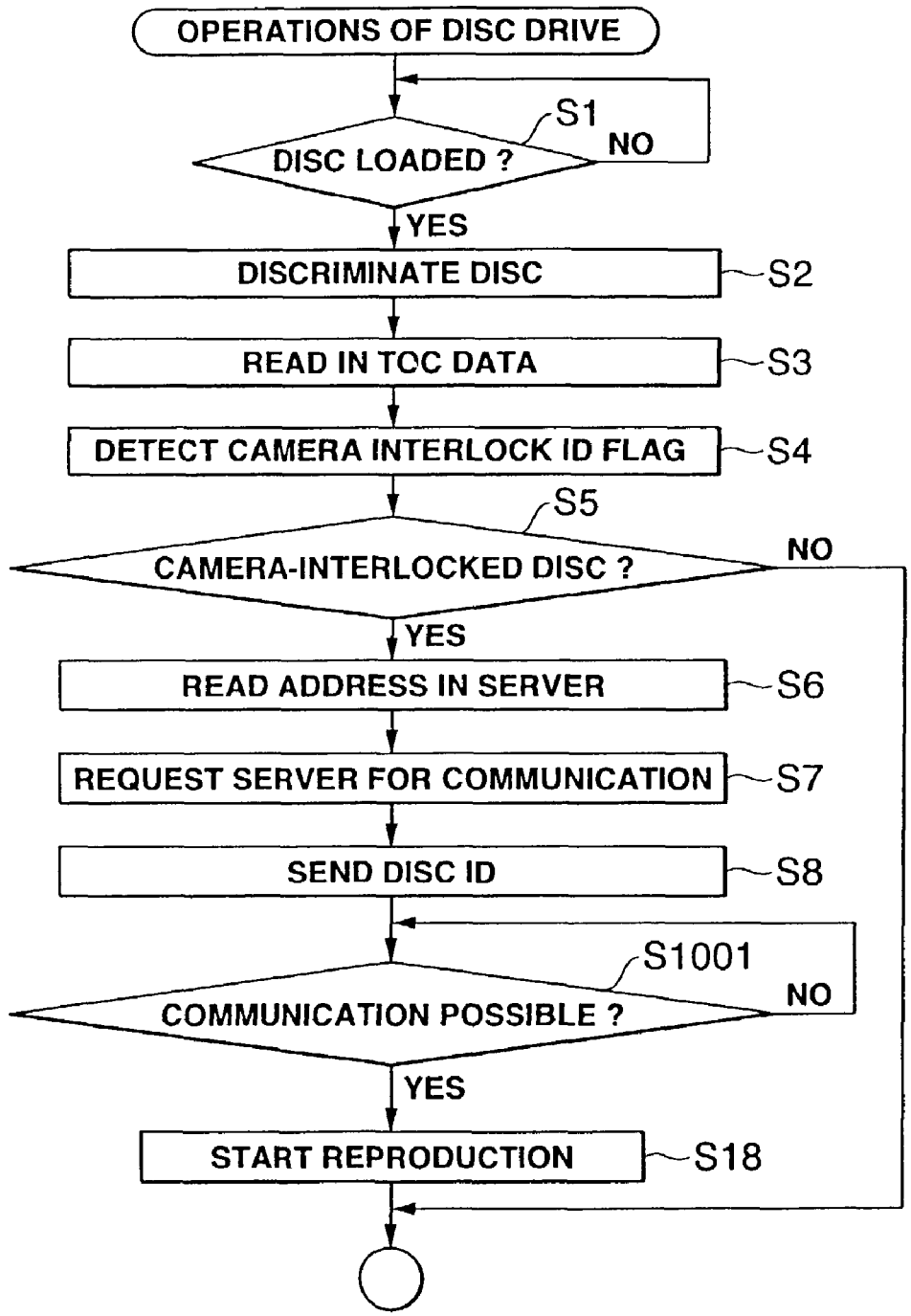
FIG. 38 shows a flow of operations made in the disc drive in an eighth embodiment of the present invention.

In this case, the disc drive 80 will operate as in the flow chart shown in FIG. 38. It should be noted that the flow chart in FIG. 38 is generally the same as that in FIG. 15 and the same steps as in FIG. 15 are indicated with the same references (steps S1 to S8, and S18). The flow chart in FIG. 38 is different from that in FIG. 15 in that step S1001 is substituted for steps S9 to 17 in FIG. 15. Namely, the operations down to step S8, that is, until a disc ID is sent in response to a correction request to the server 60, are the same as in FIG. 15. After step S8, the system controller 10 of the disc drive 80 goes to step S1001 where the disc drive 80 stands by and the system controller judges whether a communication has been established with a camera 50. When the disc drive 80 receives a real-time world view from the camera 50, it goes to step S18 where it will start reproduce a content. That is, the system controller 10 in the disc drive 80 does not control the communications with the camera but simply waits until a communication with the camera 50 is established and a real-time world view is sent from the camera 50.

Figure 39:
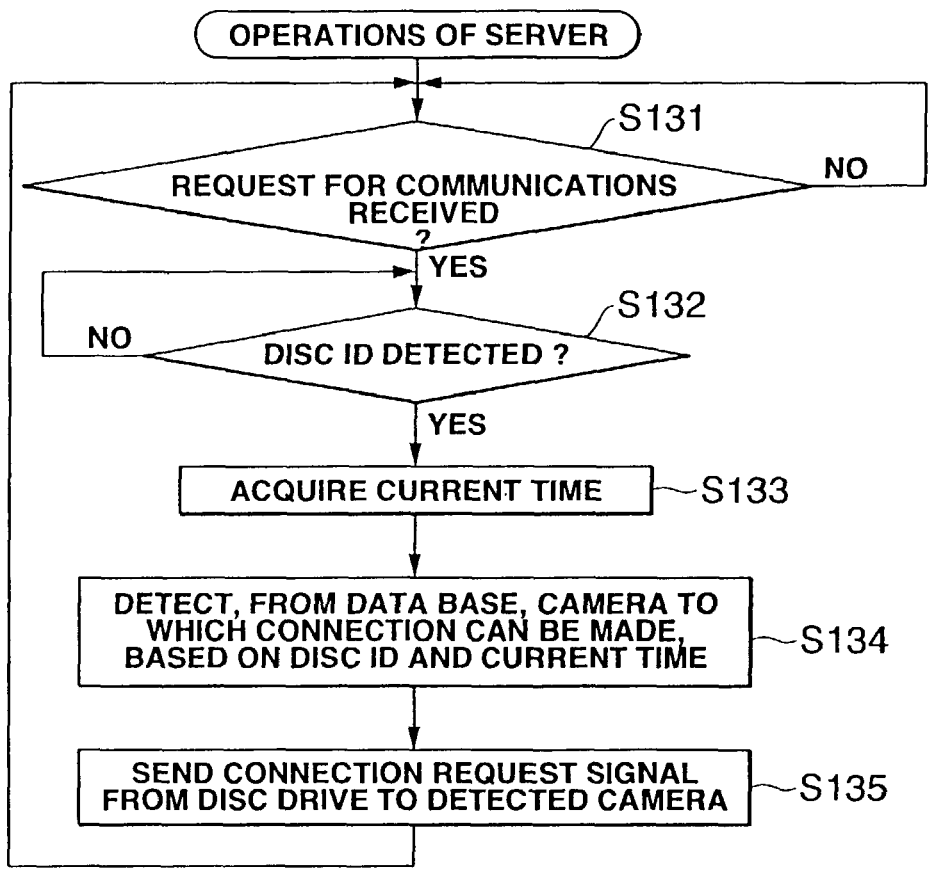
FIG. 39 shows a flow of operations made in the server in the eighth embodiment of the present invention in the eighth embodiment of the present invention.

On the other hand, the controller 63 of the server 60 operates as in the flow chart shown in FIG. 39. In step S131, the server 60 stands by and its controller 63 judges whether the server 60 has received a connection request from the disc drive 80 via the network 110. When the controller 63 judges that the server 60 has received the connection request, it goes to step S132 where it will cause the server 60 to start data communications with the disc drive 80 from which the connection request has been received and judge whether the server 60 has received a disc ID from the disc drive 80. When the controller 63 judges that the server 60 has detected the disc ID, it goes to step S133 where it will acquire the current time. For this purpose, a time keeper is provided in the server 60 for example to acquire the current time kept by the timer keeper. It should be noted that current time information may be received from the disc drive 80. Next in step S134, the controller 63 of the server 60 retrieves an address table from the data base 62 on the basis of the received disc ID and acquired current time.

Note that with the address table having been described concerning the first embodiment with reference to FIG. 5 can be retrieved from the disc ID only. Also, in case contents of an address table corresponding to a disc ID are correlated with a time (time zone) as having been described concerning the third embodiment, an address table (camera address) can be retrieved from the disc ID and current time. Further, when IP addresses of cameras 50 installed over the world, time and weather at the installed places and connected states of the cameras are stored in the data base 62 and they are real-time updated, it is possible to identify a camera 50 from which an optimum real-time world view can be acquired and judge whether the server 60 can be connected to the camera 50. In this case, the camera address can be retrieved by any conventional method such as the web retrieval site, dictionary retrieval or the like. Furthermore, the retrieval object is not limited to data managed by the server 60.

The controller 63 of the server 60 retrieves an appropriate address table. When it has acquired the address of a camera 50 with which the server 60 should be connected, it controls the communication unit 61 to sent a connection request to the camera 50 at the acquired camera address. However, the connection request is issued from the disc drive 80.

The camera 50 operates as in the first embodiment having been described with reference to FIG. 18 to communicate with the server 60 in response to the connection request from the disc drive 80, sent from the server 60. Thus, the disc drive 80 will be supplied with a real-time world view from the camera 50 as having previously been described. With the operations having been described with reference to FIG. 19, the disc drive 80 combines the real-time world view sent from the camera 50 with recorded video data reproduced from the disc 90, and outputs a synthetic image.

Note that in this embodiment, it is judged based on the retrieval of the data base whether the camera 50 is connectable to the server 60 but in case the data base does not include any information on whether the server 60 can communicate with an appropriate cameras 50, the server 60 may make pointer-setting operations to identify a camera 50 with which it can communicate, namely, those made by the disc drive 80 in steps S11 to S16 in FIG. 15, and then send, in step S135, a correction request from the disc drive 80 to the camera having been detected in step S134.

As above, the server 60 controls the communication between the disc drive 80 and camera 50 and only the server 60 may hold an address table for the communication control in this embodiment. That is, the eighth embodiment is advantageous in that the server 60 can intensively manage address tables and the disc drive 80 has not to control its own communication with the camera 50, receive and update any address table.

Note that for the communication between the disc drive 80 and camera 50, namely, for sending a real-time world view, the camera 50 may send the picture directly to the disc drive 80 or the camera 50 may send it to the server 60 once and then the server 60 relays and sends it to the disc drive 80. In a variant of this embodiment, when an appropriate camera 50 is detected, the server 60 may send the address of the camera to the disc drive 80 and then the disc drive 80 itself may establish a communication with the camera 50.

Also, with the operations made in the first embodiment taken as basic ones, a real-time world view is acquired according to a time zone of content reproduction as in the third embodiment and a real-time world view is acquired according to a keyword as in the seventh embodiment. Based on the operations made in the eighth embodiment, however, a real-time world view can of course be acquired according to a time zone of content reproduction or a keyword as will be described below.

I. Ninth Embodiment

This ninth embodiment of the present invention is based on the aforementioned eighth embodiment. That is, with the server 60 managing the communication between the disc drive 80 and camera 50, a real-time world view of the is acquired according to details of a content to be reproduced by the disc drive 80.

When for example a view of a region in fine weather is suitable as a real-time world view for a content reproduced by the disc drive 80, a real-time world view should desirably be acquired from a camera 50 installed in a region currently in fine weather. Also, for a person having an umbrella for example, as a character to be reproduced, a real-time world view should desirably be acquired from a camera 50 installed in a region currently in rainy weather so that a rainy scene can be used as the background for the content. In this case, the address table should be configured for a camera 50 in a region in appropriate weather to be selectable correspondingly to a content (scene or the like) to be reproduced. Also, the disc 90 should have recorded therein weather information corresponding to the scene.

FIG. 42 explains the lead-in area of the disc 90 in which there are recorded index information of a content (such as index information corresponding to one content or one of segments) in correlation with weather information. As shown, the index information includes start time and end time as segmental information (program, chapter or scene) and weather information such as "fine", "cloudy", "rainy", etc. corresponding to each segment. It should be noted that capacity information, number-of-layers information, track path direction, recording start/end position information, camera interlock identification flag, server address and disc ID included in this index information are the same as those in the first embodiment having been described with reference to FIG. 8.

Figure 43:
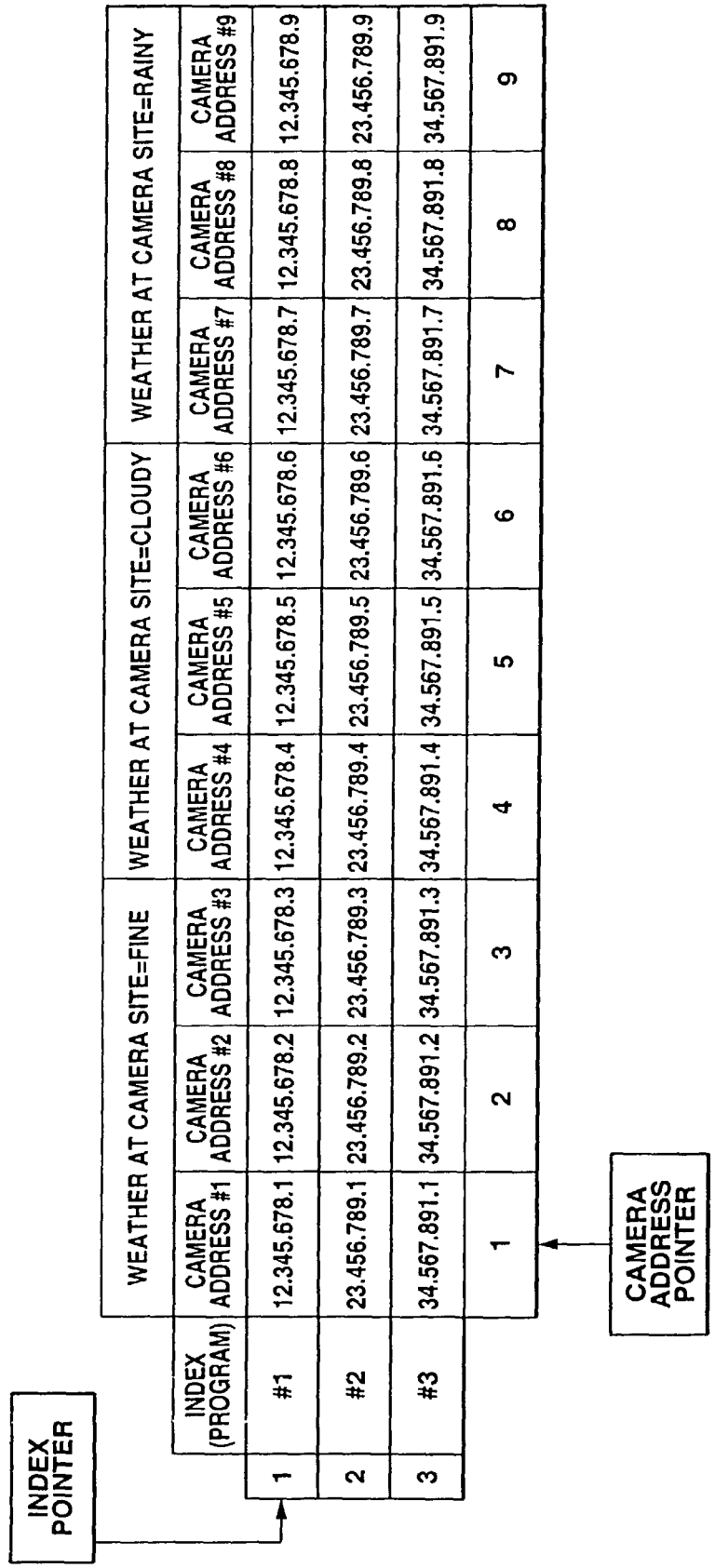
FIG. 43 explains the address table used in the ninth embodiment of the present invention.

FIG. 43 explains an example of the address in which there are shown camera addresses classified according to the weather at the camera sites. Based on this address table, a real-time world view can be acquired which is a weather scene corresponding to details of a content (the weather information). The address table shown in FIG. 43 shows camera addresses classified according to weather at the site of the camera 50. It should be noted that three camera addresses are shown for same weather because it is intended for at least three cameras 50 to take the same view when any of the cameras is faulty as having been described with reference to FIG. 5.

In the address table, camera addresses #1, #2 and #3 are of the cameras 50 installed in regions currently in fine weather. Also, camera addresses #4, #5 and #6 are of the cameras 50 installed in regions currently in cloudy weather. Further, camera addresses #7, #8 and #9 are of the cameras 50 installed in regions currently in rainy weather. It should be noted that the address table is real-time updated. That is, the server 60 always collects weather information from each of the sites of the cameras 50 over the world and the contents of the address table, namely, camera addresses, are updated correspondingly to the collected weather information.

Figure 40:
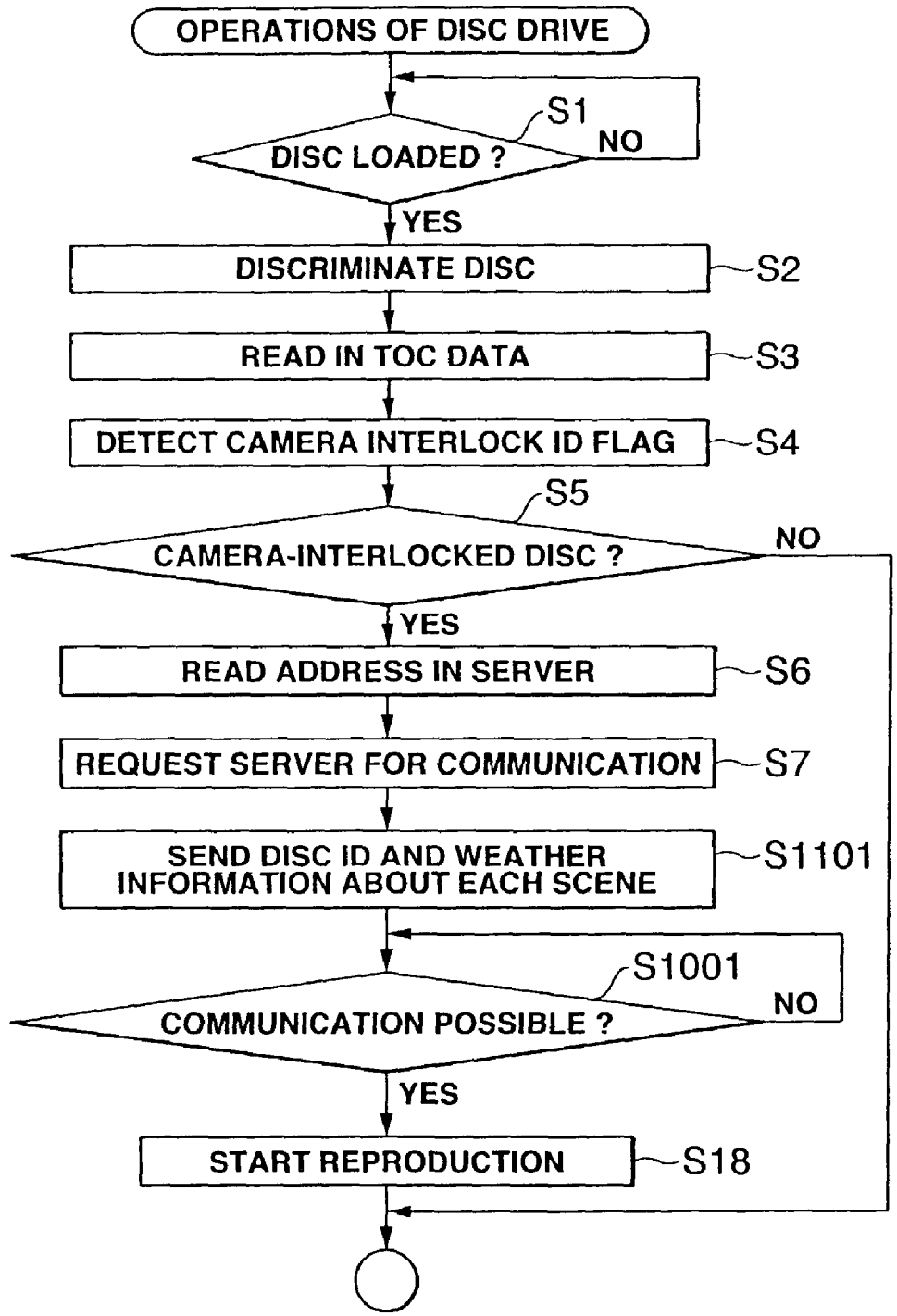
FIG. 40 shows a flow of operations made in the disc drive in a ninth embodiment of the present invention.

The disc drive 80 operates as shown in the flow chart in FIG. 40. In FIG. 40, the same steps as in FIG. 38 are indicated with the same references (steps S1 to S7, S1001 and S18). In this embodiment, after the system controller 10 has gone through steps S1 to S7 to make a communication request to the server 60, it goes to step S1101 where it will send a disc ID and weather information about each scene and corresponding to each index information as in FIG. 42. Thereafter, in step S1001, the system controller 10 waits until a communication with the camera 50 is established. When the communication with the camera 50 is established for reception of a real-time world view, the system controller 10 goes to step S18 where it will control the disc drive 80 to start reproducing a content, as in FIG. 38.

Figure 41:
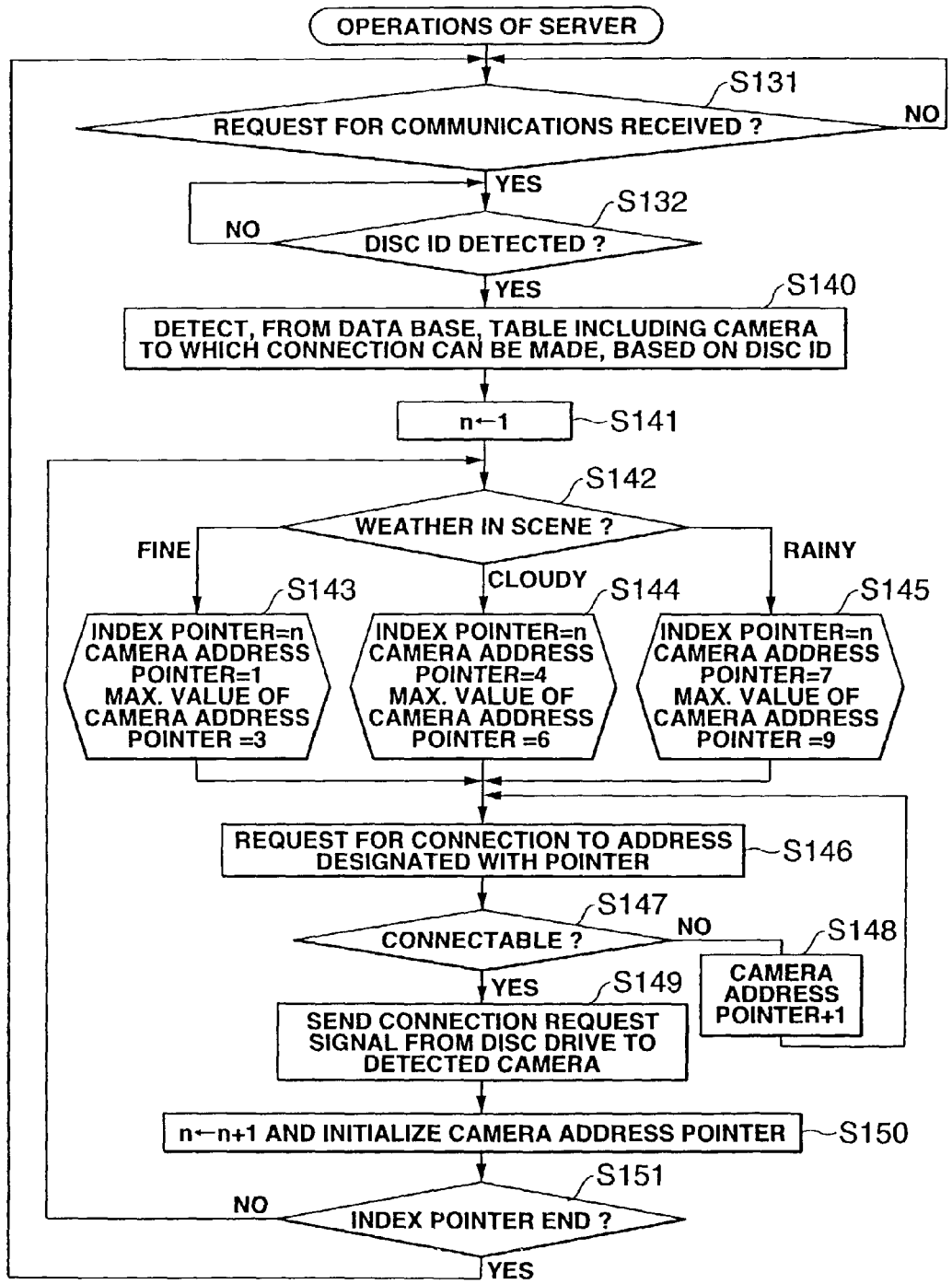
FIG. 41 shows a flow of operations made in the server in the ninth embodiment of the present invention.

On the contrary, the server 60 operates as in the flow chart shown in FIG. 41. In step S131, the server 60 stands by and its controller 63 judges whether the server 60 has received a connection request from the disc drive 80 via the network 110. When the controller 63 judges that the server 60 being on standby has received the connection request, it goes to step S132 where it will cause the server 60 to start data communications with the disc drive 80 from which the connection request has been sent and judge whether the server 60 has received a disc ID from the disc drive 80. When the controller 63 judges that the server 60 has received the disc ID, it goes to step S140 where it will retrieve an address table from the data base 62 according to the received disc ID. That is, the controller 63 will retrieve an address table configured as in FIG. 43.

Next, the controller 63 sets, based on weather information received along with the disc ID, a camera address pointer according to weather which is suitable for a content (scene). In step S141, a variable n indicating an index pointer is set to "1". Then, an operation is made correspondingly to first index information #n (namely, #1) shown in FIG. 42 for example. In step S142, it is judged what the weather information in the index information (scene) #1 is. When the result of judgment is that the weather information for the index information (scene) #1 is "fine", the controller 63 goes to step S143 where it will initialize the pointers are initialized in step S143 by setting the index pointer to "n", that is, to "1", camera address pointer to "1" and the maximum value of camera address pointer to "3". Then the controller goes to step S146. When the result of judgment in step S142 is that the weather information is "cloudy", the controller 63 goes to step S144 where it will set the index pointer to "n (=1)", camera address pointer to "4" and the maximum value of camera address pointer to "6". When it is judged in step S142 that the weather information is "rainy", the controller 63 goes to step S145 where it will set the index pointer to "n (=1)", camera address pointer to "7" and the maximum value of camera address pointer to "9".

Thus, the disc drive 80 can acquire a real-time world view in weather suitable for the scene #1 of the content. That is, the operations made in steps S146 to S149 are basically the same as those made in steps S12 to S14 in FIG. 27. Since the camera address pointer is set to any of "1" to "3" when the weather information is "fine", the disc drive 80 communicates with cameras 50 installed in regions in fine weather. It should be noted that in the ninth embodiment, the server 60 manages the communication between the disc drive 80 and camera 50 as in the eighth embodiment and the operations shown in FIG. 41 are made by the server 60. Therefore, in step S149, the server 60 sends a connection request from the disc drive 80 to a camera 50 at an address designated with a set pointer. Correspondingly, the camera 50 will send a real-time world view to the disc drive 80. Since the camera address pointer is set to any of "4" to "6" when the weather information is "cloudy", communications will be made between the disc drive 80 and a camera 50 installed in a region in cloudy weather. Further, since the camera address pointer is set to any of "7" to "9" when the weather information is "rainy", communications will be made between the disc drive 80 and a camera 50 installed in a region in cloudy weather.

Then the controller 63 of the server 60 goes to step S150 where it will increment the variable n being a value of the index pointer and initialize the camera address pointer. In step S151, the controller 63 judges whether there exists an address table including an index pointer #n or whether operations have been complete for all scenes. When the operations have not yet been complete, the controller 63 goes back to step S142. Therefore, operations are made for the second index information (scene) #2 shown in FIG. 42. That is, operations in steps 142 to S154 are made, based on the weather information, to set an index pointer, camera address pointer and maximum value of camera address pointer as above, and operations in steps S146 to S149 are made to select a camera 50 in weather corresponding to the weather information in the index information #n (namely, #2) and thus establish communications between the camera 50 and disc drive 80.

With the above operations, the disc drive 80 can acquire a real-time world view in designated weather for each scene to be reproduced, and combine it with the scene to output a synthetic video data.

Note that the address table having been described with reference to FIG. 43 is destined to manage the camera address with a matrix of an index pointer and weather at a camera site but the camera address may be managed only with weather in the camera site. That is, a camera address is selected only based on weather information designated as weather suitable or required for a content (scene).

Also, note that the address table shown in FIG. 43 has been described concerning an example in which camera addresses corresponding to various kinds of weather are managed by the same address table but camera addresses for various kinds of weather may be managed by respective address tables. In this case, an address table should be retrieved based on weather information.

Also note that the aforementioned disc 90 has recorded weather information for each scene (index information) but one piece of weather information may be recorded for the entire disc 90. Further, the weather information recorded for a content or scene in the disc 90 may be rewritten by the user. For example, when an address of the camera in each weather is stored for each index in the address table as shown in FIG. 43, for example, the disc drive 80 can acquire a real-time world view of a region in desired weather corresponding to weather information rewritten by the user (from "fine" to "rain", for example).

Further, note that the weather information may not be recorded in the disc 90. For example, the system may be designed so that when the disc 90 is played back, the user can freely designate weather by operating the control panel 38 and send designated weather as weather information to the server 60. In this case, a real-time world view of a region in user-defined weather can be acquired.

This embodiment is designed to acquire a real-time world view of a region in weather suitable for details of a content to be reproduced. However, it is also possible to acquire a real-time world view in weather corresponding to weather at a site where the disc drive 80 is used, namely, at the user's location (or at a site where the server 60 is installed). In this case, a function to detect weather is provided by installing a hygrometer on the disc drive 80 and detected weather is sent as weather information to the server 60. Alternatively, the server 60 may be provided with a hygrometer to detect weather.

The selection of a camera 50 according to weather may be adopted in the first embodiment, namely, in a system in which the server 60 sends an address table to the disc drive 80 which in turn will select a camera address from the address table. Further, according to the third embodiment, a real-time world view in a time zone corresponding to a content to be reproduced is acquired irrespectively of a current time at the disc drive 80. This selection of a camera may be done at the server 60 as in the ninth embodiment. That is, in the third embodiment, the pointers are set to select a camera address corresponding to a current time in steps S701 to S16 in FIG. 27 at the disc drive 80. This pointer setting is made in steps S142 to S151 shown in FIG. 41 at the server 60. In this case, the server 60 should be able to receive time information kept by the time keeper 37 from the disc drive 80 or the server 60 should be able to keep the current time at the disc drive 80.

J. Tenth Embodiment

In the aforementioned first to ninth embodiments, the content player is the disc drive 80 to read a content from the disc 90. However, a content may be downloaded from a content server or the like. The tenth embodiment is to combine a real-time world view with a content downloaded to the content player.

Figure 44:
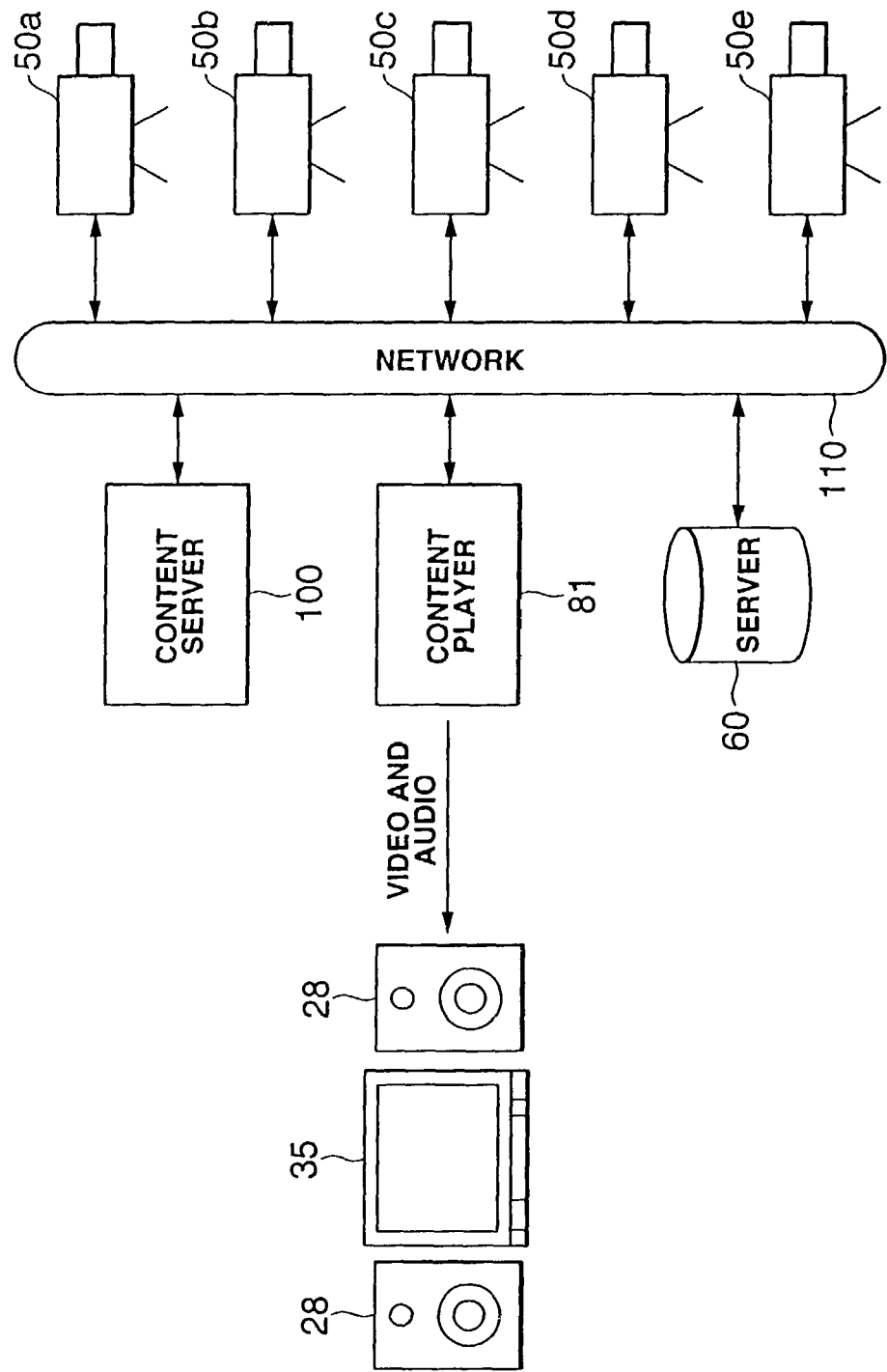
FIG. 44 is a block diagram of the reproducing system in a tenth embodiment of the present invention.

FIG. 44 is a block diagram of the reproducing system in the tenth embodiment of the present invention. In FIG. 44, the same steps as those in the flow chart shown in FIG. 1 are indicated with the same references and so will not be described any longer here below. In this embodiment, the content player 81 can download content data from the content server 100 via the network 110 like the personal computer and so-called MP3 player.

The content player 81 is designed to include at least a storage function, communication function, reproducing function and a control function. The storage unit is for example an HDD (hard disc drive), solid memory or a portable medium to store content data downloaded from the content server. The communication unit makes data communications with the content server 100, server 60 and camera 50 via the communication network 110. The reproducing unit combines content data stored in the storage unit with a real-time world view to produce a synthetic video data. The control unit controls the operations of these units.

The content server 100 responds to a download request from the content player 81 for example to send content data. At this time, the content server 100 sends a content ID, camera interlock identification flag, server address (address of the server 60), etc. along with the content data. That is, signals downloaded from the content server 100 to the content player 81 are ones carrying a content and information including link information used by the content player 61 to access an information acquisition apparatus corresponding to the content. The content player 81 will store the above information along with the content data. It should be noted that the server 60 manages the holding/management of an address table and communication between the camera 50 and content player 81 as in the aforementioned embodiments but the content server 100 may have these functions of the server 60. Also, it should be noted that the signals downloaded to the content player 81 may be ones carrying a content and information including outputting identification information indicating that all or a part of data forming the content are outputted along with data from the predetermined information acquisition apparatus from the content player 81. Further it should be noted that the signals downloaded to the content player 81 may be ones carrying a content and information including operation control information used by the content player 81 to control the operation of the information acquisition apparatus corresponding to the content. Moreover it should be noted that the signals downloaded to the content player 81 may be ones carrying a content and information including retrieval information used by the content player 81 to access the information acquisition apparatus corresponding to the information acquisition apparatus.

Figure 45:
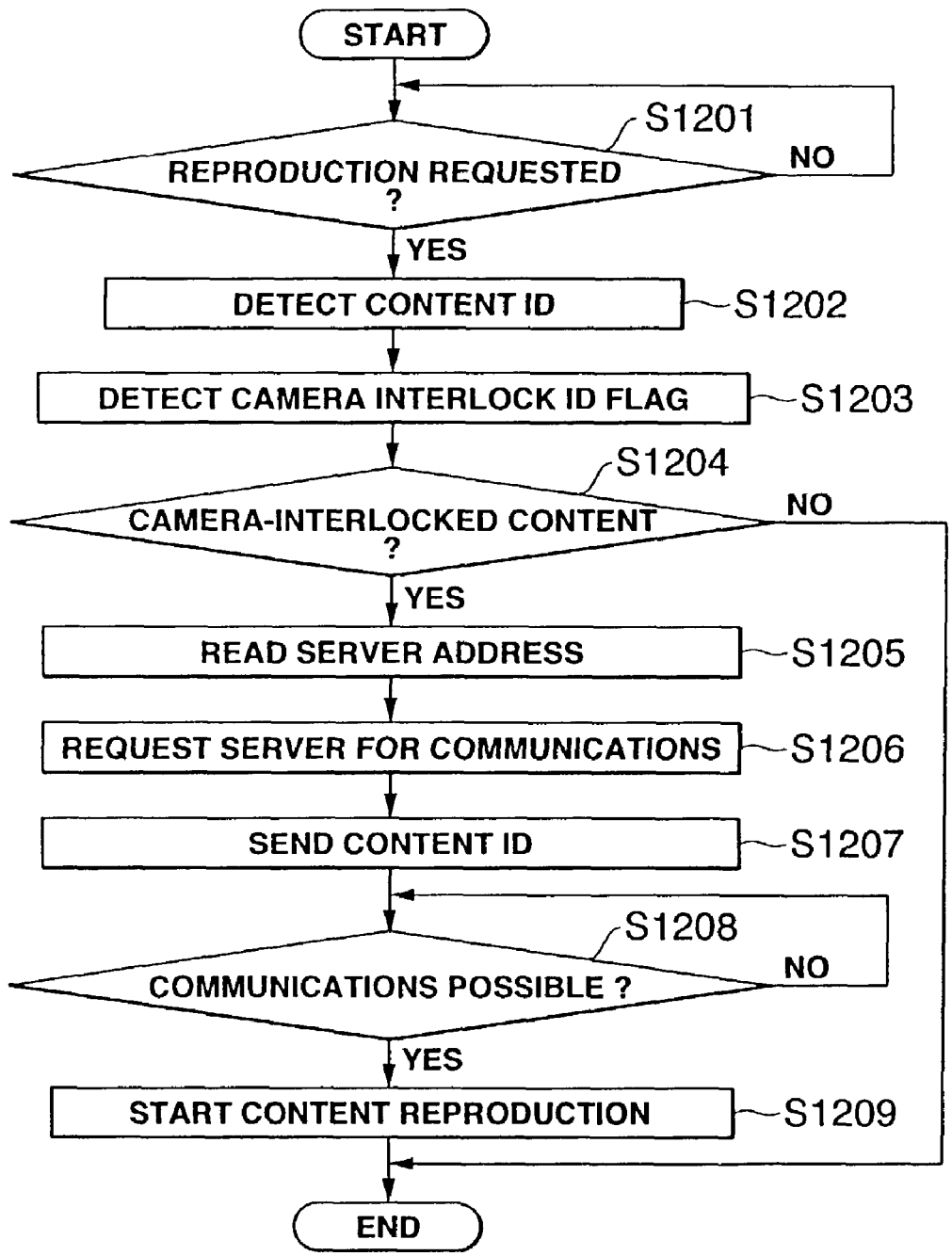
FIG. 45 shows a flow of operations made according to the reproducing software in the tenth embodiment of the present invention.

When reproducing the downloaded content data, the controller of the content player 81 operates as in the flow chart shown in FIG. 45. When the user enters a command to reproduce a content stored in an internal storage unit, the controller goes to step S1201 where it will judge whether content reproduction is requested. When the result of judgment is that the content reproduction has been requested, the controller goes to step S1202 where it will detect a content ID. Further in step S1203, the controller detects a camera interlock identification flag stored correspondingly to the content ID. In step S1204, the controller judges whether the camera interlock identification flag indicates that the content to be reproduced is a camera-interlocked content. When the result of judgement is "yes", the controller goes to step S1205 where it will read the address of the server 60. In step S1206, the controller sends a communication request to the server 60. When the connection with the server 60 is established, the controller sends a content ID to the server 60 in step S1207.

Thereafter, in step S1208, the content player 81 stands by to judge whether the communication with a camera 50 has been established. When the result of judgment is that the communication with the camera 50 has been established and a real-time world view can be received from the camera 50, the content player 81 starts reproducing the content in step S1209.

On the other hand, the server 60 should operate as in the flow chart shown in FIG. 39. Namely, it retrieves an address table by the use of a content ID instead of the disc ID and acquires a camera address of the camera 50 with which the server 60 has to communicate. Then, the content player 81 sends a connection request to the camera 50 at that address.

The camera 50 operates according to the flow chart shown in FIG. 18 as in the first embodiment. Namely, the camera 50 makes communications in response to the connection request made by the content player 81 and sent from the server 60. Thus, a real-time world view will be sent to the content player 81 as above. The content player 81 operates as in the flow chart shown in FIG. 19 to combine the real-time world video data sent from the camera 50 with the video data in the content reproduced from the storage unit and output a synthetic video data.

As above, the present invention permits to combine a real-time world view with not only a content provided as a record in a disc 90 but a one downloaded via the network 110 and output a synthetic video data. Also, in the aforementioned second to ninth embodiments as well as in various variants having been described in the description of the embodiments, the combination of a downloaded content with a real-time world view can be effected for reproduction of that content.

K. Applications

Various embodiments of the present invention and variants thereof have been described in the foregoing. In addition, the present invention can be applied in many other forms which will be outlined here below. First of all, the disc drive 80 is used as a household content player for example. A content such as an advertisement information of a supermarket or opening information of a showroom for example is recorded in a disc 90, and a network system is provided for data communications between such household content player and cameras 50 installed in the supermarket or showroom to pick up views of the shops in the supermarket or interior of the showroom. The supermarket or showroom distributes the discs 90 to users. Each of the users can reproducing the disc 90 in his content player to view the advertisement information of the supermarket or opening information of the showroom as a content and also view a real-time world view of such shops of the supermarket or interior of the showroom.

Also, a car navigation apparatus is used as a content player (disc drive), and navigation information such as a map is recorded as a content in a recording medium such as a disc for example. A network system is provided for data communications between cameras monitoring the expressways for example and the car navigation apparatus. The navigation information and road conditions as real-time world view can be combined to produce a synthetic image. Thus, while the user is driving his car, he or she can view the synthetic image on the car navigation apparatus to know the conditions of his desired expressways. The user can select a most appropriate course for his destination. Also, being interlocked with cameras installed in parking areas any of which he is going to select for parking his car, the car navigation apparatus can display the extent of jamming with cars in such parking areas.

Also, the disc drive (content player) can be applied as a game apparatus. In this case, for playing back a disc containing a so-called software game or for reproducing a downloaded content, a real-time world view is combined with a character as a game picture to be a background of the character. Especially, by switching cameras 50 with which the game apparatus can communicate from one to another as the game (or game stage) proceeds, a background image corresponding to the game proceeding or a content can be acquired.

Also, data reproduced from a disc or of a downloaded content is used as a text data, and it is combined with a real-time world view to produce a synthetic text data having the picture as a background. For example, a written introduction of a region, tour, country or the like is used as a text data. When reproducing the text data, a real-time world views is acquired from any of cameras 50 installed in a region/country actually introduced, and combined with the text data. A video thus synthesized will provide a very effective introduction of the region/country.

Further, sound and characters (subtitles) of a karaoke are recorded as a content recorded in a recording medium, and a real-time world view supplied from a camera is combined as a background with the content. Thereby, it is possible to use less storage space of the disc and reduce the costs for production of such background.

In the aforementioned fourth embodiment, the disc drive 80 controls the operations (zooming and panning) of the cameras 50. However, the disc drive 80, not the system including the disc drive 80, may be designed to communicate directly with a single camera 50 and combine a reproduced image with a real-time world view taken by the camera 50 to provide a synthetic video. That is, a dedicated camera 50 capable of communication, in any form, with the disc drive 80 may be provided for the disc drive 80 to complete the system. In this example, while controlling the operations of the camera 50 as in the fourth embodiment, the disc drive 80 receives a real-time world view from the camera 50 and combines it with a video data read from the disc to provide a synthetic video.

In the foregoing, the embodiments of the present invention have been described on the assumption that the disc 90 has a content such as a movie recorded therein and the disc drive 80 combines the video data of the content with a real-time world view taken by the camera 50 to produce a synthetic video data. However, the disc drive 80 may be designed to read only sound from the disc 90 and output a picture sent from the camera 50. This will be useful when the disc 90 having only a music as a content recorded therein is played back and permit to display a real-time world view sent from the camera 50 as a background of the content. In this case, the real-time world view detected by the video data decoder 33 for example should be supplied, not via the synthesizer 30, to the video signal converter 34 as indicated with a dashed line in FIG. 2. Thus, the speaker 28 can be supplied with audio signals such as a music read from the disc, and the monitor 35 be supplied with real-time world video signals from the camera 50 via the network 110. That is, the disc drive 80 can reproduce both the content in the disc 90 and real-time world view without having to use the synthesizer 30.

In the foregoing, the camera 50 has been described as an information acquisition apparatus to acquire a real-time world view. However, the information acquisition apparatus may be a microphone to acquire a real-time world sound. In this case, a sound reproduced by a disc drive or the like may be combined with such a real-time world sound. For example, when a sound to be reproduced is a speech or words for example, it may be combined with a real-time world sound being used as a background. Also, a picture reproduced by the disc drive or the like may be combined with a real-time world sound to provide a synthesized video/audio data. For example, in case a picture of the sea for example is reproduced, a real-time world sound picked up by a microphone installed at the coast of the sear may be used as the audio output for combination with the sea picture. Of course, the aforementioned game video, navigation video or text data video may preferably be combined with a real-time world sound.

Also, the embodiments of the present invention have been described in the foregoing taking DVD-V (digital versatile disc-video) being an optical disc as the disc 90 being a recording medium. In addition to the DVD-V, however, a read-only optical disc such as DVD, DVD-ROM (digital versatile disc-read-only memory), CD (compact disc), CD-ROM (compact disc-read-only memory) or video-CD (video compact disc), or a rewritable optical disc such as PD, DVD-RAM (digital versatile disc-random-access memory) or DVD-RW (digital versatile disc-rewritable), may be used as the disc 90. Further, the disc 90 may be a recordable optical disc such as DVD-R (digital versatile disc-recordable) or CD-R (compact disc-recordable). Moreover, any other than the above optical discs such as MO (magneto-optical) disc, a magnetic disc such as a hard disc or the like may be used as the disc 90. Also, besides the above discs, a magnetic tape, removable card-type semiconductor memory used with a computer or the like may be used as the recording medium. Therefore, the content player may be designed to be compatible with each of the above-mentioned recording media.

INDUSTRIAL APPLICABILITY

As having been described in the foregoing, when reproducing a content recorded in a recording medium or a downloaded content as first data, the present invention can acquire second data from an information acquisition apparatus such as a camera corresponding to the first data via a network, and produce third data from the first data and the second data. For example, first video data reproduced as a content and second video data supplied from a camera or the like can be combined to produce a synthetic video data. As the third data, the synthetic video data will be different from both the first data and the second data being original data and thus more diversified and interesting. These data are not limited to video ones but may be audio ones. Since a variety of second data can be selected for combination with the first data as a content, a resultant third data will be varied at each combination as desired. By using a part of output video/audio as image or sound picked by the information acquisition apparatus, it is possible to reduce the volume of a content to be recorded to a recording medium or to be downloaded.

Further, since address information for data communications with the information acquisition apparatus can be entered to the content player, the user can produce a desired output data by combining a content with the second data from an information acquisition apparatus selected according to the address information. Also, an information acquisition apparatus can be selected for communication with the content player based on a weather condition or keyword, in addition to the correspondence to a content to be reproduced, to receive the second data from an appropriate one of the information acquisition apparatuses.

When link information recorded in a recording medium loaded in the content player is a one used to make data communications with the content server, the content player can make data communications with the information acquisition apparatus according to the address information acquired from the server since it can acquire address information (address table) used for data communications with the information acquisition apparatus from the content server. Also, when link information recorded in a recording medium loaded in the content player is a one used for data communications with the information acquisition apparatus, the content player can acquire, from the recording medium, an address table used for data communications with the information acquisition apparatus. In this case, the content player can make data communications with the information acquisition apparatus when the recording medium is loaded in the content player.

Furthermore, since operation control information included in a content, that managed in an address table or that recorded in a recording medium can be detected and sent to the information acquisition apparatus, the image pickup or imaging operation of the information acquisition apparatus can be controlled. Therefore, the information acquisition apparatus can be operated under the operation control information to pickup the second data, video or audio. For example, the second data can be provided through an imaging operation set according to details of a content to be reproduced. Also, by correlating the operation control information with each of time-segmented units of a content, it is possible to provide the second data based on the operation control information as the time passes in reproduction of the content. That is, a single information acquisition can provide various forms of information correspondingly to a content, whereby the content player can produce the third data, video or audio, which is more interesting.

Also, by setting the pointers to address information in an address table on the basis of a current time or weather information, the data player can make data communications with each of different information acquisition apparatuses according to a condition such as a time or weather even when making the data communications with the information acquisition apparatuses based on the same address table. Thus, an output image or sound corresponding to the time or weather can be provided as the third data.

Further, since an address table sent from the server can be recorded to a recording medium loaded in the content player, the address table can be managed for each of the recording media. Furthermore, a request for sending an address table can be made to the server according to address table update information recorded in the recording medium. Therefore, an address table managed by the server can be recorded to the recording medium, namely, the address table can be updated. Thus, a latest address table can always be held.

The invention claimed is:

1. A reproducing system comprising:
   at least one recording medium operable to store recorded video content and identification information corresponding to identifying the recorded video content;
   a plurality of cameras each having a unique uniform resource locator (URL) and operable to generate real-time video data;
   a server operable to store address tables, wherein the address tables correlate the generated real-time video data with the recorded video content of the at least one recording medium based on the identification information; and
   a reproducing apparatus operable to generate output video data based on synthesizing the recorded video content and the real-time video data using an address table that is sent from the server to the reproducing apparatus over a communication network, the address table accessed by the server upon receiving the identification information associated with the at least one recording medium from the reproducing apparatus over the communication network,
   wherein, the address table correlates scenes corresponding to the received identification information associated with the at least one recording medium with the unique uniform resource locator of one or more of the plurality of cameras such that the synthesized recorded video content and the real-time video data associated with at least one of the plurality of cameras is produced by combining the recorded video content and the real-time video data according to synthesis type ID information extracted from the video content and, wherein operations of the at least one of the plurality of cameras are controllable according to the recorded video content.

2. A non-transitory recording medium having recorded therein a content, and output-processing identification information indicating that all or a part of data forming the content are output-processed along with data from a predetermined information acquisition apparatus based on an accessed address table, such that the output-processing includes a combination of all or a part of data forming the content with the data from a predetermined information acquisition apparatus producing real-time video data associated with at least one of a plurality of cameras according to synthesis type ID information extracted from the data forming the content and, wherein operations of the at least one of the plurality of cameras are controllable according to the data forming the content.

3. A non-transitory recording medium having recorded therein a content, and operation control information under which the reproducing apparatus to reproduce the content controls operations of an information acquisition apparatus corresponding to the content based on an address table accessed by the reproducing apparatus, such that the reproduced content includes combined recorded video data associated with the recording medium with real-time video data from at least one of a plurality of cameras associated with the information acquisition apparatus according to synthesis type ID information extracted from the content and, wherein operations of the at least one of the plurality of cameras are controllable according the content.

4. A non-transitory recording medium having recorded therein a content, and retrieval information according to which the reproducing apparatus to reproduce the content accesses an information acquisition apparatus corresponding to the content based on an address table accessed by the reproducing apparatus, such that the reproduced content includes combined recorded video data associated with the recording medium with real-time video data from at least one of a plurality of cameras associated with the information acquisition apparatus according to synthesis type ID information extracted from the recorded video data and, wherein operations of the at least one of the plurality of cameras are controllable according to the recorded video data.

5. A reproducing apparatus comprising:
a reproducing means for reproducing a content;
a communication means for making data communications with an information acquisition apparatus capable of communications via a communication network; and
a data output-processing means for producing third data based on first data reproduced by the reproducing means and second data supplied from the information acquisition apparatus based on an address table accessed by the reproducing means,
wherein the address table correlates the first and the second data, and outputting the third data, wherein the third data is produced by combining the first data reproduced by the reproducing means and the second data supplied from the information acquisition apparatus producing real-time video data associated with at least one of a plurality of cameras according to synthesis type ID information extracted from the first data and, wherein operations of the at least one of the plurality of cameras are controllable according to the first data.

6. The reproducing apparatus as set forth in claim 5, wherein the data output-processing means combines together the first data and the second data to produce the third data.

7. The reproducing apparatus as set forth in claim 5, further comprising detecting means for detecting output-processing identification information included in the content, and wherein the data output-processing identification means produces the third data from both the first and the second data according to the output-processing identification information detected by the detecting means.

8. The reproducing apparatus as set forth in claim 5, further comprising means for detecting operation control information included in the content; the communication means being designed to send the operation control information detected by the detecting means to the information acquisition apparatus.

9. The reproducing apparatus as set forth in claim 5, further comprising an operating means for entering address information according to which data communications are made with the information acquisition apparatus.

10. The reproducing apparatus as set forth in claim 5, wherein the reproducing apparatus reproduces a content from a recording medium loaded therein.

11. The reproducing apparatus as set forth in claim 5, wherein the reproducing means reproduces a content downloaded via the communication network.

12. The reproducing apparatus as set forth in claim 5, wherein the communication means is able to make data communications with a server capable of communications via a communication network, and with the information acquisition apparatus based on an address table sent from the server and in which the content and address information of the information acquisition apparatus are correlated with each other.

13. The reproducing apparatus as set forth in claim 5, further comprising reading means for reading, from a recording medium loaded therein, the address table in which the content and address information of the information acquisition apparatus are correlated with each other, and wherein the communication means is designed to make data communications with the information acquisition apparatus based on the address table read by the reading means from the recording medium.

14. The reproducing apparatus as set forth in claim 5, wherein the communication means is able to make data communications with a server capable of communications via a communication network while making data communications with the information acquisition reproducing apparatus under the control of the server.

15. A server comprising:
a communication means for making data communications with a reproducing apparatus capable of data communications via a communication network;
a storage means having stored therein an address table in which a content reproducible by the reproducing apparatus and address information on an information acquisition apparatus capable of data communications with the reproducing apparatus via the network are correlated with each other; and
a control means for retrieving the address table according to retrieval information sent from the reproducing apparatus and causing the communication means to send the retrieved address table to the reproducing apparatus, wherein at the reproduction apparatus a recorded video content is combined with real-time video data associated with at least one of a plurality of cameras from the information acquisition apparatus to produce a synthesized picture, the synthesized picture produced according to synthesis type ID information extracted from the recorded video content and, wherein operations of the at least one of the plurality of cameras are controllable according to the recorded video content.

16. A server comprising:
a communication means for making data communications with a reproducing apparatus capable of data communications via a communication network;
a storage means having stored therein an address table in which a content reproducible by the reproducing means and address information on an information acquisition apparatus capable of data communications with the reproducing apparatus via a network are correlated with each other; and
a control means for retrieving the address table according to retrieval information sent from the reproducing apparatus and controlling communications between the reproducing apparatus and information acquisition apparatus based on the retrieved address table, wherein at the reproduction means the reproducible content is combined with real-time video data associated with at least one of a plurality of cameras from the information acquisition apparatus to produce a synthesized picture, the synthesized picture produced according to synthesis type ID information extracted from the reproducible content and, wherein operations of the at least one of the plurality of cameras are controllable according to the reproducible content.

17. A reproducing method of reproducing a content recorded in a recording medium, comprising steps of:
  reproducing a content;
  making data communications with an information acquisition apparatus via a communication network; and
  producing third data based on first data reproduced in the reproducing step and second data supplied from the information acquisition apparatus in the communication step based on accessing an address table that correlates the first and second data, and outputting the third data, wherein the third data is produced by combining the first data reproduced in the reproducing step and the second data supplied from the information acquisition apparatus producing real-time video data associated with at least one of a plurality of cameras according to synthesis type ID information extracted from the reproduced first data and, wherein operations of the at least one of the plurality of cameras are controllable according to the reproduced first data.

18. A reproducing system in which data communications can be done between a reproducing apparatus and information acquisition apparatus, wherein:
  the reproducing apparatus includes:
    a reproducing means for reproducing a content;
    a communication means for making data communications with an information acquisition apparatus capable of communications via a communication network; and
    a data output-processing means for producing third data from first data reproduced by the reproducing means and second data supplied from the information acquisition apparatus based on an address table accessed by the reproducing means, wherein the address table correlates the first and the second data, and outputting the third data, wherein the third data is produced by combining the first data reproduced by the reproducing means and the second data supplied from the information acquisition apparatus producing real-time video data associated with at least one of a plurality of cameras according to synthesis type ID information extracted from the first data and, wherein operations of the at least one of the plurality of cameras are controllable according to the first data; and
  the information acquisition apparatus includes:
    means for acquiring information;
    a communication means for making data communications with the reproducing apparatus via a communication network; and
    a control means for causing the communication means to send information acquired by the information acquisition means to the reproducing apparatus.

19. A reproducing system in which data communications can be made among a reproducing apparatus, information acquisition apparatus and a server, wherein:
  the reproducing apparatus includes:
    a reproducing means for reproducing a content;
    a communication means for making data communications with an information acquisition apparatus capable of communications via a communication network; and
    a data output-processing means for producing third data based on first data reproduced by the reproducing means and second data supplied from the information acquisition apparatus based on an address table accessed by the reproducing means,
    wherein the address table correlates the first and the second data, and outputting the third data, wherein the third data is produced by combining the first data reproduced by the reproducing means and the second data supplied from the information acquisition apparatus producing real-time video data associated with at least one of a plurality of cameras according to synthesis type ID information extracted from the first data and,
  wherein operations of the at least one of the plurality of cameras are controllable according to the first data;
  the information acquisition apparatus includes:
    means for acquiring information;
    a communication means for making data communications with the reproducing apparatus via a communication network; and
    a control means for causing the communication means to send information acquired by the information acquisition means to the reproducing apparatus; and
  the server includes:
    a communication means for making data communications with a reproducing apparatus capable of data communications via a communication network;
    a storage means having stored therein an address table in which a content reproducible by the reproducing apparatus and address information on an information acquisition apparatus capable of data communications with the reproducing apparatus via a network are correlated with each other; and
    a control means for retrieving the address table according to retrieval information sent from the reproducing apparatus and causing the communication means to send the retrieved address table to the reproducing apparatus.

20. A reproducing system in which data communications can be made among a reproducing apparatus, information acquisition apparatus and a server, wherein:
  the reproducing apparatus includes:
    a reproducing means for reproducing a content;
    a communication means for making data communications with an information acquisition apparatus capable of communications via a communication network; and
    a data output-processing means for producing third data based on first data reproduced by the reproducing means and second data supplied from the information acquisition apparatus based on an address table accessed by the reproducing means,
  wherein the address table correlates the first and the second data, and outputting the third data,
  wherein the third data is produced by combining the first data reproduced by the reproducing means and the second data supplied from the information acquisition apparatus producing real-time video data associated with at least one of a plurality of cameras according to synthesis type ID information extracted from the first data and, wherein operations of the at least one of the plurality of cameras are controllable according the first data;
  the information acquisition apparatus includes:
    means for acquiring information;
    a communication means for making data communications with the reproducing apparatus via a communication network; and
    a control means for causing the communication means to send information acquired by the information acquisition means to the reproducing apparatus; and the server includes:
- a communication means for making data communications with a reproducing apparatus capable of data communications via a communication network;
- a storage means having stored therein an address table in which a content reproducible by the reproducing means and address information on an information acquisition apparatus capable of data communications with the reproducing apparatus via a network are correlated with each other; and
- a control means for retrieving the address table according to retrieval information sent from the reproducing apparatus and controlling communications between the reproducing apparatus and information acquisition apparatus based on the retrieved address table.

21. A non-transitory computer readable medium for storing a signal which carries a content, and information including link information according to which a reproducing apparatus going to reproduce the content accesses an information acquisition apparatus corresponding to the content based on an address table accessed by the reproducing apparatus, such that the reproduced content includes combined recorded video data associated with a recording medium with real-time video data from at least one of a plurality of cameras associated with the accessed information acquisition apparatus according to synthesis type ID information extracted from the recorded video data and, wherein operations of the at least one of the plurality of cameras are controllable according to the recorded video data.

22. A non-transitory computer readable medium for storing a signal which carries a content, and information including output-processing identification information indicating that all or a part of data forming the content are outputted from a reproducing apparatus along with data coming from a predetermined information acquisition apparatus based on an address table accessed by the reproducing apparatus, such that the outputted content includes a combination of the all or a part of data forming the content with real-time video data from at least one of a plurality of cameras associated with the predetermined information acquisition apparatus according to synthesis type ID information extracted from the data forming the content and, wherein operations of the at least one of the plurality of cameras are controllable according to the data forming the content.

23. A non-transitory computer readable medium for storing a signal which carries a content, and information including operation control information under which a reproducing apparatus going to reproduce the content controls operations of an information acquisition apparatus corresponding to the content based on an address table accessed by the reproducing apparatus, such that the reproduced content includes combined recorded video data associated with a recording medium with real-time video data from at least one of a plurality of cameras associated with the information acquisition apparatus according to synthesis type ID information extracted from the recorded video data and, wherein operations of the at least one of the plurality of cameras are controllable according to the recorded video data.

24. A non-transitory computer readable medium for storing a signal which carries a content, and information including retrieval information according to which a reproducing apparatus going to reproduce the content accesses an information acquisition apparatus corresponding to the content based on an address table accessed by the reproducing apparatus, such that the reproduced content includes combined recorded video data associated with a recording medium with real-time video data from at least one of a plurality of cameras associated with the information acquisition apparatus according to synthesis type ID information extracted from the recorded video data and, wherein operations of the at least one of the plurality of cameras are controllable according to the recorded video data.

25. A reproducing apparatus comprising:
- a reproducing unit that reproduces a content;
- a communication unit that communicates with an information acquisition apparatus capable of communications via a communication network; and
- a data output-processing unit that produces third data based on first data reproduced by the reproducing unit and second data supplied from the information acquisition apparatus based on an address table accessed by the reproducing unit,
- wherein the address table correlates the first and the second data, and outputting the third data,
- wherein the third data is produced by combining the first data reproduced by the reproducing unit and the second data supplied from the information acquisition apparatus producing real-time video data associated with at least one of a plurality of cameras according to synthesis type ID information extracted from the first data and,
- wherein operations of the at least one of the plurality of cameras are controllable according to the first data.

26. A server comprising:
- a communication unit that communicates with a reproducing apparatus that is capable of data communications via a communication network;
- a storage unit having stored therein an address table in which a content reproducible by the reproducing apparatus and address information on an information acquisition apparatus capable of data communications with the reproducing apparatus via the network are correlated with each other; and
- a control unit that retrieves the address table according to retrieval information sent from the reproducing apparatus and causing the communication unit to send the retrieved address table to the reproducing apparatus,
- wherein at the reproduction apparatus a recorded video content is combined with real-time video data associated with at least one of a plurality of cameras from the information acquisition apparatus to produce a synthesized picture, the synthesized picture produced according to synthesis type ID information extracted from the recorded video content and,
- wherein operations of the at least one of the plurality of cameras are controllable according to the recorded video content.

27. A server comprising:
- a communication unit that communications with a reproducing apparatus capable of data communications via a communication network;
- a storage unit that has stored therein an address table in which a content reproducible by the reproducing apparatus and address information on an information acquisition apparatus capable of data communications with the reproducing apparatus via a network are correlated with each other; and
- a control unit that retrieves the address table according to retrieval information sent from the reproducing apparatus and controlling communications between the reproducing apparatus and information acquisition apparatus based on the retrieved address table,
- wherein the reproducible content is combined with real-time video data associated with at least one of a plurality of cameras from the information acquisition apparatus to produce a synthesized picture, the synthesized picture produced according to synthesis type ID information extracted from the reproducible content and, wherein operations of the at least one of the plurality of cameras are controllable according to the reproducible content.

28. A reproducing system in which data communications can be done between a reproducing apparatus and information acquisition apparatus, wherein:

the reproducing apparatus includes:
  a reproducing unit that reproduces a content;
  a communication unit that communicates with an information acquisition apparatus capable of communications via a communication network; and
  a data output-processing unit that produces third data from first data reproduced by the reproducing unit and second data supplied from the information acquisition apparatus based on an address table accessed by the reproducing unit, wherein the address table correlates the first and the second data, and outputting the third data, wherein the third data is produced by combining the first data reproduced by the reproducing unit and the second data supplied from the information acquisition apparatus producing real-time video data associated with at least one of a plurality of cameras according to synthesis type ID information extracted from the first data and, wherein operations of the at least one of the plurality of cameras are controllable according to the first data; and the information acquisition apparatus includes:
  an acquiring unit that acquires information;
  a second communication unit that communicates with the reproducing apparatus via a communication network; and
  a control unit that controls the communication unit to send information acquired by the information acquisition unit to the reproducing apparatus.

29. A reproducing system in which data communications can be made among a reproducing apparatus, information acquisition apparatus and a server, wherein:

the reproducing apparatus includes:
  a reproducing unit that reproduces a content;
  a communication unit that communicates with an information acquisition apparatus capable of communications via a communication network; and
  a data output-processing unit that produces third data based on first data reproduced by the reproducing unit and second data supplied from the information acquisition apparatus based on an address table accessed by the reproducing unit, wherein the address table correlates the first and the second data, and outputting the third data, wherein the third data is produced by combining the first data reproduced by the reproducing means and the second data supplied from the information acquisition apparatus producing real-time video data associated with at least one of a plurality of cameras according to synthesis type ID information extracted from the first data and, wherein operations of the at least one of the plurality of cameras are controllable according to the first data;

the information acquisition apparatus includes:
  an acquiring unit that acquires information;
  a second communication unit that communicates with the reproducing apparatus via a communication network; and
  a control unit for controlling communications to send information acquired by the information acquisition unit to the reproducing apparatus; and the server includes:
  a server communication unit that communicates with a reproducing apparatus capable of data communications via a communication network;
  a storage unit having stored therein an address table in which a content reproducible by the reproducing apparatus and address information on an information acquisition apparatus capable of data communications with the reproducing apparatus via a network are correlated with each other; and
  a control unit that retrieves the address table according to retrieval information sent from the reproducing apparatus and causing the communication means to send the retrieved address table to the reproducing apparatus.

30. A reproducing system in which data communications can be made among a reproducing apparatus, information acquisition apparatus and a server, wherein:

the reproducing apparatus includes:
  a reproducing unit that reproduces a content;
  a communication unit that communicates with an information acquisition apparatus capable of communications via a communication network; and
  a data output-processing unit that produces third data based on first data reproduced by the reproducing unit and second data supplied from the information acquisition apparatus based on an address table accessed by the reproducing unit, wherein the address table correlates the first and the second data, and outputting the third data, wherein the third data is produced by combining the first data reproduced by the reproducing unit and the second data supplied from the information acquisition apparatus producing real-time video data associated with at least one of a plurality of cameras according to synthesis type ID information extracted from the first data and, wherein operations of the at least one of the plurality of cameras are controllable according the first data;

the information acquisition apparatus includes:
  an acquiring unit that acquires information;
  an acquisition communication unit that communicates with the reproducing apparatus via a communication network; and
  a control unit for causing the communication unit to send information acquired by the information acquisition unit to the reproducing apparatus; and the server includes:
  a server communication unit for making data communications with a reproducing apparatus capable of data communications via a communication network;
  a storage unit having stored therein an address table in which a content reproducible by the reproducing unit and address information on an information acquisition apparatus capable of data communications with the reproducing apparatus via a network are correlated with each other; and
  a control unit for retrieving the address table according to retrieval information sent from the reproducing apparatus and controlling communications between the reproducing apparatus and information acquisition apparatus based on the retrieved address table.

* * * * *